(12) United States Patent
Wakita et al.

(10) Patent No.: US 9,686,923 B2
(45) Date of Patent: Jun. 27, 2017

(54) ARTIFICIAL SOIL STRUCTURE AND METHOD OF FORMING THE SAME

(71) Applicant: PANASONIC CORPORATION, Osaka (JP)

(72) Inventors: Yumi Wakita, Nara (JP); Norihisa Mino, Osaka (JP); Osamu Yamada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 491 days.

(21) Appl. No.: 13/905,519

(22) Filed: May 30, 2013

(65) Prior Publication Data

US 2013/0259573 A1  Oct. 3, 2013

Related U.S. Application Data

(63) Continuation of application No. PCT/JP2012/004704, filed on Jul. 24, 2012.

(30) Foreign Application Priority Data

Jul. 29, 2011 (JP) ................................. 2011-167165
Jul. 29, 2011 (JP) ................................. 2011-167306

(51) Int. Cl.
*E02B 3/10* (2006.01)
*A01G 25/00* (2006.01)
*A01G 7/00* (2006.01)

(52) U.S. Cl.
CPC ............... *A01G 25/00* (2013.01); *A01G 7/00* (2013.01)

(58) Field of Classification Search
CPC . E02D 19/16; E02B 3/108; E02B 3/00; E02B 15/04

(Continued)

(56) References Cited

U.S. PATENT DOCUMENTS 3,870,422 A * 3/1975 Medico, Jr. ............... E01C 3/00
                                                                  404/17
5,026,207 A * 6/1991 Heath ...................... E02B 11/00
                                                                  405/229

(Continued)

FOREIGN PATENT DOCUMENTS

CN        1134498      10/1996
CN      101311455     11/2008

(Continued)

OTHER PUBLICATIONS

Office Action issued Nov. 28, 2014 in corresponding Chinese application No. 201280006662.9 (with partial English translation) of search report.

(Continued)

*Primary Examiner* — Benjamin Fiorello
*Assistant Examiner* — Edwin Toledo-Duran
(74) *Attorney, Agent, or Firm* — Wenderoth, Lind & Ponack, L.L.P.

(57) ABSTRACT

An artificial soil structure includes a water shield layer provided on a soil layer, the water shield layer includes water repellent sand processed by water repellent treatment. A water retentive layer is provided on the water shield layer, and the water retentive layer includes water retentive sand with no water repellent treatment. A water repellent soil body is provided in part of the water shield layer so as to penetrate the water shield layer and be in contact with the soil layer and the water retentive layer. The soil body includes sand processed by water repellent treatment, and the water shield layer has a water infiltration pressure higher than that of the water repellent soil body.

15 Claims, 46 Drawing Sheets

(58) Field of Classification Search
USPC ......... 405/263, 107, 80; 210/170.01, 170.02, 210/170.03, 170.04, 170.05, 170.06, 210/170.07, 170.08, 170.09, 170.1, 210/170.11
See application file for complete search history.

(56) References Cited

U.S. PATENT DOCUMENTS

| | | | | |
|---|---|---|---|---|
| 5,281,332 | A * | 1/1994 | Vandervelde | B01D 24/008 210/151 |
| 5,383,943 | A * | 1/1995 | Ogawa | C09K 3/18 47/59 R |
| 5,472,458 | A * | 12/1995 | Ogawa | A01G 9/1086 405/263 |
| 5,520,480 | A * | 5/1996 | Ohsaki | C09K 17/38 106/2 |
| 5,580,192 | A | 12/1996 | Ogawa et al. | |
| 6,146,051 | A * | 11/2000 | Pratt | E01C 3/06 404/2 |
| 6,221,243 | B1 * | 4/2001 | Flanagan | B01D 17/0202 210/163 |
| 6,224,770 | B1 * | 5/2001 | Savage | B09C 1/002 210/170.07 |
| 7,527,738 | B2 * | 5/2009 | Gonzalez | B32B 27/00 210/170.01 |
| 7,776,217 | B2 * | 8/2010 | Lucas | C02F 1/004 210/109 |
| 8,104,990 | B2 * | 1/2012 | Lowe | E01C 3/003 404/17 |
| 8,323,485 | B2 * | 12/2012 | Blundell | E03F 1/002 210/163 |
| 8,834,065 | B2 * | 9/2014 | Hart | E01C 3/06 405/36 |
| 8,944,720 | B2 * | 2/2015 | Nolt | B65G 5/00 405/54 |
| 2009/0129864 | A1 * | 5/2009 | Flynn | E01C 11/225 404/101 |
| 2010/0296878 | A1 * | 11/2010 | Zimmel | E02D 17/202 405/302.7 |
| 2011/0229262 | A1 * | 9/2011 | Shibata | E01C 7/32 404/31 |
| 2011/0284477 | A1 * | 11/2011 | Presby | C02F 3/288 210/750 |
| 2013/0011195 | A1 * | 1/2013 | Bower | C03C 12/00 404/31 |
| 2014/0048542 | A1 * | 2/2014 | Wakita | E01C 11/225 220/565 |
| 2014/0262203 | A1 * | 9/2014 | Pamukcu | B09C 1/00 166/57 |

FOREIGN PATENT DOCUMENTS

| | | | |
|---|---|---|---|
| JP | 6-62666 | 3/1994 | |
| JP | 6-113673 | 4/1994 | |
| JP | 11-75531 | 3/1999 | |
| JP | 11-187761 | 7/1999 | |
| JP | 11-289864 | 10/1999 | |
| JP | 2001-275483 | 10/2001 | |
| JP | 2002-34329 | 2/2002 | |
| JP | 2002-364130 | 12/2002 | |
| JP | 200968240 A * | 4/2009 | ............ E01C 11/24 |
| JP | 2009-136217 | 6/2009 | |

OTHER PUBLICATIONS

International Preliminary Report on Patentability and Translation of Written Opinion of the International Searching Authority issued Feb. 13, 2014 in corresponding Application No. PCT/JP2012/004704.

International Search Report dated Sep. 11, 2012 issued in International (PCT) Application No. PCT/JP2012/004704.

* cited by examiner

Fig.7A

| TYPE OF SOIL | WATER REPELLENT GLASS (1) | WATER REPELLENT GLASS (2) | WATER REPELLENT TOYOURA SAND (3) | WATER REPELLENT SEA SAND (4) | TOYOURA SAND WITH NO WATER REPELLENCY (5) |
|---|---|---|---|---|---|
| AVERAGE PARTICLE DIAMETER | 0.03mm | 0.105mm | 0.15mm | 0.8mm | 0.15mm |
| CRITICAL WATER LEVEL | 100cm·$H_2O$ | 29cm·$H_2O$ | 21cm·$H_2O$ | 10cm·$H_2O$ | 2cm·$H_2O$ |

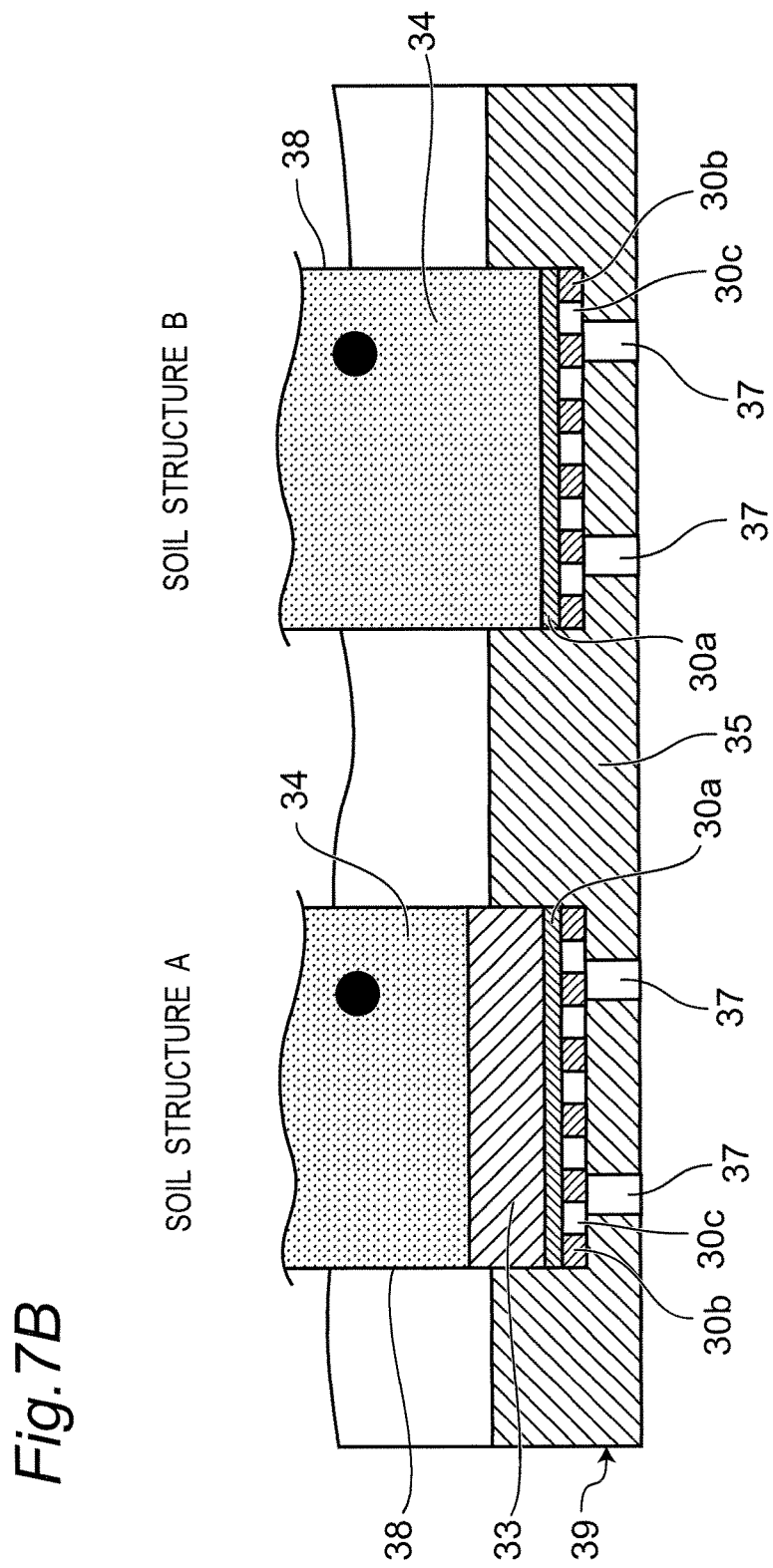

Fig.7C

| CONDITIONS | SOIL STRUCTURE A | SOIL STRUCTURE A | SOIL STRUCTURE A | SOIL STRUCTURE B |
|---|---|---|---|---|
| WATER REPELLENT SAND LAYER (PARTICLE DIAMETER) | WATER REPELLENT GLASS 0.03mm | WATER REPELLENT TOYOURA SAND 0.15mm | WATER REPELLENT SEA SAND 0.8mm | N/A |
| SALT CONCENTRATION (AFTER ONE WEEK) | 0% | 0% | 0% | 3% |

Fig.12

| MIXTURE RATIO (WITH NO WATER REPELLENT TREATMENT : WITH WATER REPELLENT TREATMENT) | 1:1 | 1:3 | 1:5 | 1:7 | 0:1 (ONLY WATER REPELLENT SAND) |
|---|---|---|---|---|---|
| CRITICAL WATER LEVEL | 2cm·$H_2O$ | 2cm·$H_2O$ | 5cm·$H_2O$ | 8cm·$H_2O$ | 10cm·$H_2O$ |

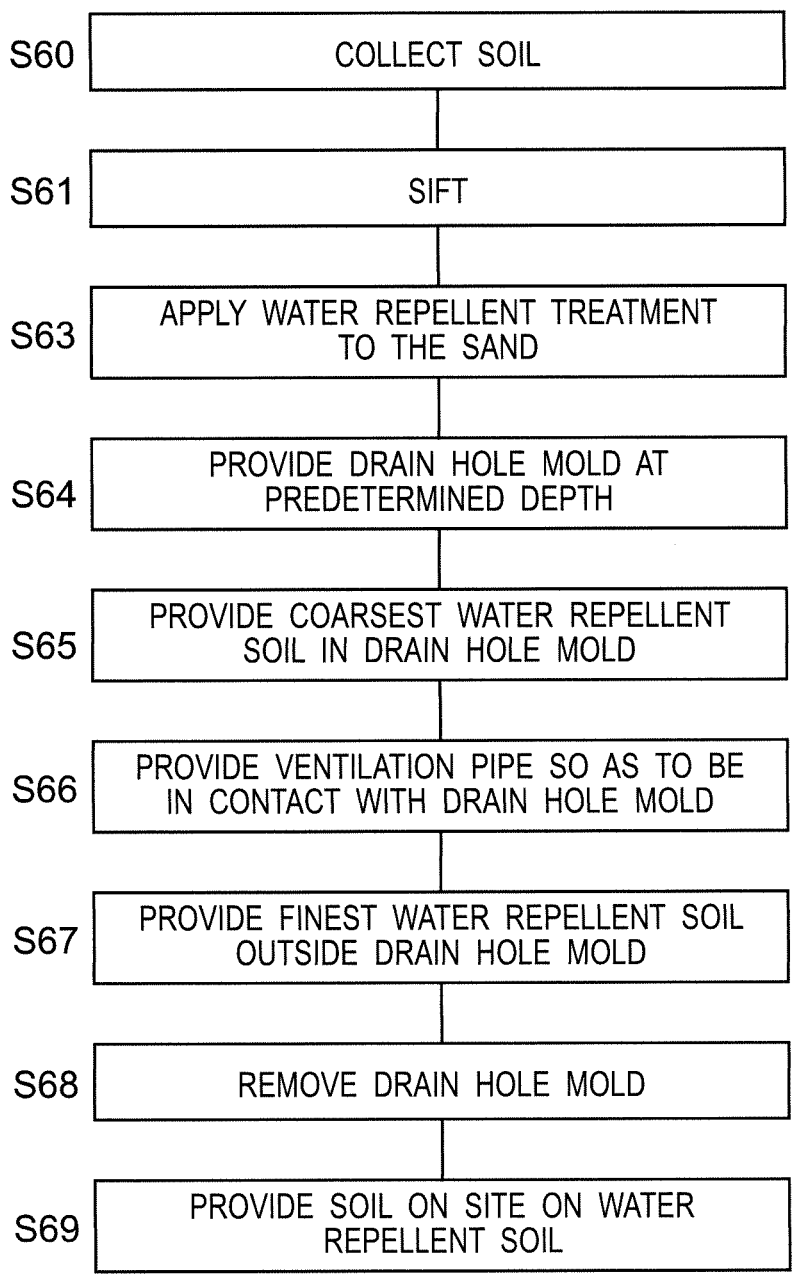

Fig.24

| TARGET PARTICLES | HYDROPHOBIC PARTICLES (1) (WATER REPELLENT SEA SAND) | HYDROPHOBIC PARTICLES (2) (WATER REPELLENT TOYOURA SAND) | HYDROPHOBIC PARTICLES (3) (GLASS BEADS) | ORDINARY SOIL (TOYOURA SAND NOT YET PROCESSED BY WATER REPELLENT TREATMENT) |
|---|---|---|---|---|
| AVERAGE PARTICLE DIAMETER | AVERAGE 800μm | AVERAGE 150μm | AVERAGE 105μm | AVERAGE 150μm |
| SMALLEST PARTICLE DIAMETER LARGEST PARTICLE DIAMETER | 200μm 1200μm | 100μm 400μm | 100μm 120μm | 100μm 400μm |
| CRITICAL WATER LEVEL | 10cm·$H_2O$ | 21cm·$H_2O$ | 29cm·$H_2O$ | 2cm·$H_2O$ |

Fig.38

| CONDITIONS | SOIL STRUCTURE C | SOIL STRUCTURE C | SOIL STRUCTURE C | SOIL STRUCTURE B |
|---|---|---|---|---|
| WATER REPELLENT SAND LAYER MIXTURE RATIO (WATER REPELLENT SAND : ORDINARY SAND) | TOYOURA SAND MIXTURE 1:2 | TOYOURA SAND MIXTURE 1:3 | TOYOURA SAND MIXTURE 1:4 | N/A |
| SALT CONCENTRATION (AFTER FOUR DAYS) | 1.5% | 0% | 0% | 3% |

…

ARTIFICIAL SOIL STRUCTURE AND METHOD OF FORMING THE SAME

CROSS-REFERENCE TO RELATED APPLICATIONS

This is a continuation application of International Application No. PCT/JP2012/004704, with an international filing date of Jul. 24, 2012, which claims priority of Japanese Patent Applications Nos.: 2011-167165 filed on Jul. 29, 2011 and 2011-167306 filed on Jul. 29, 2011, the contents of which are incorporated herein by reference.

TECHNICAL FIELD

The technical field relates to an artificial soil structure and a method of forming the same, which improve soil incapable of retaining water so as to have water retentivity.

BACKGROUND ART

For the afforestation of dry land that does not serve as farmland due to insufficient water retentivity of soil, soil of dry land has been actively improved so as to have water retentivity. Primary conditions for improving soil of dry land into soil suitable for plants include retentivity of water of a certain amount as well as blockage of salt contained in ground water. Further needed is a soil structure that can be improved as easily as possible and at lower cost.

In view of these conditions, there has been conventionally proposed an artificial soil structure that facilitates improvement into water retentive soil at low cost by applying water repellent treatment to particles such as sand and forming a water shield layer made of the water repellent sand (see JP 06-113673A). FIG. 35 depicts the artificial soil structure proposed in JP 06-113673A. This artificial soil structure includes a water shield layer 202 made of hydrophobic particles at predetermined depth from the ground surface in the soil, more specifically, depth allowing plants to sufficiently take root, and a water retentive soil layer 201 that is provided on the water shield layer 202 reserves water, so as to form soil not allowing water to flow to reach under the soil. Furthermore, the water shield layer 202 is expected to block salt contained in ground water. An original soil layer is denoted by reference numeral 203.

However, in this soil structure, the water shield layer 202 that may not be able to bear water pressure may be broken, or root rot may occur to plants due to excessive water, with relatively large rainfall being supplied in a short period of time in a rainy season on dry land, for example. Once the water shield layer 202 is broken, salt contained in ground water rises through the broken portion, with a result that the water shield layer 202 cannot prevent salt damage. Furthermore, in this structure, it is impossible to preliminarily specify a location of breakage in the water shield layer 202 or situations of breakage (such as the diameter of the broken portion). Analysis of the situations for mending and investigation for the appropriate mending method need to be conducted after the water shield layer 202 is broken, thereby requiring time or effort. Furthermore, it is difficult to mend the broken portion in the water shield layer 202 depending on its position (in cases where a plant or a building is positioned right above the broken portion).

On the other hand, a building such as a dam designed for reserve of water is provided with drain holes used for discharging water in order to reduce water pressure when the reserved water exceeds a certain amount. Even in the case of forming the water shield layer made of hydrophobic particles, a soil structure proposed in JP 06-62666A can be designed to have a configuration for discharge of water so as not to allow water to exceed a certain amount. FIG. 36 depicts a soil structure according to JP 06-62666A that includes a water shield layer 205 made of water repellent sand and provided in original soil basically similarly to JP 06-113673A, a water retentive soil layer 204 provided on the water shield layer 205 as improvement, and a portion (hereinafter, ordinary soil drain hole) 207 made of ordinary soil (soil with no water repellent treatment) partially provided in the water shield layer 205 and penetrating the water shield layer 205. An original soil layer is denoted by reference numeral 206. JP 06-62666A discloses the soil structure of FIG. 36 as the penetrating portion used for growing plants. The soil structure additionally includes the configuration of the ordinary soil drain hole 207 for allowing water to flow to reach under the water shield layer 205. In this configuration, even if relatively large rainfall is supplied in a short period of time, excessive water flows downward without overflowing onto the ground surface, breaking the water shield layer 205, or causing root rot. Furthermore, it is possible to specify the flow of water, so that mending for changing the amount of water flowing downward through the ordinary soil drain hole 207 can be planned easily and preliminarily.

However, in the soil structure according to JP 06-62666A, even in a season such as a dry season of relatively small rainfall, when water is desired to be reserved without any loss, water may flow through the ordinary soil drain hole 207. Furthermore, salt rises through the ordinary soil drain hole 207, thereby failing to prevent salt damage. There is required a soil structure that reliably prevents breakage of the water shield layer and salt damage while securing retentivity of water of a certain amount.

Many districts in the world cannot expect constant rainfall throughout the year but have seasons of relatively large rainfall and of relatively small rainfall. For example, as to annual rainfall in Kumasi in Ghana, the season of large rainfall from May to June has rainfall of 150 mm or more in one month, whereas the season of small rainfall from December to January has rainfall of 50 mm or less in one month. It is thus necessary to form a soil structure that can reserve water as much as possible in such a season of small rainfall and discharge excessive water in such a season of large rainfall, as well as constantly prevent rise of salt.

SUMMARY OF THE INVENTION

One non-limiting and exemplary embodiment provides an artificial soil structure and a method of forming the same. Such an artificial soil structure can reserve water in soil provided on a water shield layer, and water flows downward through a drain hole before breaking the water shield layer, so the excessive water flows downward with no breakage of the water shield layer and to prevent salt from rising to enter a water retentive soil layer when the amount of supplied water is large.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: an artificial soil structure comprising:

a water shield layer provided on a soil layer and including water repellent sand processed by water repellent treatment;

a water retentive layer provided on the water shield layer and including water retentive sand with no water repellent treatment; and a water repellent soil body provided partially in the water shield layer so as to penetrate the water shield layer and be in contact with the soil layer and the water retentive layer, the water repellent soil body including sand processed by water repellent treatment; wherein the water shield layer has water infiltration pressure higher than that of the water repellent soil body.

The artificial soil structure according to the aspect of the present invention includes layers, namely: the water shield layer provided on the soil layer and including water repellent sand processed by water repellent treatment so as not to allow water to flow to reach thereunder; and the water retentive layer provided on the water shield layer and including water retentive sand with no water repellent treatment so as to reserve water blocked by the water shield layer, and further includes the water repellent soil body provided partially in the water shield layer so as to penetrate the water shield layer and be in contact with the soil layer and the water retentive layer, wherein the water shield layer has a water infiltration pressure higher than that of the water repellent soil body. In this configuration, when the amount of supplied water is small, by reserving water to eliminate or decrease water reaching under the water shield layer, water can be kept in the soil layered on the water shield layer. On the other hand, when the amount of supplied water is large, water flows downward through the water repellent soil body before the water shield layer is broken. In this manner, excessive water can flow downward without breaking the water shield layer.

Furthermore, the water repellent soil body includes sand processed by water repellent treatment, so as to also prevent salt from rising to enter the water retentive layer.

These general and specific aspects may be implemented using a system and a method, and any combination of systems and methods.

BRIEF DESCRIPTION OF THE DRAWINGS

These and other aspects and features of the present disclosure are apparent from the following description in connection with the embodiments depicted in the accompanying drawings. In these drawings.

FIG. 7A is a chart indicating the relationship between the types of soil and the critical water levels;

FIG. 7B is a view depicting a test for checking the salt rise preventive effect of water repellent sand;

FIG. 7C is a chart indicating results of the test for checking the salt rise preventive effect of the water repellent sand;

FIG. 12 is a chart indicating the relationship between the mixture ratio of sand with no water repellency to water repellent sand and the water repellency;

FIG. 16 is a flowchart of a procedure of forming the artificial soil structure according to the third embodiment of the present invention;

FIG. 24 is a chart indicating the relationship between particle diameters and the critical water levels of the hydrophobic particles;

FIG. 38 is a chart indicating results of the test of FIG. 37.

DETAILED DESCRIPTION

Figure 1A:
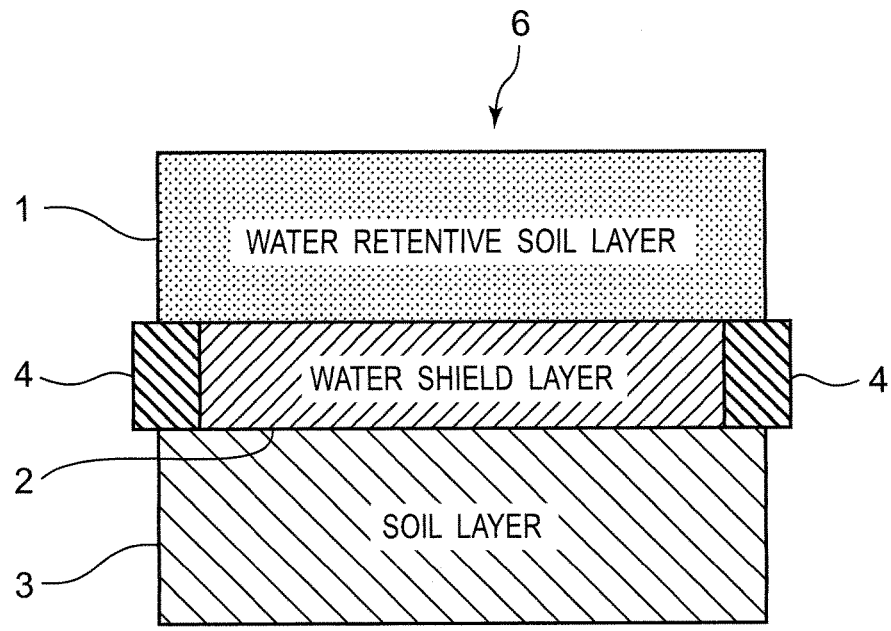
FIG. 1A is a longitudinal sectional view of an artificial soil structure according to a first embodiment of the present invention.

Embodiments of the present invention are detailed below with reference to the drawings.

Prior to the detailed description of the embodiments of the present invention with reference to the drawings, various aspects of the present invention are described.

According to a first aspect of the present invention, there is provided an artificial soil structure comprising:

a water shield layer provided on a soil layer and including water repellent sand processed by water repellent treatment;

a water retentive layer provided on the water shield layer and including water retentive sand with no water repellent treatment; and a water repellent soil body provided partially in the water shield layer so as to penetrate the water shield layer and be in contact with the soil layer and the water retentive layer, the water repellent soil body including sand processed by water repellent treatment; wherein the water shield layer has water infiltration pressure higher than that of the water repellent soil body.

The artificial soil structure according to the first aspect includes layers, namely: the water shield layer including water repellent sand processed by water repellent treatment so as not to allow water to flow to reach thereunder; and the water retentive layer provided on the water shield layer and including water retentive sand with no water repellent treatment so as to reserve water blocked by the water shield layer, and further includes the water repellent soil body provided partially in the water shield layer so as to penetrate the water shield layer and be in contact with the soil layer and the water retentive layer, wherein the water shield layer has a water infiltration pressure higher than that of the water repellent soil body. In this configuration, when the amount of supplied water is small, by reserving water to eliminate or decrease water reaching under the water shield layer, water can be kept in the soil layered on the water shield layer. On the other hand, when the amount of supplied water is large, water flows downward through the water repellent soil body before the water shield layer is broken. In this manner, excessive water can flow downward without breaking the water shield layer. Furthermore, the water repellent soil body includes sand processed by water repellent treatment, so as to also prevent salt from rising to enter the water retentive layer.

According to a second aspect of the present invention, there is provided the artificial soil structure according to the first aspect, wherein the water infiltration pressure of the water shield layer is higher by 1.2 times than the water infiltration pressure of the water repellent soil body.

According to the second aspect, the critical water retentive amount of the water shield layer is decreased as the water infiltration pressure of the water repellent soil body is increased in comparison to the water infiltration pressure of the water shield layer. According to the second aspect, by setting the water infiltration pressure of the water shield layer to about 1.2 times the water infiltration pressure of the water repellent soil body, it is possible to efficiently realize water retentivity or prevention of rise of salt in the case of small supply of water.

According to a third aspect of the present invention, there is provided the artificial soil structure according to the first or second aspect, wherein the water repellent soil body is collapsed by predetermined pressure of water reserved in the water retentive layer so as to have a drainage function of flowing water reserved in the water retentive layer into the soil layer.

According to the third aspect, the water repellent soil body has the drainage function of discharging water reserved in the water retentive layer into the soil layer when water reserved in the water retentive layer applies predetermined pressure. In this case, with no need to control discharge of water by means of a separate system, water repellent soil has only to be provided for reserving water if the water retentive layer reserves a small amount of water and for discharging water if the water retentive layer reserves a large amount of water. In this manner, it is possible to exert the effects of the first aspect in the simple configuration.

According to a fourth aspect of the present invention, there is provided the artificial soil structure according to any one of the first to third aspects, wherein the water shield layer includes hydrophobic particles that do not allow permeation of water.

According to the fourth aspect, the effects of the first aspect can be exerted only by forming the water shield layer by hydrophobic particles that do not allow permeation of water.

According to a fifth aspect of the present invention, there is provided the artificial soil structure according to any one of the first to fourth aspects, wherein the water repellent soil body includes hydrophobic particles that do not allow permeation of water.

According to the fifth aspect, by forming the water repellent soil body by hydrophobic particles that do not allow permeation of water, it is possible to exert the effects of the first aspect in the simple configuration of the third aspect.

According to a sixth aspect of the present invention, there is provided the artificial soil structure according to any one of the first to third aspects, wherein each of the water repellent soil body and the water shield layer includes hydrophobic particles that do not allow permeation of water, and the particles of the water repellent soil body is larger in diameter than the particles of the water shield layer.

According to the sixth aspect, it is possible to exert the effects of the first aspect in the simple configuration in which the diameters of the hydrophobic particles forming the water repellent soil body are larger than the diameters of the particles forming the water shield layer, with no need for any additional material or any complicated treatment to any material.

According to a seventh aspect of the present invention, there is provided the artificial soil structure according to any one of the first to third aspects, wherein the water shield layer includes hydrophobic particles that do not allow permeation of water, and the water repellent soil body includes a soil mixture of soil including water permeable sand with no water repellent treatment and hydrophobic particles that do not allow permeation of water.

According to the seventh aspect, it is possible to exert the effects of the first aspect in the simple configuration in which the water shield layer includes hydrophobic particles that do not allow permeation of water, and the water repellent soil body includes the soil mixture of soil including water permeable sand with no water repellent treatment and hydrophobic particles that do not allow permeation of water, with no need for any additional material or any complicated treatment to any material.

According to an eighth aspect of the present invention, there is provided the artificial soil structure according to the seventh aspect, wherein the water repellent soil body includes a soil mixture of soil including water permeable sand with no water repellent treatment and hydrophobic particles forming the water shield layer at a ratio from 1:3 to 1:7.

According to the eighth aspect, it is possible to exert the effects of the first aspect in the simple configuration in which the water repellent soil body includes the soil mixture of soil including water permeable sand with no water repellent treatment and hydrophobic particles forming the water shield layer at a ratio from 1:3 to 1:7, with no need for any additional material or any complicated treatment to any material.

According to a ninth aspect of the present invention, there is provided the artificial soil structure according to any one of the first to eighth aspects, further comprising: a ventilation pipe having one end opened to outdoor air and another end in contact with the water repellent soil body to ventilate the water repellent soil body.

According to the ninth aspect, if one or two pipes used for ventilation of outdoor air into the soil body are provided so as to be in contact with the soil body, water can be more reliably reserved in the soil of the water retentive layer.

According to a tenth aspect of the present invention, there is provided a method of forming an artificial soil structure, the method comprising:

providing a cylindrical drain hole mold on a soil layer of a site to form the artificial soil structure;

forming a water repellent soil body by inserting, into the drain hole mold, sand processed by water repellent treatment so as to be in contact with the soil layer;

forming a water shield layer by providing sand processed by water repellent treatment outside the drain hole mold so as to have water infiltration pressure higher than that of the water repellent soil body; and forming a water retentive layer by providing water retentive sand with no water repellent treatment on the water repellent soil body and the water shield layer so as to be in contact with the water repellent soil body.

According to the tenth aspect, the water repellent soil body including sand processed by water repellent treatment can be reliably and stably provided partially in the water shield layer so as to penetrate the water shield layer and be in contact with the soil layer and the water retentive layer.

According to an eleventh aspect of the present invention, there is provided the method of forming an artificial soil structure according to the tenth aspect, wherein the drain hole mold is removed after the water shield layer is formed and before the water retentive layer is formed.

In the configuration according to the eleventh aspect, due to the water repellent soil body, when the amount of supplied water is small, by reserving water to eliminate or decrease water reaching under the water shield layer, water can be kept in the soil layered on the water shield layer. On the other hand, when the amount of supplied water is large, water flows downward through the water repellent soil body before the water shield layer is broken. In this manner, excessive water can flow downward without breaking the water shield layer.

Furthermore, the water repellent soil body includes sand processed by water repellent treatment, so as to also prevent salt from rising to enter the water retentive layer.

According to a twelfth aspect of the present invention, there is provided the artificial soil structure according to any one of the first to eighth aspects, wherein the water shield layer is formed as a concave portion including a flat portion and a side portion standing on a peripheral edge of the flat portion, the water retentive layer is provided in the concave portion of the water shield layer and on an upper surface of the concave portion, the water repellent soil body vertically penetrates a part of the side portion of the water shield layer, is in contact with the soil layer and the water retentive layer, and includes sand processed by water repellent treatment, and the flat portion and an upper end surface of the side portion in the concave portion of the water shield layer have a difference in height smaller than a difference between the water infiltration pressure as a critical water pressure of the water shield layer and the water infiltration pressure of the water repellent soil body.

In this configuration, water of at least a certain amount can be reserved securely even in a season of small supply of water. On the other hand, in a season of large supply of water, excessive water is discharged so as to prevent breakage of the water shield layer, and it is also possible to constantly prevent entry of salt water into the water retentive soil. Water can be reserved in the water retentive soil more efficiently by forming the water shield layer into the concave shape rather than the flat shape.

According to a thirteenth aspect of the present invention, there is provided the artificial soil structure according to the twelfth aspect, wherein the water shield layer includes hydrophobic particles of two or more types different from each other in water infiltration pressure, a water infiltration pressure of the hydrophobic particles forming an upper portion of the side portion in the concave portion of the water shield layer is lower than a water infiltration pressure of the hydrophobic particles forming the flat portion in the concave portion of the water shield layer, and the water repellent soil body includes hydrophobic particles having a water infiltration pressure lower than the water infiltration pressure of the hydrophobic particles forming the upper portion of the side portion in the concave portion of the water shield layer.

According to the thirteenth aspect, by forming into the concave shape, it is possible to gradually adjust the water infiltration pressure in accordance with the height of the side portion of the concave water shield layer, while keeping the efficient water retentivity of the water retentive soil. It is thus possible to further stably exert the effects of securing water retentivity in a season of small supply of water and preventing breakage of the water shield layer in a season of large supply of water.

According to a fourteenth aspect of the present invention, there is provided the artificial soil structure according to the thirteenth aspect, wherein the hydrophobic particles forming the upper portion of the side portion in the concave portion of the water shield layer have an average particle diameter larger than that of the hydrophobic particles forming the flat portion in the concave portion of the water shield layer, so that the water infiltration pressure of the hydrophobic particles forming the upper portion of the side portion in the concave portion of the water shield layer is lower than the water infiltration pressure of the hydrophobic particles forming the flat portion in the concave portion of the water shield layer, and the hydrophobic particles forming the water repellent soil body have particle diameters larger than those of the hydrophobic particles forming the upper portion of the side portion in the concave portion of the water shield layer, and a water infiltration pressure of the hydrophobic particles forming the water repellent soil body is lower than the water infiltration pressure of the hydrophobic particles forming the upper portion of the side portion in the concave portion of the water shield layer.

According to the fourteenth aspect, in the simple configuration of changing the average particle diameter of the hydrophobic particles to adjust the water infiltration pressure, it is possible to securely exert the effect of securing water retentivity in a season of small supply of water as well as preventing breakage of the water shield layer in a season of large supply of water by gradually adjusting the water infiltration pressure, while keeping the effect of effectively reserving water in the water retentive soil by forming the water shield layer into the concave shape.

According to a fifteenth aspect of the present invention, there is provided the artificial soil structure according to any one of the twelfth to fourteenth aspects, wherein the flat portion and the side portion in the concave portion of the water shield layer are connected together by a stepped bottom portion.

Upon forming a layer of hydrophobic particles into a concave shape, the water shield layer and the water retentive layer provided therein need to be formed gradually from below so as to prevent collapse of the layers. However, according to the fifteenth aspect, the above configuration can be constructed more easily by forming the portion between the flat portion and the side portion of the concave portion into the stepped shape. Embodiments of the present invention are described below with reference to the drawings.

Before continuing the description of the present invention, it is noted that the same components are denoted by the same reference numerals respectively in the accompanying drawings.

First Embodiment

Figure 1B:
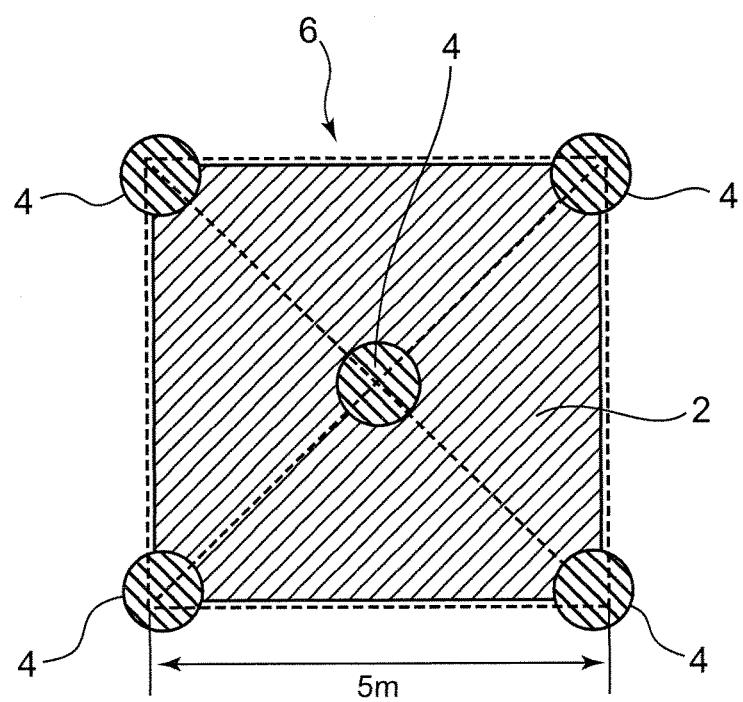
FIG. 1B is a plan view showing drain holes and a water shield layer of the artificial soil structure according to the first embodiment of the present invention.
Figure 2:
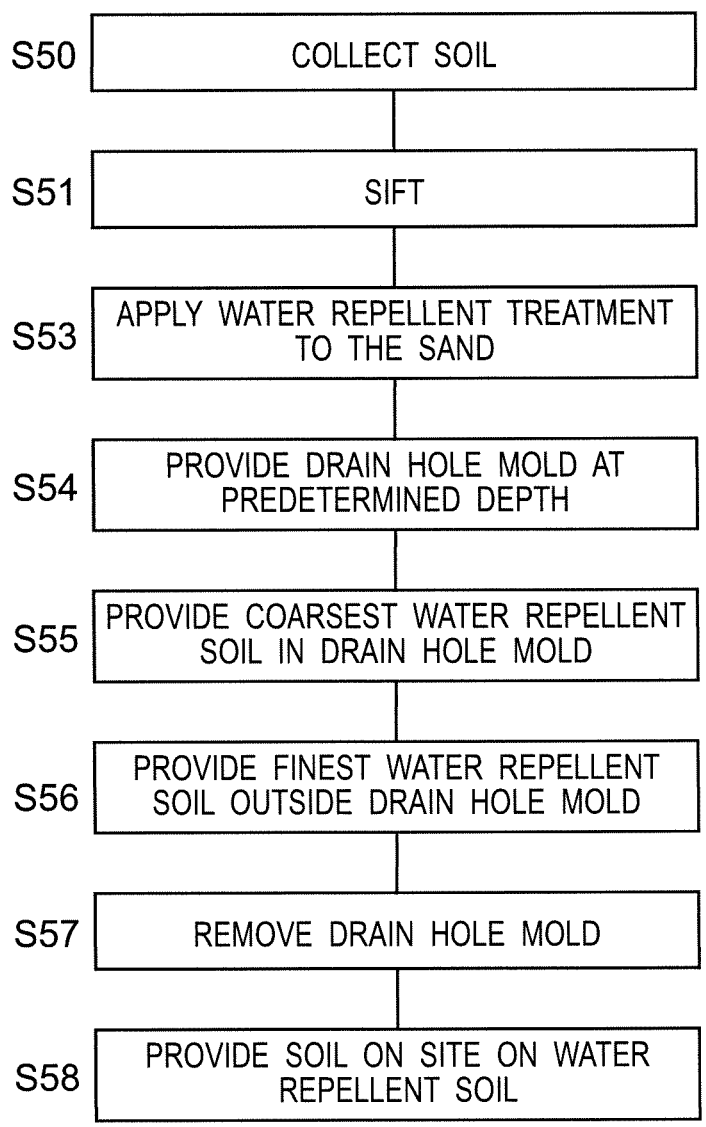
FIG. 2 is a flowchart of a procedure of forming the artificial soil structure according to the first embodiment of the present invention.

With reference to FIGS. 1A to 2, initially described is a configuration of an artificial soil structure 6 according to the first embodiment of the present invention. The artificial soil structure 6 is schematically configured by a water shield layer 2 and drain holes 4. The water shield layer 2 does not allow water to flow therethrough (i.e., is water repellent), and is provided in soil at a predetermined depth from the ground surface, so that water stays on the water shield layer 2. The drain holes 4 penetrate the above-discussed water shield layer 2, so that excessive water flows downward. The drain holes 4 are formed by hydrophobic particles that have a critical water level (water infiltration pressure or critical hydraulic head pressure) lower than that of the water shield layer 2. It is thus possible to reserve water by the drain holes 4 in a season of small rainfall, whereas excessive water is discharged through the drain holes 4 in a season of large rainfall. The drain holes 4 can also prevent salt damage. Such a configuration is detailed below.

FIG. 1A shows an example of the soil structure according to the first embodiment of the present invention.

The soil structure 6 includes a soil layer 3 of natural soil (referred to as original soil) on site (where the soil structure 6 is to be formed), the water shield layer 2, and a water retentive soil layer (water retentive layer) 1, from the bottom in this order.

The soil layer 3 and the water retentive soil layer 1 may be each formed by sand of the average particle diameter of 100 μm, and are relatively permeable (permeability coefficient of about $10^{-2}$ cm/sec, for example).

For example, the water shield layer 2 is formed by water repellent sand that may be obtained by applying water repellent treatment to sand of the original soil in accordance with a production method to be described later. Such water repellent sand is layered at a predetermined depth from the ground surface.

The soil layer 3 and the water retentive soil layer 1 are made of sand of the same type as mentioned above. Water supplied from the ground surface is blocked by the water shield layer 2 and does not flow further downward, thereby being retained in the sand layer on the water shield layer 2. The layer on the water shield layer 2 is accordingly referred to as the water retentive soil layer 1 herein.

In a case where the soil structure 6 is utilized as farmland for plant cultivation, the water shield layer 2 is provided so as to have a depth from the ground surface being lower than roots of the plant. For example, if the roots of the plant have the maximum length of 50 cm, the water shield layer 2 is positioned at the depth of 50 cm or more from the ground surface. In the first embodiment, the water shield layer 2 is formed to be 5 cm deep, for example.

In a case where a large amount of rainwater is provided on the ground surface in a short period of time, the water shield layer 2 may not bear the weight of the rainwater and thus be broken. In order to avoid this, the drain holes (water repellent soil bodies) 4 are provided to penetrate the water shield layer 2, so that the water retentive soil layer 1 and the soil layer 3 are connected to each other and excessive water flows from the water retentive soil layer 1 to the soil layer 3.

The expressions such as "breakage" and "collapse" herein do not mean destruction or deformation of the soil body itself. If water held on a layer of hydrophobic particles has a water pressure exceeding the water infiltration pressure, water enters gaps in the layer of hydrophobic particles and forms a non-uniform flow of water, which serves as a water path and penetrates the sand layer. Such a state is referred to as "breakage" or "collapse". In other words, these expressions indicate the state where water having received predetermined pressure enters the layer of hydrophobic particles.

Unlike the conventional art, the drain holes 4 are not formed by a composition the same as that of the soil layer 3. The drain holes 4 are formed by water repellent particles larger in diameter than sand particles of the water shield layer 2, and thus serve as water repellent soil bodies. The portions referred to as the "drain holes" herein are not physically holes but soil portions that are formed of hydrophobic particles formed into a columnar shape to serve as drain holes (i.e., they have both a water repellent function and a drainage function).

Figure 19A:
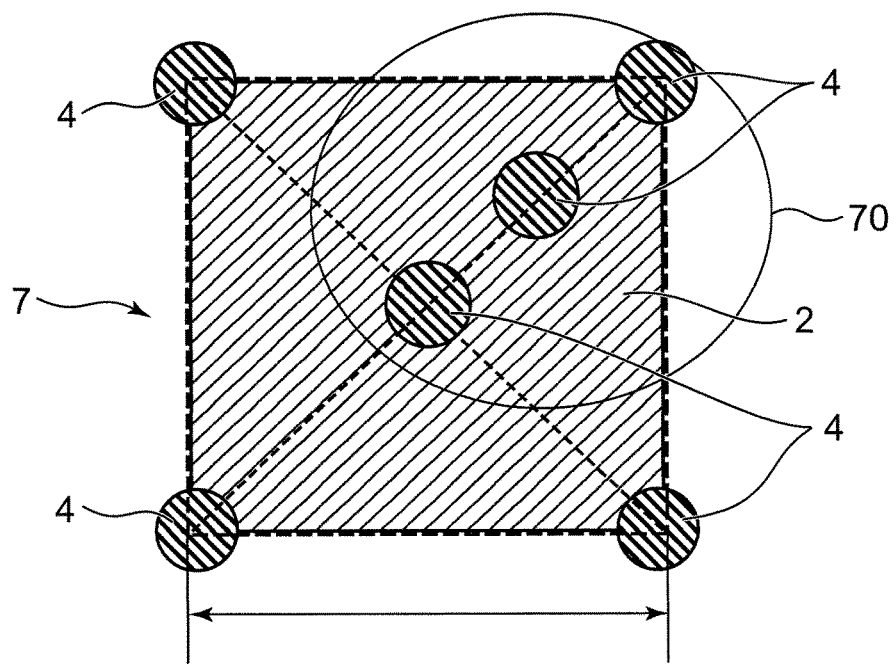
FIG. 19A is a plan view showing the drain holes and the water shield layer of the artificial soil structure according to the first embodiment of the present invention, in an example of providing the drain holes at partially different density.

Described below are the detailed specifications and a construction method of the drain holes 4. Locations and sizes of the drain holes 4 are determined appropriately in accordance with the amount of water reserved in the water retentive soil layer 1 or the speed or the amount of water to be discharged through the drain holes 4. In the case of providing a plurality of drain holes 4, these drain holes 4 are not necessarily the same in size but may be sized differently. For example, the drain holes 4 in a portion 70, which desirably has better drainage performance, may be made larger than the drain holes 4 in other portions, or alternatively, may be provided at higher density than the drain holes 4 in the other portions, so as to adjust the draining speed (see FIG. 19A). More specifically, in a case of partially adjusting the draining speed due to the site conditions (water tends to flow into a certain region from its periphery and be reserved therein, water tends not to flow into a certain region and is reserved at low speed, or the like), the drain holes 4 may be increased in number in and around such a region. FIG. 19A depicts the case of discharging water at higher speed in a portion denoted by reference numeral 70. Such locations realize adjustment of reserved water to a desired amount even if water is supplied at different speed in a particular region.

Figure 19B:
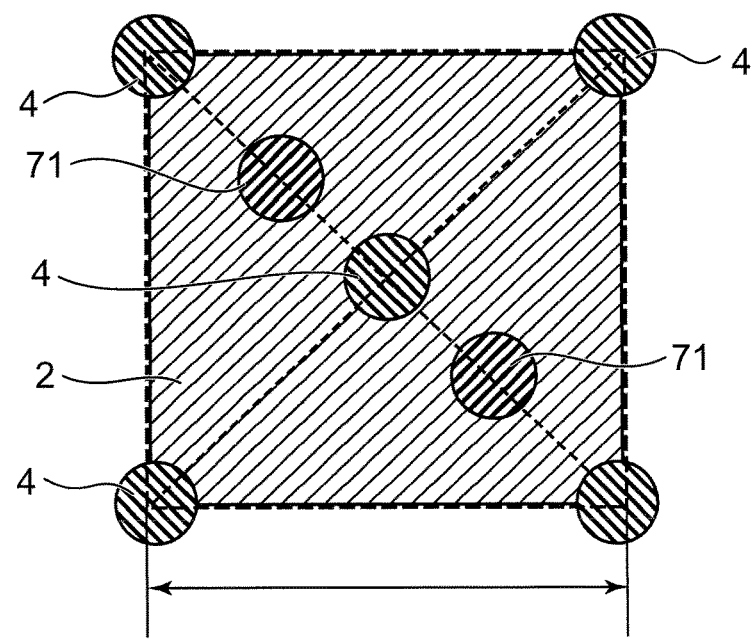
FIG. 19B is a plan view showing the drain holes and the water shield layer of the artificial soil structure according to the first embodiment of the present invention, in an example of including auxiliary drain holes.
Figure 19C:
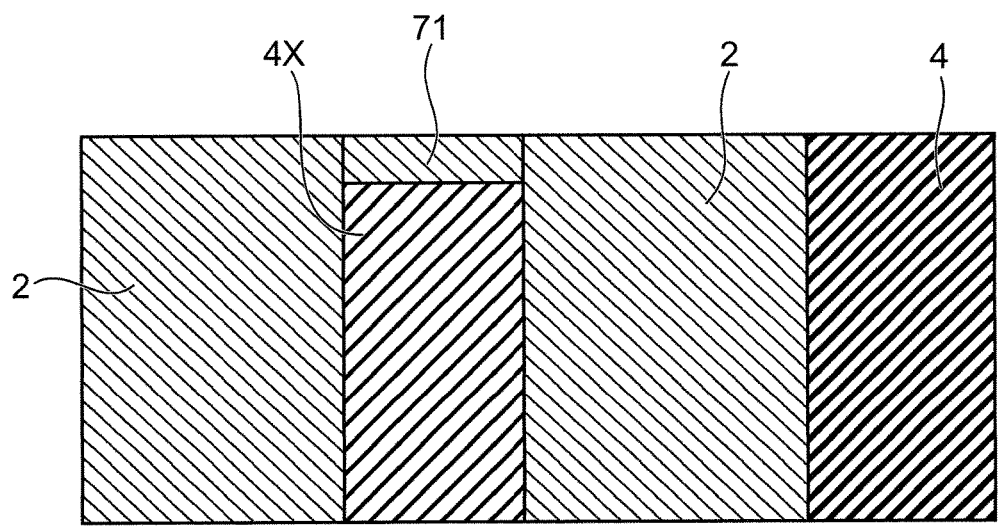
FIG. 19C is a sectional view of the example of including the auxiliary drain holes in the artificial soil structure according to the first embodiment of the present invention.

Alternatively, there are supplementarily provided auxiliary drain holes (formed by coarser sand, for example) having critical water levels lower than those of the drain holes 4, and the auxiliary drain holes 4X are provided at upper ends with lids 71, respectively, so as to usually prevent water from flowing through the auxiliary drain holes 4X (see black circles 71 in FIG. 19B and a portion denoted by reference numeral 71 in FIG. 19O). Instead of providing the lids 71, the auxiliary drain holes 4X may be covered only on upper surfaces with finer water repellent sand as in the peripheral water shield layer 2. If there is a risk that the water shield layer 2 might be broken due to too much reserved water after a predetermined period of use in the structure described above, the water retentive soil layer 1 is dug only at locations of the auxiliary drain holes 4X, the lids 71 of the auxiliary drain holes 4X are removed (or the finer water repellent sand is dug and removed), and the water retentive soil layer 1 is relocated. The auxiliary drain holes 4X can then serve as drain holes 4. In this manner, reconstruction can be made easily if an expected amount of water is not reserved after the start of use.

In a case of discharging water through the drain holes 4 toward an opening of an underground drain pipe, the drain holes 4 placed correspondingly to the opening of the drain pipe may be made larger than the drain holes 4 in other portions or may be provided at higher density than the drain holes 4 in the other portions. In a case of supplying water at a first end and discharging water at a second end in a region where the soil structure 6 is formed on the ground surface, the drain holes 4 at the first end may be made smaller than the drain holes 4 in the other portions or the drain holes 4 at the second end may be provided at lower density than the drain holes 4 in the other portions, so as not to discharge water and so as to easily supply water in the other portions. On the other hand, in order to improve drainage performance at the second end in the region where the soil structure is formed, the drain holes 4 at the second end may be made larger than the drain holes 4 in the other portions or may be provided at higher density than the drain holes 4 in the other portions.

FIG. 1B is a plan view, seen from above, of the water shield layer 2 and the drain holes 4 of the artificial soil structure 6 of FIG. 1A. For example, in a case of reforming a square ground of 5 m square as a soil structure formation region into an artificial soil structure 6 including water retentive soil, drain holes 4 of 20 cm in diameter or the like as one example are provided at five positions, namely, at the respective corners and the center of a water shield layer 2 in a square shape. The cross section indicated by dotted lines in FIG. 1B is entirely occupied by the water shield layer 2, and circular cross sections filled with oblique lines are the drain holes 4, which are provided at the respective corners and the center of the water shield layer 2.

FIG. 2 is a flowchart of a procedure of forming the artificial soil structure 6.

In a case of providing the drain holes 4 at the positions indicated in FIG. 1B and the water shield layer 2 at 50 cm deep from the ground surface, soil on site is dug approximately to the depth obtained by adding the thickness t (cm) of the water shield layer 2 to the distance from the ground surface to the water shield layer 2, and the soil thus dug is partially collected for water repellent treatment (step S50). For example, in a case of providing the water shield layer 2 of 5 cm thick, soil of approximately 55 cm thick is collected and sand of 5 cm+α (α corresponds to 2 to 3 cm thick) for the water shield layer is separated therefrom so as to be subject to water repellent treatment.

Subsequently, the soil separated to be subject to water repellent treatment is sifted so as to be sorted into particles of different diameters (step S51). For example, the soil may be sorted into particles of five sizes in diameter by sequentially using four sifters of 0.2 mm, 0.4 mm, 0.6 mm, and 0.8 mm.

Figure 3:
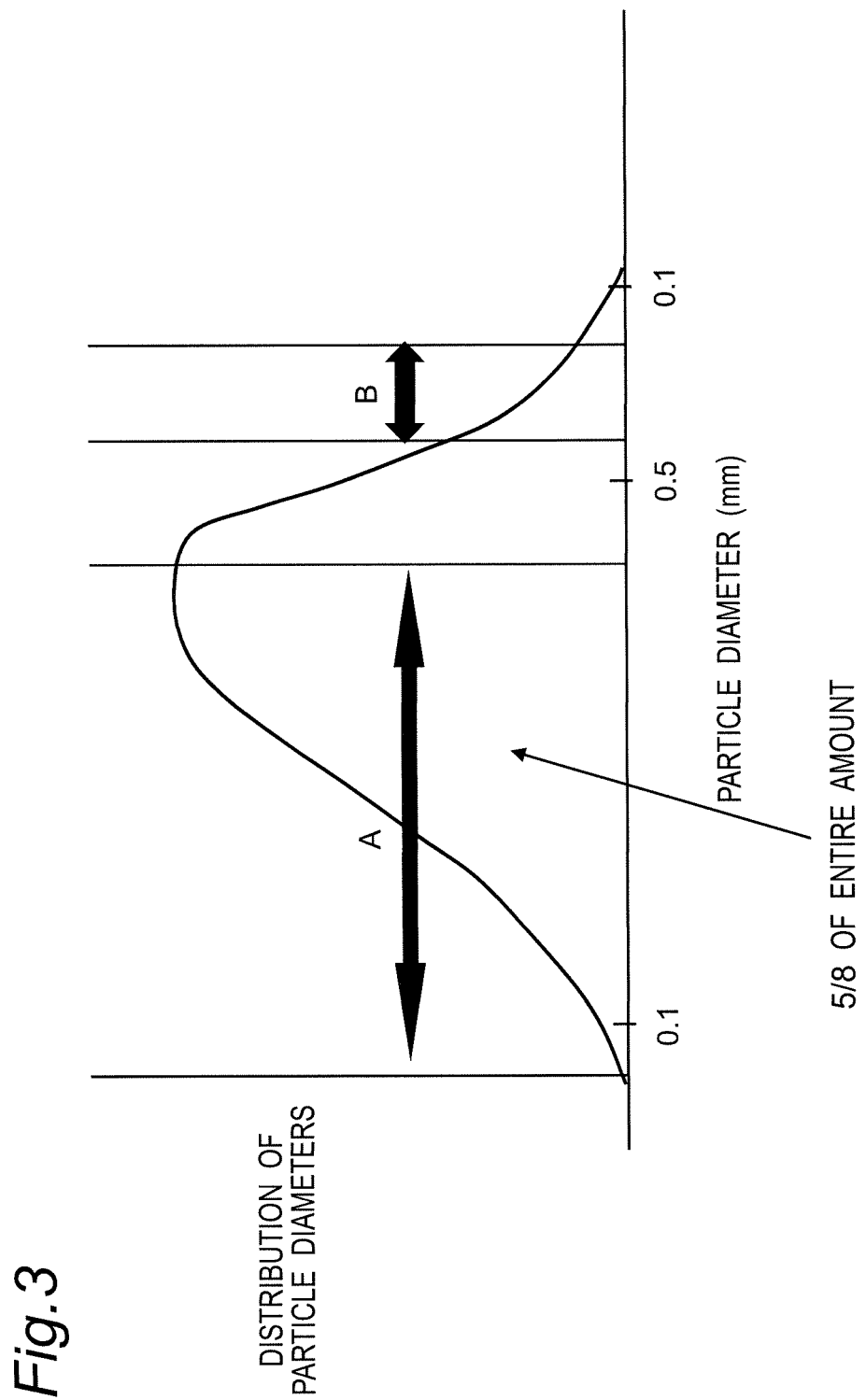
FIG. 3 is a graph indicating an example of relationship between particle diameters of soil and distribution of the particle diameters.

Extracted from the soil thus sorted are finer soil to be used in the water shield layer 2 and coarser soil to be used in the drain holes 4. For example, assume a case where diameters of most particles in sand on site range from 0.1 mm to 1 mm and are distributed as indicated in FIG. 3.

In a case where soil of 8 cm thick is collected for the expected water shield layer 2 of 5 cm thick, finer soil equivalent to 5/8 of the entire soil thus collected (soil distributed in a section A of FIG. 3) is used for the water shield layer, and a part of the remaining coarser soil particles (about 1/50 of the remaining soil) is used for the drain holes, for example. Soil of about 5/8 in finest soil (for example, the soil of 0.4 mm or less in diameter in the section A of FIG. 3) and relatively coarser soil (for example, a part of soil of 0.6 mm to 0.8 mm in a section B) are extracted to be subject to water repellent treatment, and the remaining soil is returned onto the dug surface.

Figure 4:
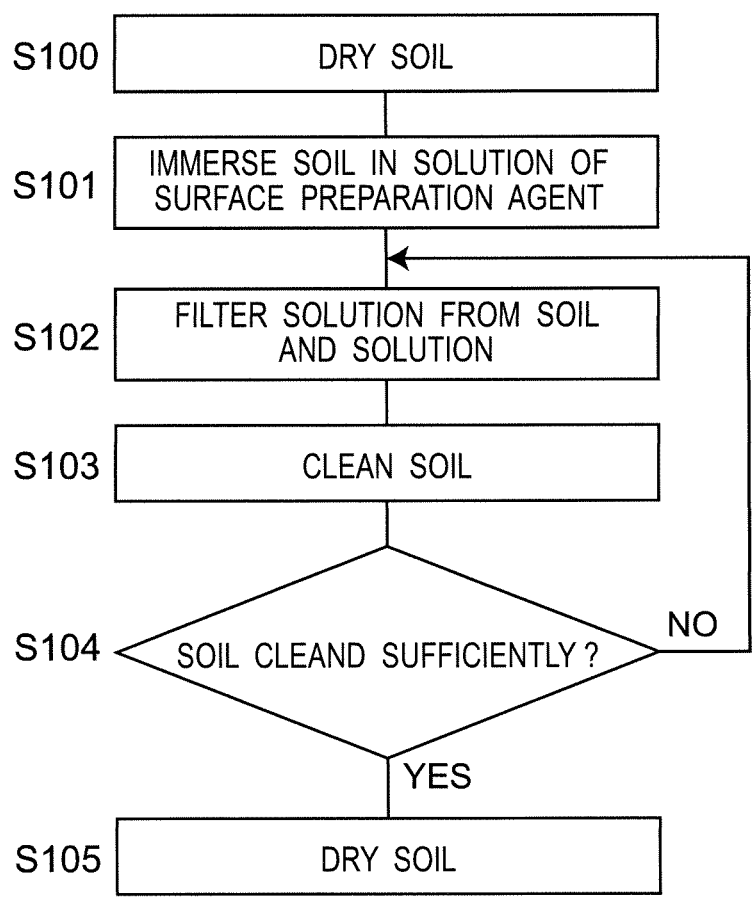
FIG. 4 is a flowchart of a procedure of producing water repellent sand for the artificial soil structure according to the first embodiment of the present invention.

FIG. 4 shows a procedure of the water repellent treatment (step S53).

Soil to be subject to water repellent treatment is dried initially (step S100). Soil is dried by placing a drying room or a drier near the region to form the artificial soil structure, or is dried naturally by solar heat or the like.

The soil is weighed during the drying process, which ends if the weight of the soil becomes unchanged for a unit period. In the case of drying with use of a drying room or a drier, the soil is preliminarily inserted into the drying room or the drier along with a gravimeter and a container, and is dried in the drying room or the drier constantly having high temperature while checking temporal change in weight. For example, sand in a container is dried while being stirred in the drying room or the drier set to about 50° C., and the drying process ends if the weight of the soil becomes unchanged for one hour. In the case of natural drying, soil is dried by solar light. In this case, a part of the soil as a sample is laid to be several centimeters high (3 cm, for example) in a container, and the container is placed on a gravimeter and is left outside. The soil of 3 cm thick from the surface is regarded as having been dried if the weight of the soil becomes unchanged for one hour. The dried soil is collected and the soil therebelow is dried naturally in the same manner.

The dried soil is then immersed in solution of a surface preparation agent (step S101). Examples of the solution of the surface preparation agent include a fluorine system solvent or a hydrocarbon system solvent. In a case where soil is immersed still without being stirred, the soil is left in the solution for about one day and then the solution is filtered (step S102).

After the filtering process, the soil is cleaned in surface preparation agent detergent (step S103). For example, in the case of using a fluorine system surface preparation agent, used as cleaning solution is a fluorine system solvent such as Fluorinert (registered trademark) or Novec (registered trademark). In the other case of using a hydrocarbon system surface preparation agent, a liquid mixture of hexane or hexadecane and chloroform may be used as cleaning solution. This process ends if the partially extracted soil thus cleaned is visually recognized as repelling the detergent. In a case where the surfaces of the soil particles look still wet with the detergent, filtering and cleaning are repeated until the detergent is recognized as being repelled (step S104).

When the surface of the soil is visually recognized as repelling the detergent, the soil is dried (step S105), and the water repellent treatment process ends if the soil gets dried.

The soil particles are covered with thin films by this water repellent treatment, and it is possible to obtain water repellent soil without affecting the sizes, the shapes, or the color of the original soil particles. Furthermore, this water repellent treatment is not made by physical coating with a water repellent agent, and is thus strong so as not to be scraped off.

Then in step S53, the soil structure 6 is constructed with use of water repellent sand thus treated. FIGS. 5A to 5H depict the construction procedure. The water repellent sand configuring the drain hole 4 cannot be tamped and thus cannot be treated similarly to ordinary soil. The following construction procedure is accordingly effective for constructing the soil structure 6.

Figure 5A:
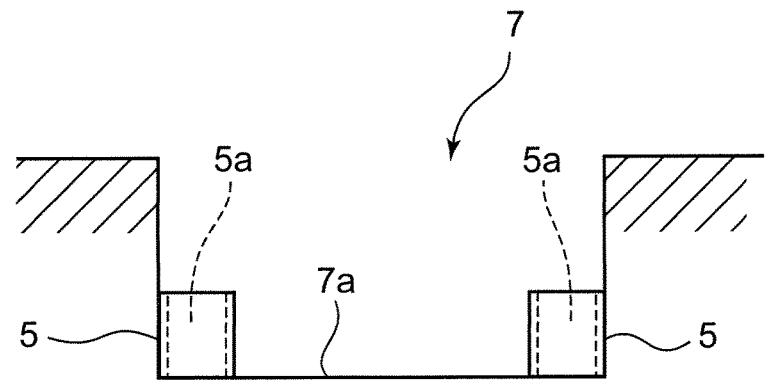
FIG. 5A is a sectional view showing a process of forming the artificial soil structure according to the first embodiment of the present invention.
Figure 5B:
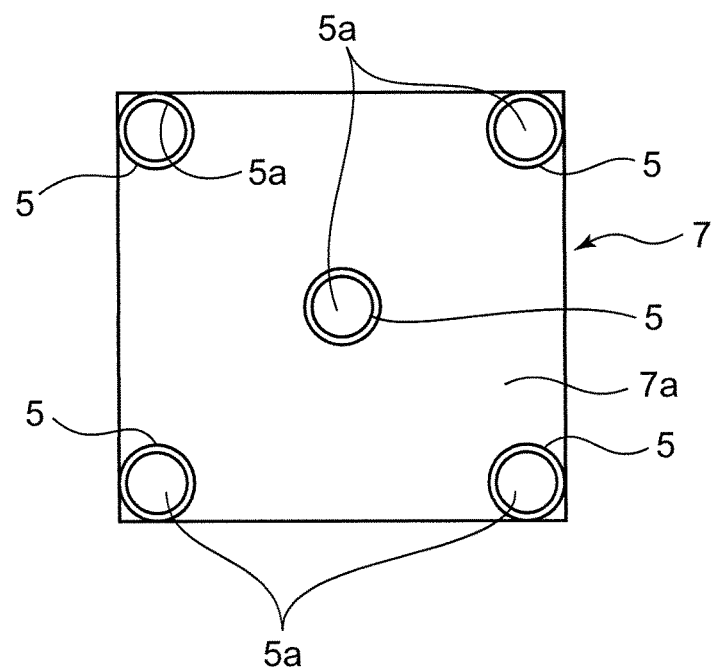
FIG. 5B is a plan view corresponding to FIG. 5A.

FIG. 5A is a sectional view, seen from a side surface, of the soil structure 6 of FIG. 1B. FIG. 5B is a plan view, seen from the upper surface, of the soil structure 6 of FIG. 1B.

Cylindrical molds 5, each having a through hole 5a, for the drain holes 4 are initially placed on a dug ground (the surface of the soil layer 3) 7a in a ground surface region where the soil structure 6 is to be formed (soil structure formation region) 7 (step S54, FIGS. 5A and 5B). For example, in a case of providing the drain holes 4 having 20 cm in diameter, the drain hole mold 5 has a cylindrical shape provided with the through hole 5a and having 20 cm in diameter and 5 cm in height. For example, if the cylindrical mold is thinner, because a gap formed after the mold is removed can be thinner. For example, the mold may be 1 mm thick so as to provide a cylindrical shape by being bent. The drain hole mold 5 may be made of any material, and may be produced with plastic, for example. The drain hole molds 5 are placed respectively at five positions to form the drain holes 4, namely, the four corners and the center, in the soil structure formation region 7 of 5 m square. Coarser soil sorted in the section B of FIG. 3 and having been processed by water repellent treatment (water repellent sand) is inserted into the drain hole molds 5 (step S55).

Figure 5C:
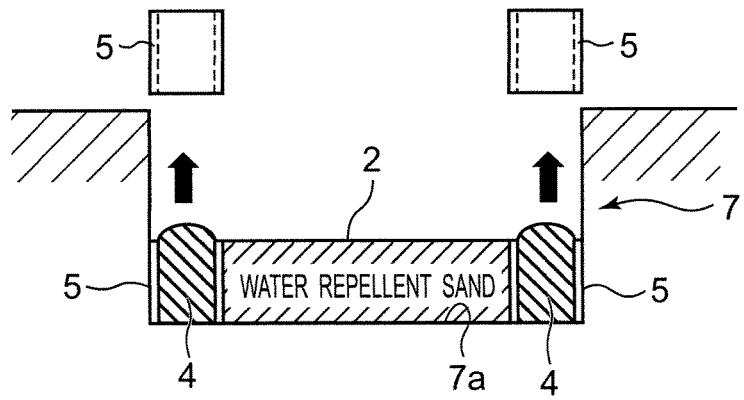
FIG. 5C is a sectional view showing a process subsequent to FIG. 5A of forming the artificial soil structure according to the first embodiment of the present invention.
Figure 5D:
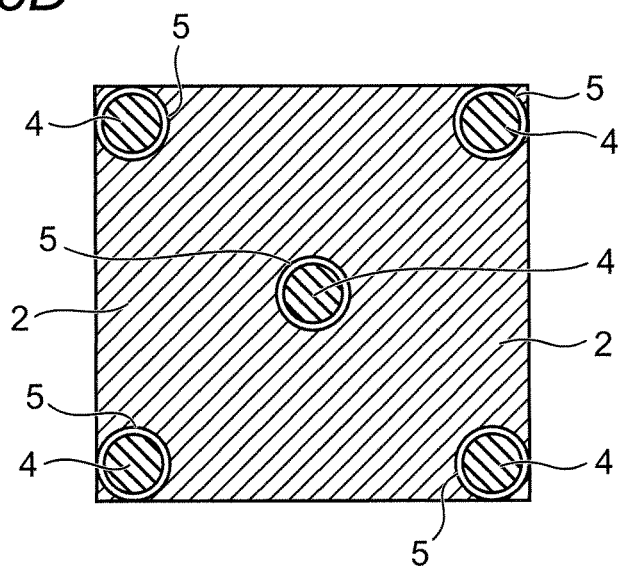
FIG. 5D is a plan view corresponding to FIG. 5C.

Subsequently, in the portions other than the portions provided with the drain hole molds 5 in the soil structure formation region 7, finer sand sorted into the section A of FIG. 3 and having been processed by water repellent treatment is provided to the height equal to that of the drain hole molds 5 so as to form the water shield layer 2 (step S56, FIGS. 5C and 5D).

Figure 5E:
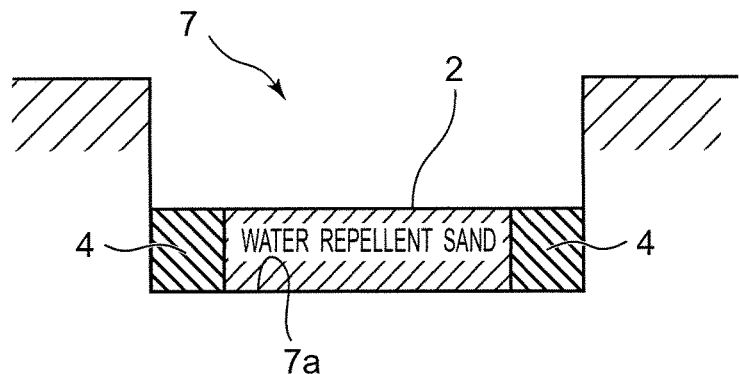
FIG. 5E is a sectional view showing a process subsequent to FIG. 5C of forming the artificial soil structure according to the first embodiment of the present invention.
Figure 5F:
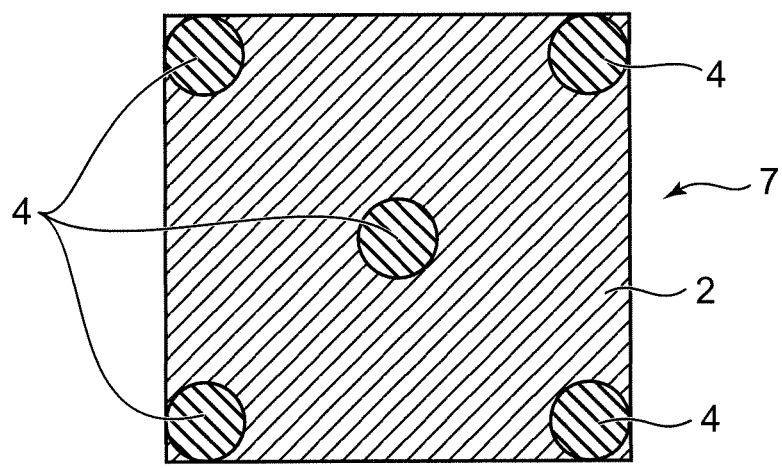
FIG. 5F is a plan view corresponding to FIG. 5E.
Figure 5G:
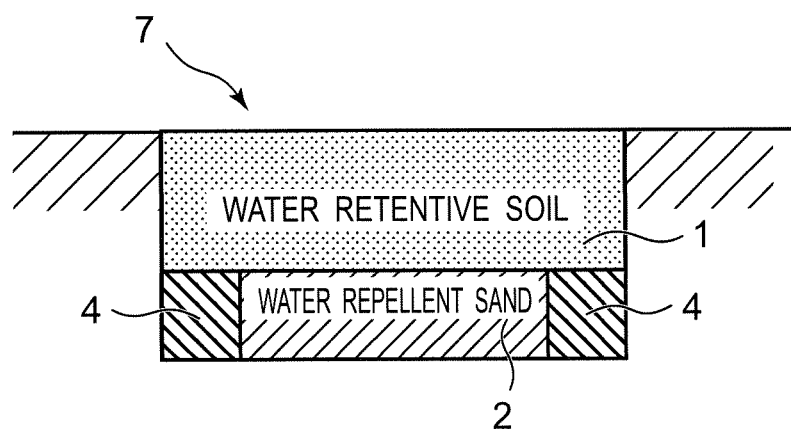
FIG. 5G is a sectional view showing a process subsequent to FIG. 5E of forming the artificial soil structure according to the first embodiment of the present invention.
Figure 5H:
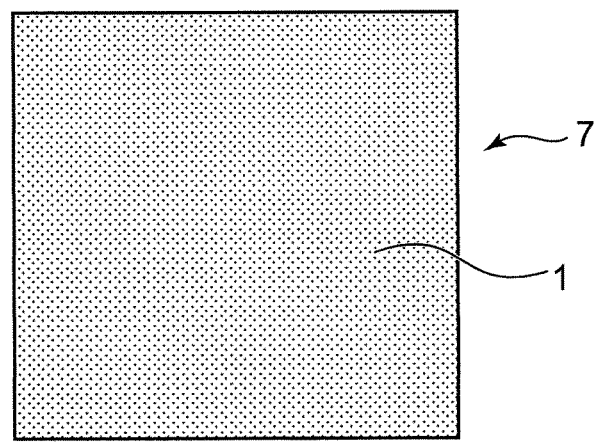
FIG. 5H is a plan view corresponding to FIG. 5G.

After the sand for the water shield layer 2 and the sand for the drain holes 4 are provided to be 5 cm high, the drain hole molds 5 are removed (step S57, FIGS. 5E and 5F). In order to eliminate narrow gaps formed between the sand for the water shield layer 2 and the sand for the drain holes 4 after the drain hole molds 5 are removed, pressure is applied from above toward the boundaries and the vicinities between the sand for the water shield layer 2 and the sand for the drain holes 4.

The soil dug initially is then returned to cover the water shield layer 2 and the drain holes 4. More specifically, the soil dug initially is provided on the water shield layer 2 and the drain holes 4 in the soil structure formation region 7, thereby to form the water retentive soil layer 1 (step S58, FIGS. 5G and 5H).

In the method described above, the cylindrical molds are made of plastic, which cannot be processed by water repellent treatment and thus allow water to flow therethrough. If the molds are not removed, water permeates the cylindrical portions and the water retentive property thus deteriorates. This is why the molds 5 for water repellent sand are removed. If the cylindrical molds are made of a material that can be processed by water repellent treatment, such as Teflon (registered trademark), the water repellent sand molds 5 may not be removed but be left with no influence on the water retentive property. In such a case where the water repellent sand molds 5 are left in the ground, there is no need to apply pressure to the boundaries and the vicinities between the sand for the water shield layer 2 and the sand for the drain holes 4.

This method of forming a soil structure enables construction of forming the water repellent soil for the drain holes 4 penetrating the water shield layer 2 separately from the peripheral water repellent soil for the water shield layer 2. The water repellent soil for the drain holes 4 and the water repellent soil for the water shield layer 2 are not mixed together even though the water repellent soil for the drain holes 4 cannot be tamped by itself.

Figure 6A:
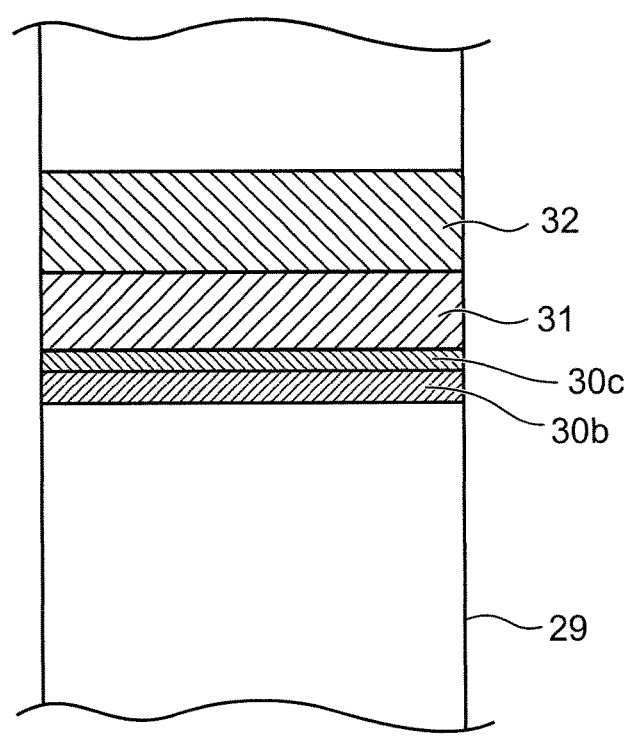
FIG. 6A is a view depicting a test for checking a critical water level of each of sand layers.
Figure 6B:
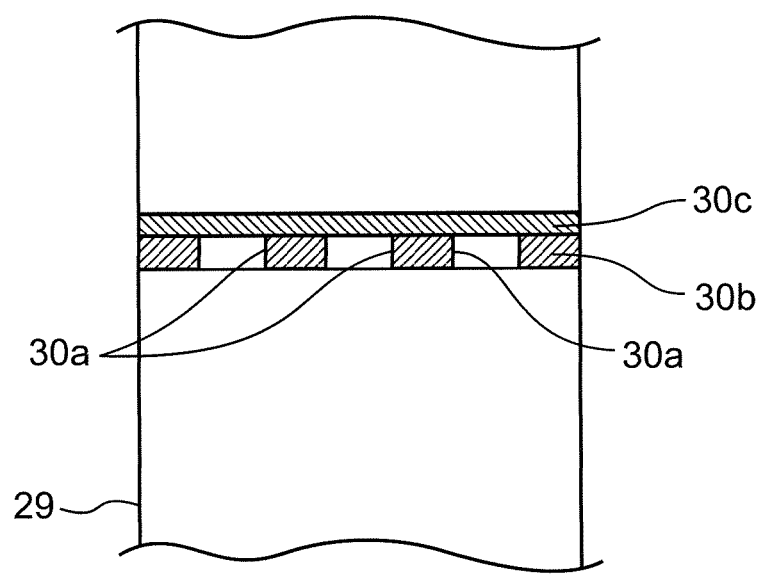
FIG. 6B is an enlarged view depicting the test for checking the critical water level of each of the sand layers.

FIGS. 6A, 6B, and 7A show a water permeation test and its results on a sand layer 31 of water repellent sand (1) having the average particle diameter of 0.03 mm, water repellent sand (2) having the average particle diameter of 0.15 mm, water repellent sand (3) having the average particle diameter of 0.8 mm, or sand with no water repellency (4) having the average particle diameter of 0.15 mm. In this test, an aluminum plate 30b having several holes 30a of about 5 mm in diameter is fixed in a glass cylinder 29, and a nonwoven fabric 30c of grain of 0.01 m is placed on the aluminum plate 30h, so as to form a mechanism in which water flows through the nonwoven fabric 30c whereas sand and soil are piled on the nonwoven fabric 30c. The sand layer 31 is provided on the nonwoven fabric 30c, and water 32 of a certain amount per unit period (specifically, 10 mm in every five minutes) is supplied thereon. When the sand layer 31 is broken and water starts to flow through to reach under the sand layer 31, water infiltration pressure (hereinafter, referred to as "critical water level") was measured.

Water repellent sand (water repellent glass) having the average particle diameter of 0.03 mm (see (1) of FIG. 7A) had a critical water level of 100 cm. Water repellent sand (water repellent glass) having the average particle diameter of 0.105 mm (see (2) of FIG. 7A) had a critical water level of 29 cm. Water repellent sand (Toyoura sand with water repellency) having the average particle diameter of 0.15 mm (see (3) of FIG. 7A) had a critical water level of 21 cm. Water repellent sand (water repellent sea sand) having the average particle diameter of 0.8 mm (see (4) of FIG. 7A) had a critical water level of 10 cm. Sand with no water repellent treatment (Toyoura sand with no water repellency) and having the average particle diameter of 0.15 mm (see (5) of FIG. 7A) had a critical water level of 2 cm.

Also checked was whether or not the sand of three types, namely, the water repellent sand (1), the water repellent sand (2), and the water repellent sand (3), could block salt water rising from the underground. FIG. 7B is a view of the test. Sand with no water repellent treatment for the water shield layer 2 could not block rise of salt. On the other hand, the water repellent sand (1), the water repellent sand (2), and the water repellent sand (3), all of which have been processed by water repellent treatment, could block rise of salt. The condition of the test is shown in FIG. 7B.

In this test, in each of two containers 38 provided with legs 37, similarly to the test of FIG. 6A, the aluminum plate 30b having several holes 30a of about 5 mm in diameter is fixed, and a nonwoven fabric 30c of grain of 0.01 m is placed on the aluminum plate 30b. On the nonwoven fabrics 30c, a sand layer 34 made of Toyoura sand with no water repellent treatment and having the height of cm is provided in one of the containers 38 (soil structure B), while a sand layer 33 made of water repellent sand and having the height of 5 cm and a sand layer 34 thereon, made of Toyoura sand with no water repellent treatment and having the height of 10 cm, are provided in the other container 38 (soil structure A). These two containers 38 were immersed and left in 4% salt water 35 provided in a salt water container 39, to measure salt content rates of the soil structures A and B. FIG. 70 indicates the results. The water repellent sand (1), the water repellent sand (2), and the water repellent sand (3) were each applied as the water repellent sand in the soil structure A. In any of these cases, the salt content rate of the soil structure A was 0% and the soil structure A contained no salt water after one week. On the other hand, the salt content rate of the soil structure B was about 3% and the salt water 35 rose into the soil 34 after one week.

Figure 8A:
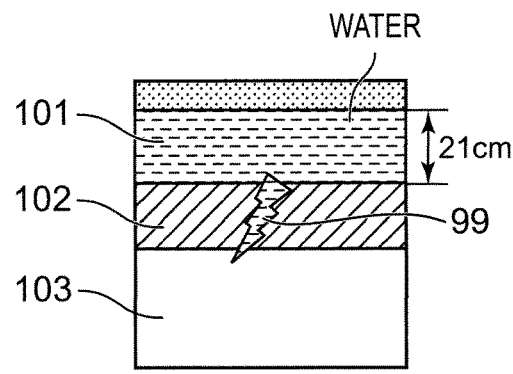
FIG. 8A is a schematic sectional view of a state where a water shield layer is broken when water is reserved in a water retentive soil layer over a critical water level thereof in a conventional soil structure shown in FIG. 35.
Figure 35:
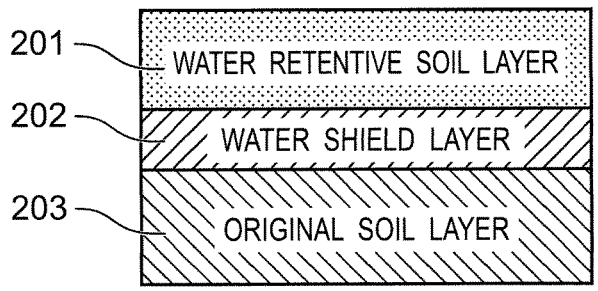
FIG. 35 is a sectional view of the artificial soil structure proposed in JP 06-113673A.

Assume a case where a conventional soil structure shown in FIG. 35 includes a water shield layer 102 made of water repellent sand having the average particle diameter of 0.15 mm. According to the above results, when a water retentive soil layer 101 reserves water exceeding its critical water level of 21 cm as shown in FIG. 8A, the water shield layer 102 may be possibly broken. FIG. 8A shows a portion 99 cracked by water. It is impossible to specify the position of the cracked portion.

Figure 8B:
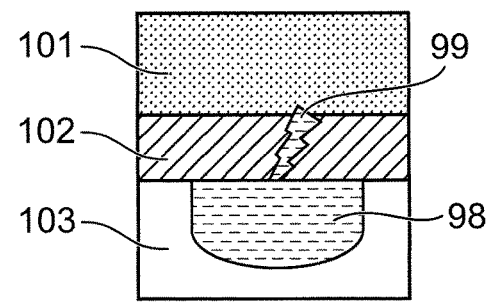
FIG. 8B is a schematic sectional view of a state where, after the water shield layer has been broken as in FIG. 8A, water flows downward through the broken portion to reach under the water shield layer and the water retentive soil layer reserves no more water.
Figure 8C:
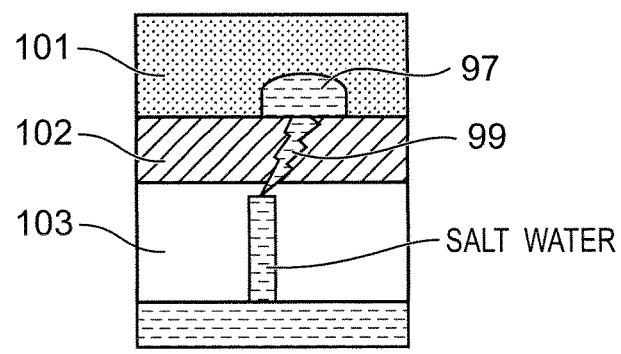
FIG. 8C is a schematic sectional view of a state where, after the water shield layer has been broken as in FIG. 8B, salty ground water rises to enter the water shield layer through the broken portion.

When the water shield layer 102 is broken, as shown in FIG. 8B, water flows through the broken portion 99 and reach under the water shield layer 102, and water reserved in the water retentive soil layer 101 cannot stay therein but flows downward, with a result that an original soil layer 103 is provided with a portion 98 filled with the water flowing from above. The broken portion may be difficult to be mended depending on its position. As indicated by a portion denoted by reference numeral 97 in FIG. 8C, salty ground water rises into the water shield layer 102 through the broken portion 99. It is thus difficult to prevent salt damage.

Figure 9A:
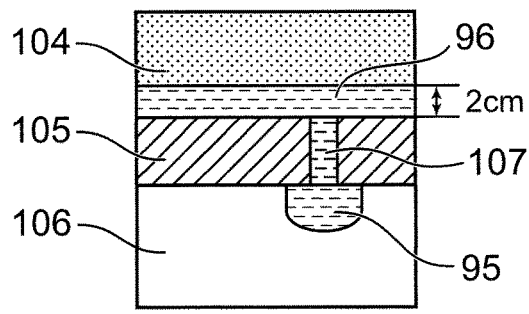
FIG. 9A is a schematic sectional view of a state where water flows through a drain hole when water is reserved in a water retentive soil layer over a critical water level thereof in another conventional soil structure shown in FIG. 36.
Figure 9B:
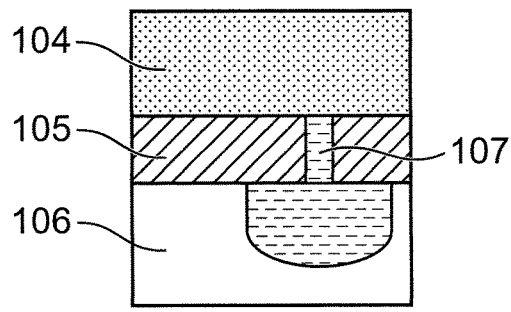
FIG. 9B is a schematic sectional view of a state where water in the water retentive soil layer entirely flows to reach under a water shield layer when supply of water stops from the state of FIG. 9A.
Figure 9C:
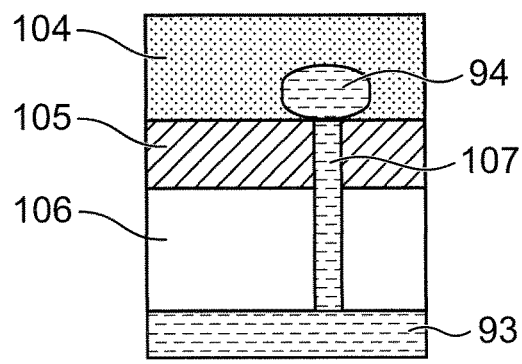
FIG. 9C is a schematic sectional view of a state where salty ground water rises to enter the water shield layer through the broken portion in the conventional soil structure of FIG. 9A.
Figure 36:
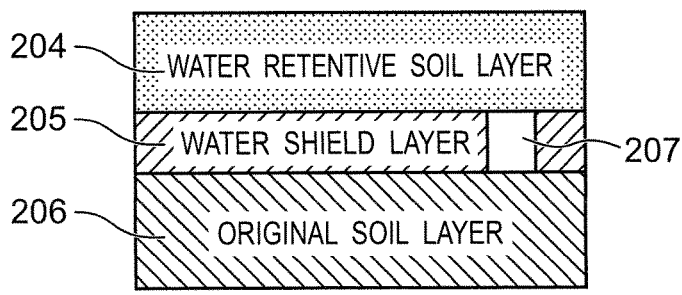
FIG. 36 is a sectional view of the soil structure proposed in JP 06-62666A.

In another conventional soil structure shown in FIG. 36, when a drain hole 207 is made of soil with no water repellent treatment (ordinary soil), it is possible to prevent breakage of a water shield layer 205 as in FIG. 35. As shown in FIG. 9A, immediately after water starts to be supplied into the water retentive soil layer 104 on the water shield layer 105 (see water denoted by reference numeral 96 in FIG. 9A), water exceeding a critical water level of 2 cm or the like flows to reach under the water shield layer 105 (see water denoted by reference numeral 95 in FIG. 9A), leading to deterioration in water retentive efficiency of the water retentive soil layer 104. When supply of water stops, as shown in FIG. 9B, the water in the water retentive soil layer 104 entirely flows to reach under the water shield layer 105. In addition to such a defect, as shown in FIG. 9C, salt water 93 rises from the underground through the drain hole 107 to reach the water retentive soil layer 104 (see salt denoted by reference numeral 94 in FIG. 9C). It is thus difficult to prevent salt damage.

Figure 10A:
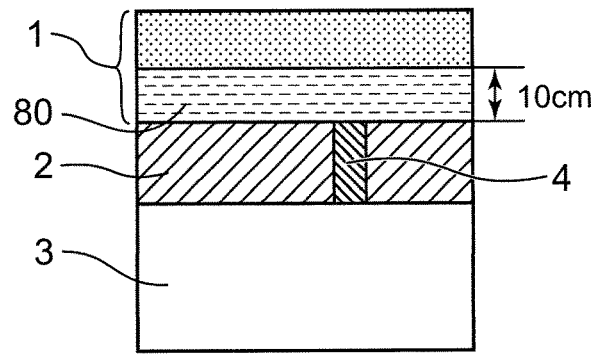
FIG. 10A is a schematic sectional view of a state where a water retentive soil layer reserves water not exceeding the critical water level in an example of the artificial soil structure according to the first embodiment of the present invention.
Figure 10B:
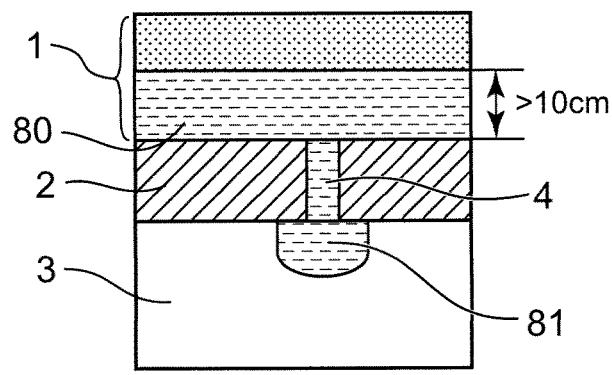
FIG. 10B is a schematic sectional view of a state where, when the water retentive soil layer reserves water over the critical water level, the drain hole is broken and water flows through the drain hole to reach under the water shield layer in the example of the artificial soil structure according to the first embodiment of the present invention.
Figure 10C:
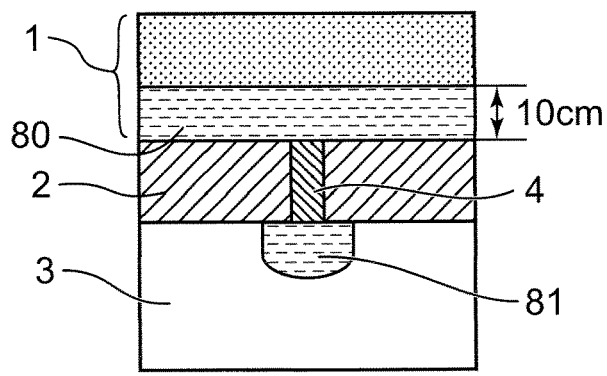
FIG. 10C is a schematic sectional view of a state where the water retentive soil layer reliably reserves again water not exceeding the critical water level once a water path is cut off (when the water repellent sand having been serving as the water path in the drain hole is dried) in the example of the artificial soil structure according to the first embodiment of the present invention.
Figure 10D:
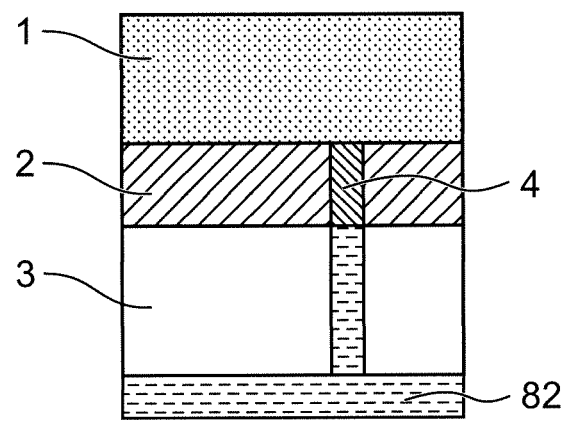
FIG. 10D is a schematic sectional view of a state where, when the drain hole made of the water repellent sand is dried partially, salty ground water is blocked by the drain hole and does not enter the water retentive soil layer in the example of the artificial soil structure according to the first embodiment of the present invention.

On the other hand, there is prepared an example of the soil structure 6 according to the first embodiment shown in FIG. 1A. This soil structure 6 includes the drain holes 4 of FIG. 1A, which are made of the water repellent sand having the average particle diameter of 0.8 mm, as used in the test, and the water shield layer 2 that is made of water repellent sand having the average particle diameter of 0.15 mm. In the soil structure 6 thus configured, the water retentive soil layer 1 reserves water (see reference numeral 80 in FIG. 10A) not exceeding a critical water level of 10 cm or the like (FIG. 10A). When the water retentive soil layer 1 reserves water exceeding 10 cm, the drain hole 4 is broken and water flows through the drain hole 4 to reach under the water shield layer 2 (see reference numeral 81 in FIG. 10B). Even if water exceeding the critical water level of 10 cm is supplied, water flows through the drain hole 4, without breaking the water shield layer 2 itself. Water on the water shield layer 2 flows downward to reach under the water shield layer 2 as long as water fills the water path that is formed by breaking of the drain hole 4 and vertically penetrates the water shield layer 2. Once the water path is cut off (when water repellent sand forming the water path in the drain hole 4 is dried), the water retentive soil layer 1 can again reliably keep water (see reference numeral 80 in FIG. 10C) not exceeding the critical water level of 10 cm (FIG. 10C). Assume another example of the soil structure 6 according to the first embodiment shown in FIG. 1A. This soil structure 6 includes the drain holes 4 made of water repellent sand having the average particle diameter of 0.15 mm, and the water shield layer 2 made of water repellent sand having the average particle diameter of 0.03 mm. In this case, the water retentive soil layer 1 can reserve water up to 21 cm. When the drain holes 4 made of water repellent sand is dried partially, salty ground water 82 is blocked by the drain holes 4 and does not enter the water retentive soil layer 1. It is possible to prevent salt water from rising through the drain holes 4 regardless of the particle diameter. It is thus possible to prevent salt damage that is caused by salt contained in the salt water 82 rising to enter the water retentive soil layer 1 (FIG. 10D).

If the water path is not cut off in the drain hole 4 and water keeps staying, the drain hole 4 may be mended by further applying water repellent treatment to the water repellent sand of the drain hole 4 or by replacing the water repellent sand with water repellent sand of a different particle diameter, in order to improve the water retentive efficiency and to easily cut off the water path. In this case, only the drain hole needs to be mended systematically and efficiently, as in the case of JP 06-62666A.

The water shield layer 2 according to the first embodiment is made of hydrophobic particles. However, the water shield layer 2 in the soil structure 6 thus configured is not necessarily made of the hydrophobic particles if the drain holes 4 is made of hydrophobic particles that realize a higher critical water level (higher by 1.2 times). For example, when the drain holes 4 are made of Toyoura sand with water repellency, which has the critical water level of 21 cm as indicated in FIG. 7A, it is possible to achieve a critical water level equivalent thereto or more. Similar effects will be achieved even in a case where the water shield layer 2 has a concrete structure (usually having a critical water level of 1 m or more) of cement or asphalt bonding.

Described with reference to FIGS. 11A to 11D is a flow of water in the drain hole 4.

Figure 11A:
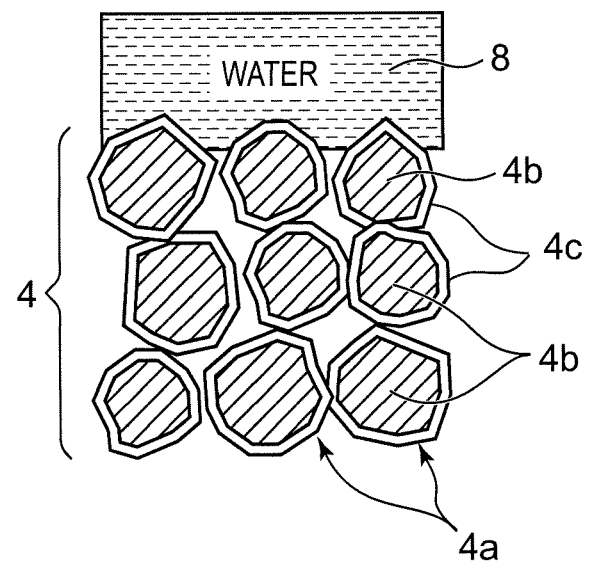
FIG. 11A is an enlarged schematic sectional view of a state where water is blocked at the surface of the drain hole at low water pressure, in the drain hole of the artificial soil structure according to the first embodiment of the present invention.

FIG. 11A shows the drain hole 4 in the soil structure 6 according to the first embodiment. The reference numeral 4a denotes water repellent sand, 4b a sand particle of the water repellent sand 4a, and 4c water repellent coating of the sand particle 4b of the water repellent sand 4a. The reference numeral 8 denotes water on the surface of the drain hole 4. The drain hole 4 thus configured blocks the water on the surface thereof at low water pressure.

Figure 11B:
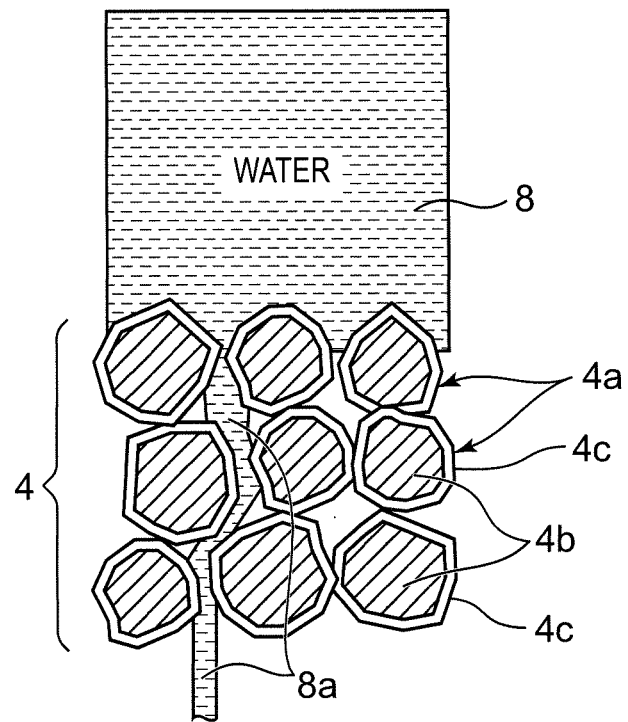
FIG. 11B is an enlarged schematic sectional view of a state where, when water exceeds the critical water level, the drain hole cannot bear its water pressure and allows water to enter the drain hole of the artificial soil structure according to the first embodiment of the present invention.

When the drain hole 4 shown in FIG. 11A is provided with water exceeding its critical water level as shown in FIG. 11B, the drain hole 4 cannot bear pressure of the water and allows entry of water (see a water path 8a in FIG. 11B). Because the water repellent sand particles 4a of the drain hole 4 are processed by water repellent treatment, water does not expand in the drain hole 4 but flows along the narrow water path 8a.

Figure 11C:
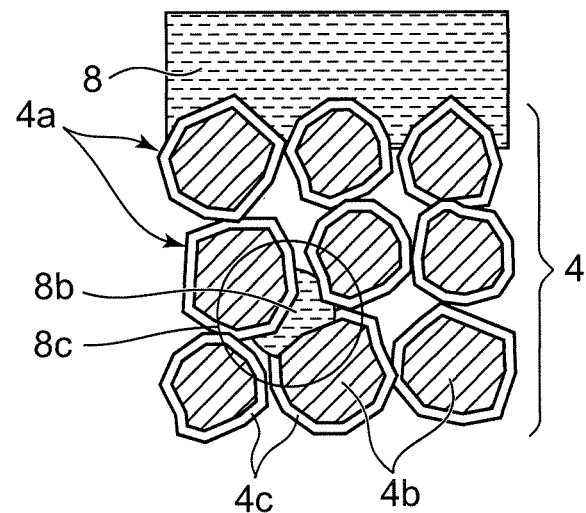
FIG. 11C is an enlarged schematic sectional view of a state where, when water decreases again so as not to exceed the critical water level, water tends to flow unless the water path is cut off, whereas water is blocked again once the water path is cut off at least partially, in the drain hole of the artificial soil structure according to the first embodiment of the present invention.

Subsequently, as shown in FIG. 11C, when water decreases again so as not to exceed the critical water level, water tends to flow unless the water path is cut off, whereas water is repelled again once the water path is cut off partially. There may be left isolated water 8b in the drain hole 4 (see a portion circled and denoted by reference numeral 8c in FIG. 11C).

Figure 11D:
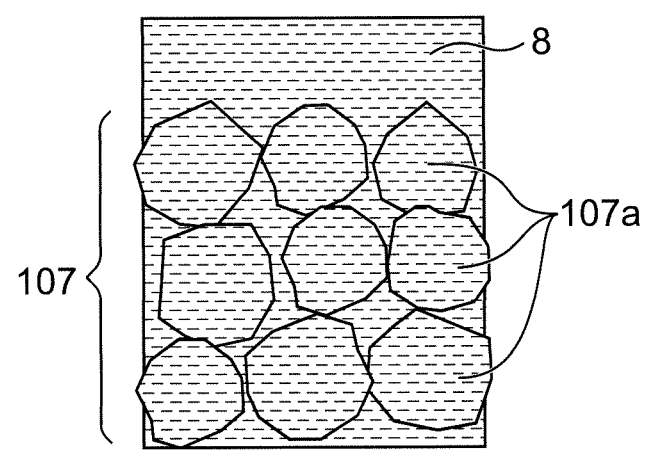
FIG. 11D is an enlarged schematic sectional view of a state where, in a drain hole made of conventional sand with no water repellent treatment (in other words, ordinary sand), water enters while expanding on the entire surface of the sand and occasionally entering the sand.

As shown in FIG. 11D, in the case of the drain hole 107 that is made of conventional sand with no water repellent treatment (in other words, ordinary sand), water enters the drain hole 107 while expanding to surround entire surfaces of sand particles 107a and occasionally permeating the sand particles 107a. Even in a season such as the dry season of relatively small rainfall, when water is desired to be retained without any loss, water may flow through the ordinary soil drain hole 107.

On the other hand, in the soil structure 6 according to the first embodiment, the drain hole 4 is made of the water repellent sand particles 4a. As mentioned above, in a season such as the dry season of relatively small rainfall, when water is desired to be retained without any loss, as well as under low water pressure not exceeding the critical water level, water is blocked by the surface of the drain hole 4 and can be reliably kept above the drain hole 4, more specifically, in the water retentive soil layer 1 provided on the water shield layer 2. When exceeding the critical water level, the drain hole 4 cannot bear the water pressure and allows entry of water. As a result, water is discharged. In this manner, the drain hole 4 serves as a kind of pressure control valve. The drain hole 4 is not necessarily made of the water repellent sand particles 4a. The water repellent sand particles may be replaced with water repellent particles, such as glass beads or synthetic resin beads, which are processed by water repellent treatment. According to the first embodiment, the drain holes 4 are made of hydrophobic particles having diameters larger than the particles forming the water shield layer 2. The drain holes 4 may be alternatively made of a soil mixture including water repellent sand and sand with no water repellency.

The soil structure 6 according to the first embodiment is layered by the soil layer 3 of original soil of the land (on site) where the soil structure 6 is formed, the water shield layer 2 that does not allow water to reach thereunder, and the water retentive soil layer 1 that is made of original soil on site and reserves water blocked by the water shield layer 2, in this order from the bottom. The water shield layer 2 is partially further provided with different soil bodies as the drain holes 4 that penetrate the water shield layer 2 and are in contact with the soil layer 3 and the water retentive soil layer 1. The soil body serving as the drain hole 4 is made of water repellent sand having a critical water level (water infiltration pressure) lower than the critical water level (1.2 times, for example) of the water shield layer 2. When the amount of supplied water is small, by reserving water to eliminate or decrease water reaching under the water shield layer 2, water can be kept in the soil layered on the water shield layer 2, specifically, in the water retentive soil layer 1. On the other hand, when the amount of supplied water is large, water flows downward through the drain hole 4 before the water shield layer 2 is broken. In this manner, excessive water can flow downward without breaking the water shield layer 2. The drain hole 4 made of water repellent sand can also prevent salt from rising to reach the water retentive soil layer 1.

Second Embodiment

Described below is a soil structure 6 according to the second embodiment of the present invention, in which drain holes 4 are made of a soil mixture.

FIG. 12 indicates results of the relationship between strength against water pressure and the mixture ratio of the soil mixture of the drain holes 4, including sand with no water repellency and water repellent sand. FIG. 12 is a chart that indicates broken critical water levels of soil mixtures of different mixture ratios. A soil mixture including sand with no water repellent treatment and water repellent sand at the mixture ratio of 1:3 has the critical water level of 2 cm same as that of sand with no water repellency. There is thus observed almost no effect of mixing water repellent sand. Contrarily, a soil mixture including sand with no water repellent treatment and water repellent sand at the mixture ratio of 1:7 has a critical water level different only by 2 cm from that of soil made only of water repellent sand. Breakage of a water repellent sand layer may not be prevented when the drain holes 4 are made of the soil mixture of this mixture ratio. The critical water level is dependent on the mixture ratio. According to this test, a soil mixture including sand with no water repellent treatment and water repellent sand at a mixture ratio out of the range from 1:3 to 1:7 does not exert the effect of the present invention, that the drain holes 4 serve as kinds of pressure control valves. The appropriate sand mixture includes sand with no water repellent treatment and water repellent sand at a mixture ratio of about 1:5.

Figure 37:
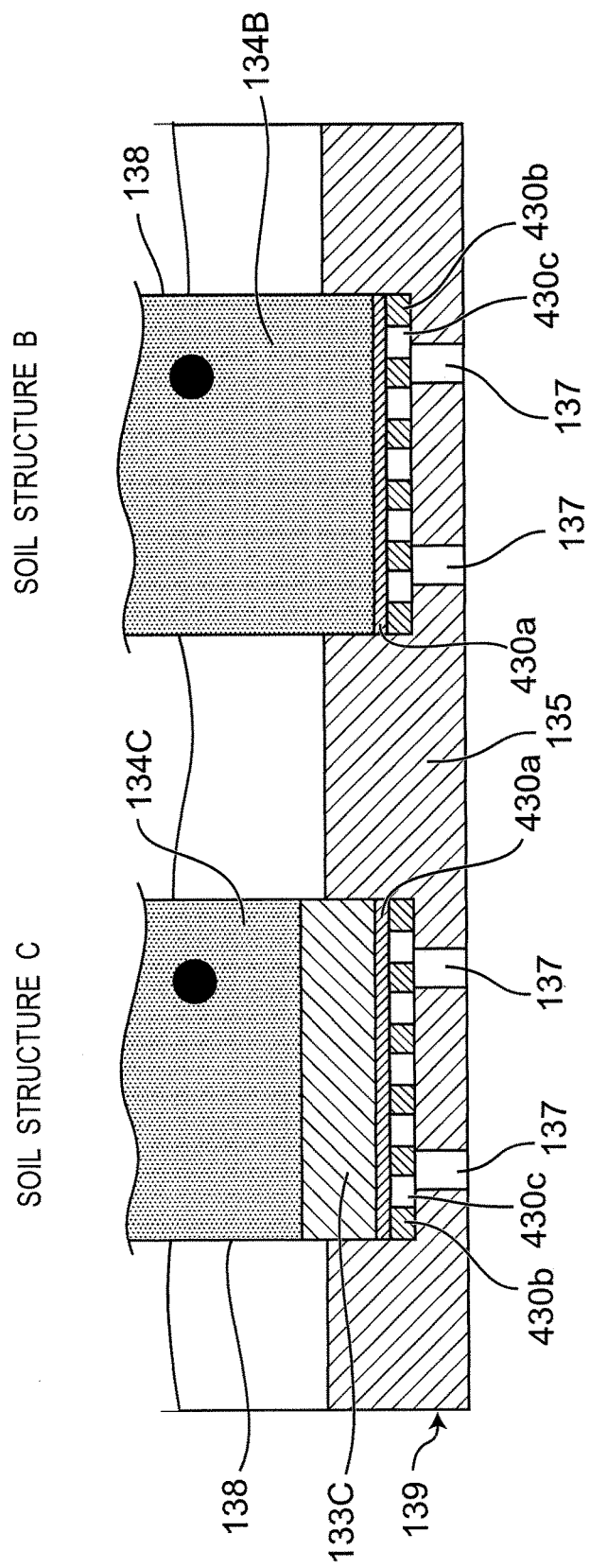
FIG. 37 is a view showing a test for checking whether or not a sand mixture can block salt water rising from the underground.

Also checked was whether or not the sand mixture could block salt water rising from the underground. FIGS. 37 and 38 are a view of the test and a chart indicating the results. In this test, similarly to the test of FIG. 7B, an aluminum plate 430b having several holes 430a of about 5 mm in diameter is fixed in each of two containers 138 provided with legs 137, and a nonwoven fabric 430c of grain of 0.01 m is placed on the aluminum plate 430b. On the nonwoven fabrics 430c, as in FIG. 7B according to the first embodiment, a sand layer 134E made of Toyoura sand with no water repellent treatment and having the height of 15 cm is provided as a soil structure B in one of the containers 138, while a sand mixture 1330 including Toyoura sand processed by water repellent treatment and Toyoura sand with no water repellent treatment and having the height of 5 cm, and Toyoura sand 134C with no water repellent treatment, having the height of 10 cm, are provided on the sand mixture 1330 as a soil structure C in the other container 138. These two containers 138 were immersed and left in 4% salt water 135 provided in a salt water container 139, to measure salt content rates of the sands with no water repellency in the soil structure C and the soil structure B. The test was conducted by preparing sand mixtures including sand with no water repellent treatment and water repellent sand at the mixture ratios of 1:2, 1:3, and 1:4.

FIG. 38 indicates salt content rates after four days passed. The salt mixture at the mixture ratio of 1:2 allowed slight entry of salt by 1%, whereas the salt mixtures at the mixture ratios of 1:3 and 1:4 did not contain any salt. Similarly to the result indicated in the first embodiment, the soil structure B had the salt content rate of about 3%.

According to the above result, the appropriate mixture ratio for the drain holes that can reserve water and prevent rise of salt is about 1:5. Furthermore, a mixture ratio in the range from 1:3 to 1:7 realizes the drain holes that can reserve more water than a drain hole made of ordinary soil and prevent rise of salt. In a case of preventing only rise of salt, sand with no water repellent treatment and water repellent sand may be mixed at a mixture ratio of 1:2 or more.

Figure 13:
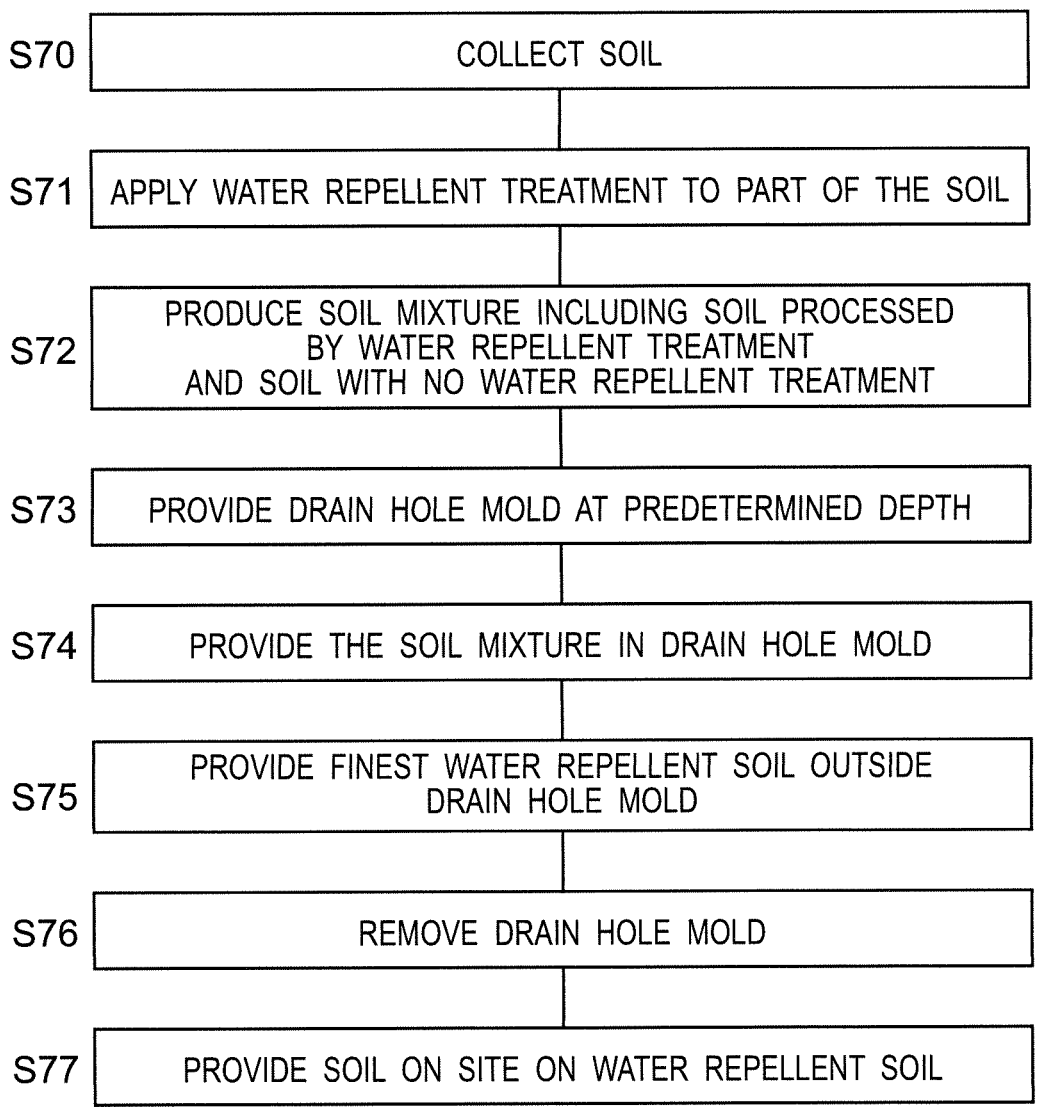
FIG. 13 is a flowchart of a procedure of forming an artificial soil structure according to a second embodiment of the present invention.

FIG. 13 is a flowchart of a procedure of forming the artificial soil structure including the soil mixture according to the second embodiment.

Similarly to step S50 according to the first embodiment, initially, soil of 55 cm thick or the like is removed from the ground surface and soil of 5 cm thick is collected from the soil thus removed as a target of water repellent treatment (step S70).

The soil collected for water repellent treatment is processed by water repellent treatment (step S71). According to the second embodiment, the drain holes 4 are made of a soil mixture including water repellent soil on site (where the soil structure 6 is to be formed) and soil with no water repellency. The soil removed in step S70 is partially left with no water repellent treatment, in order to form the soil mixture. The amount of the soil to be left with no water repellent treatment is determined by the amount of soil included in the soil mixture of the drain holes 4. More specifically, in a case of forming the drain holes 4 having the radius of 10 cm at five positions, namely, at the respective corners and the center of a square ground of 5 m square as a soil structure formation region 7 as in the first embodiment, the drain holes 4 occupy the area calculated from (10 cm×10 cm×π× 5)/(500 cm×500 cm)≈0.63%. Assume that the soil mixture includes sand with no water repellency and water repellent sand at the appropriate mixture ratio of 1:5. In this case, ⅕ of 0.63%, that is, about 0.12 to 0.13% of the removed soil, is to be included in the drain holes 4 as the soil with no water repellency. The soil with no water repellency of the amount thus obtained is extracted from the removed soil, and water repellent treatment is applied to the remaining soil to form water repellent soil (water repellent sand). Water repellent treatment according to the present embodiment is applied similarly to the first embodiment. After water repellent treatment, the soil left with no water repellent treatment is mixed with the soil processed by water repellent treatment to obtain the soil mixture (step S72).

Subsequently, similarly to the first embodiment, drain hole molds 5 are placed in the soil structure formation region 7 (step S73).

The soil mixture is then inserted into the drain hole molds 5 (step S74).

Thereafter, in the portions other than the portions provided with the drain hole molds 5, sand processed by water repellent treatment is provided to the height equal to that of the drain hole molds 5 so as to form the water shield layer 2 (step S75).

After that, the drain hole molds 5 are removed (step S76).

Then, the dug soil is returned onto the drain holes 4 and the water shield layer 2 so as to form the water retentive soil layer 1 (step S77).

In the method of forming the soil structure according to the present embodiment, the drain holes are made of the soil mixture. There is thus no need to sift sand to sort into particles of different diameters unlike the method according to the first embodiment. Instead, the soil with no water repellent treatment and the soil processed by water repellent treatment are simply mixed together at a certain mixture ratio. The method according to the present embodiment realizes not only the effect of the first embodiment but also easier formation of the soil structure in comparison to the method according to the first embodiment.

In addition, water repellent sand is difficult to be tamped and kept in a certain shape by tamping due to its water repellency. In order to form a portion like the drain hole penetrating the water repellent sand, the drain hole mold is necessary for preventing collapse of soil as in the second embodiment. In this case, the boundary with peripheral water repellent soil may not be kept when the drain hole mold is removed at the last stage. However, the sand mixture at the mixture ratio as in the second embodiment is less likely to be deformed unlike the water repellent soil, though still difficult to be tamped like water repellent sand. The boundary with the peripheral water repellent soil is more likely to be kept when the drain hole mold is removed, thereby facilitating formation.

Third Embodiment

As long as the drain hole 4 has the water path and water flows along the water path with no cutoff, water is not reserved in the water retentive soil layer 1 but flows to reach under the water retentive soil layer 1 in the course of time. It is necessary to provide any measure for cutting off the water path once formed in the drain hole 4, in order to secure the water repellency of the water repellent sand layer forming the drain hole 4 and reliably keep water in the water retentive soil layer 1.

Figure 14:
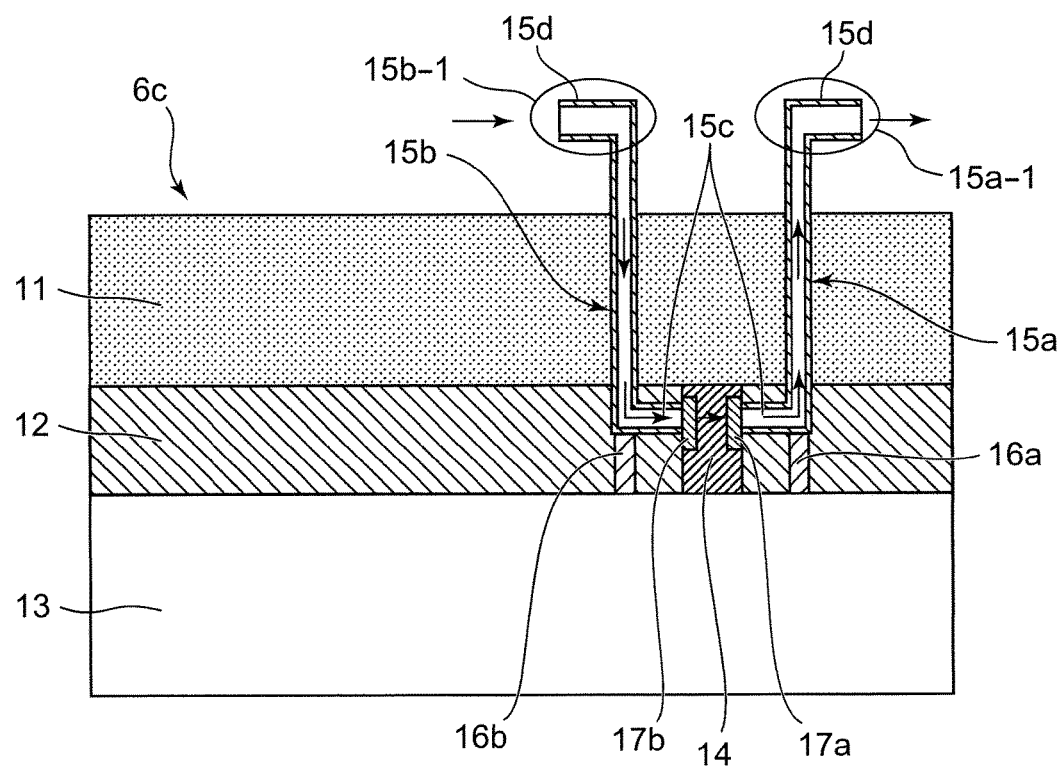
FIG. 14 is a sectional view showing an artificial soil structure according to a third embodiment of the present invention.

As shown in FIG. 14, the third embodiment of the present invention exemplifies an artificial soil structure 6C in which a drain hole 14 made of water repellent sand for securing water repellency of the drain hole 14 is provided with ventilation pipes 15a and 15b used for blocking a water path with air. This figure shows a water retentive soil layer 11, a water shield layer 12, a soil layer 13, and the drain hole 14, respectively corresponding to the water retentive soil layer 1, the water shield layer 2, the soil layer 3, and the drain hole 4 according to the first embodiment.

FIG. 14 shows the artificial soil structure 6C that additionally includes the ventilation pipes 15a and 15b that are used for drying the water repellent sand of the drain hole 14. In the soil structure 6C configured similarly to the soil structure 6 according to the first embodiment, the ventilation pipes 15a and 15b for introducing outdoor air into the drain hole 14 are provided around the drain hole 14, so as to face each other with the drain hole 14 being interposed therebetween, for example.

The ventilation pipes 15a and 15b each have an end (lower end) 15c positioned to be in contact with the drain hole 14, and another end (upper end) 15d that is exposed above the ground surface of the artificial soil structure 6C so as to import outdoor air. The ends 15d, above the ground surface, of the ventilation pipes 15a and 15b may be simply directed vertically upward. Alternatively, in order to enhance ventilation by the horizontal airflow as depicted in FIG. 14, the ends 15d above the ground surface may be each bent at a right angle from the pipe portion buried in soil so as to be directed horizontally. The ventilation pipes 15a and 15b are not particularly limited in terms of the diameter. The ends 15c in contact with the drain hole 14 are, for example, smaller than the thickness of the water shield layer 12 in terms of efficiency. On the other hand, for example, the ends 15d above the ground surface areas large as possible in diameter, so as to import outdoor air as much as possible. In a case where the water shield layer 12 is 5 cm thick, the ends 15d (portions indicated by circles 15a-1 and 15b-1 in FIG. 14) above the ground surface may be 8 cm in diameter, and the remaining portions of the ventilation pipes 15a and 15b, more specifically, the ends 15c closer to the drain hole and the portions vertically penetrating the water shield layer 12, may be 2 cm in diameter. FIG. 14 depicts the two ventilation pipes 15a and 15b that are bilaterally symmetrical with each other so as to secure ventilation. Alternatively, one of the ventilation pipes may be provided as one of the ventilation pipes depicted in the figure, and the other ventilation pipe may be provided so as to extend vertically upward from the upper surface of the drain hole 14. There is still exerted some effect if there is provided only one of the ventilation pipes 15a and 15b, although the ventilation efficiency deteriorates.

FIGS. 15A to 15J depict a procedure of constructing the artificial soil structure 6C of FIG. 14, and FIG. 16 is a flowchart of the construction procedure. In the soil structure formation region 7, soil is dug and sorted into particles of different diameters, and water repellent treatment is applied to coarser soil and finer soil (steps S60 to S63 in FIG. 16 (respectively corresponding to steps S50 to S53 in FIG. 2)).

Figure 17:
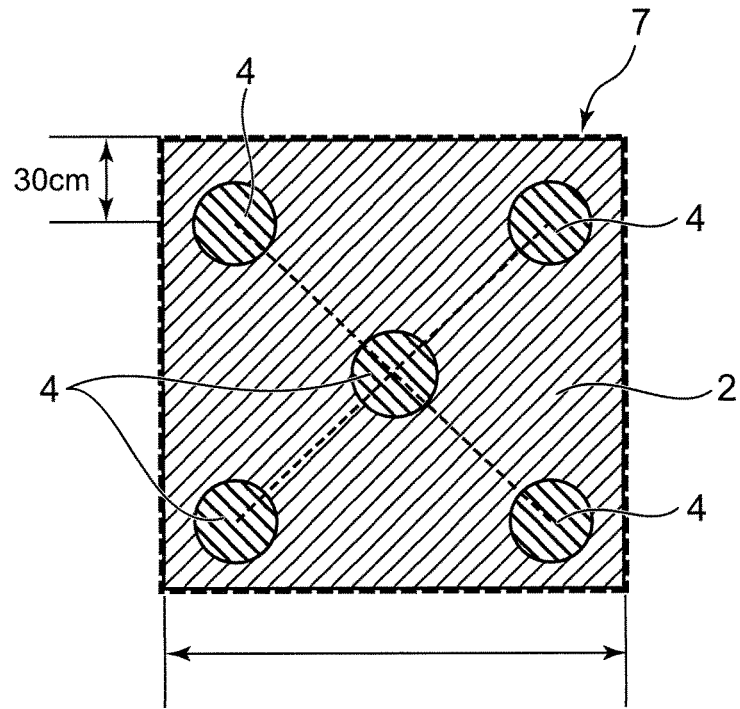
FIG. 17 is a plan view showing a water shield layer and the drain holes of the artificial soil structure according to the third embodiment of the present invention.

The processes so far are similar to those in the procedure according to the first embodiment. In the present embodiment, it is necessary to secure spaces for the ventilation pipes 15a and 15b. The drain holes 14 are thus placed inside, by the length of horizontal portion of the ventilation pipe 15a or 15b, from the four corners of the square ground dug as the soil structure formation region 7. Assume that the ventilation pipes 15a and 15b each have the horizontal portion of 15 cm long and the drain holes 14 each have the radius of 10 cm, for example. In this case, the centers of the drain holes 14 may be placed inside the four corners by 25 cm or more (30 cm, for example) (FIG. 17).

Figure 15A:
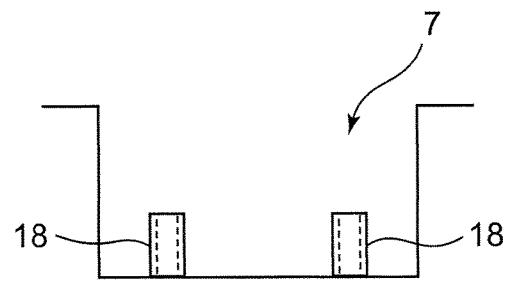
FIG. 15A is a schematic sectional view of a process of forming the artificial soil structure according to the third embodiment of the present invention.
Figure 15B:
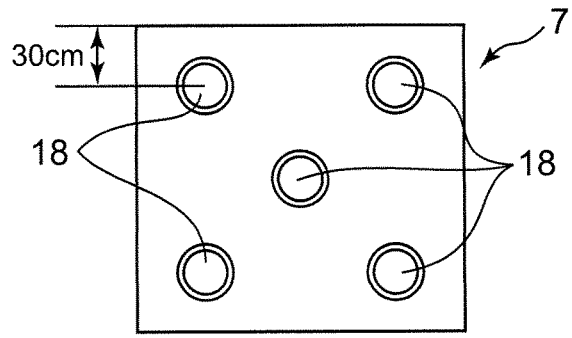
FIG. 15B is a plan view corresponding to FIG. 15A.

Subsequently, drain hole molds 18 are placed at the center and positions inside the four corners of the soil structure formation region 7 (step S64, FIGS. 15A and 15B).

Coarser sand processed by water repellent treatment is provided in the drain hole molds 18 thus placed (step S65). The drain hole molds 18 are shaped similarly to the drain hole molds 5 according to the first embodiment, has a cylindrical shape of 5 cm in diameter and 5 cm in height, and is made of plastic, for example.

Figure 15C:
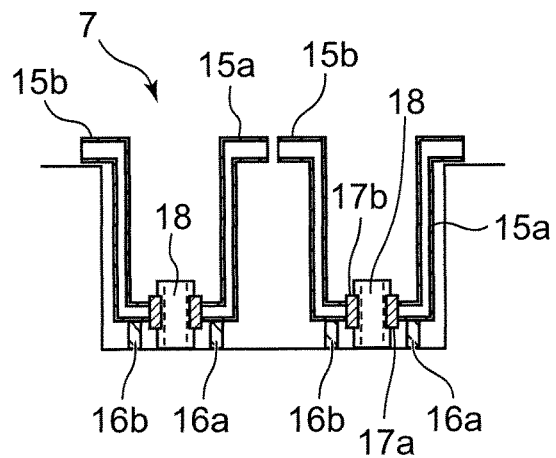
FIG. 15C is a sectional view showing a process subsequent to FIG. 15A of forming the artificial soil structure according to the third embodiment of the present invention.
Figure 15D:
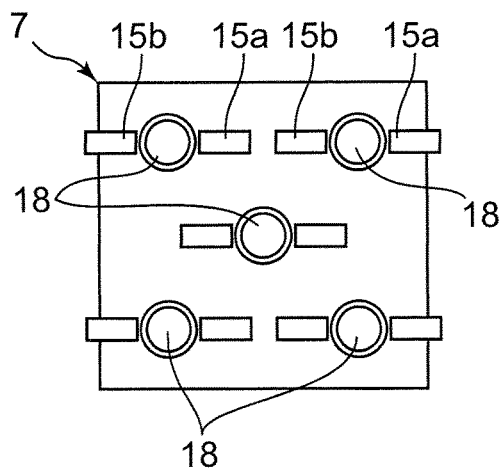
FIG. 15D is a plan view corresponding to FIG. 15C.
Figure 15E:
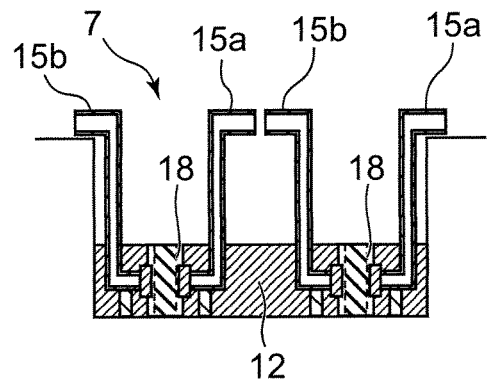
FIG. 15E is a sectional view showing a process subsequent to FIG. 15C of forming the artificial soil structure according to the third embodiment of the present invention.
Figure 15F:
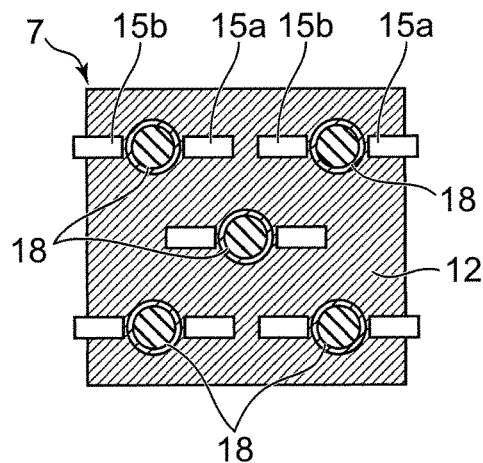
FIG. 15F is a plan view corresponding to FIG. 15E.

After the placement of the drain hole molds 18, the two ventilation pipes 15a and 15b are provided to each of the drain hole molds 18 so as to be in contact with the side surface of the corresponding drain hole mold 18 (step S66, FIGS. 15C and 15D). In this case, the two ventilation pipes 15a and 15b are placed so as to be symmetrical with each other with respect to each of the drain hole molds 18. Furthermore, the two ventilation pipes 15a and 15b are provided such that the lower ends 15c are laterally pressed against the drain hole mold 18, because the lower ends 15c of the two ventilation pipes 15a and 15b are, for example, in contact with the soil of the drain hole 14 after the drain hole mold 18 is removed. Outlets of the lower ends 15c of the ventilation pipes 15a and 15b are covered with nonwoven fabrics 17a and 17b so that soil of the drain holes 14 does not enter the lower ends 15c of the ventilation pipes 15a and 15b (see FIG. 15K). In such a configuration, as shown in FIG. 15L, outdoor air flows from the lower end 15c of the ventilation pipe 15a through the nonwoven fabric 17a attached thereto, passes through the drain hole 14 along the surfaces of a large number of water repellent sand particles 4a forming the drain hole 14, and enters the lower end 15c of the ventilation pipe 15b through the nonwoven fabric 17b attached thereto. In this manner, water on the water repellent sand particles 4a is removed and dried easily. The lower ends 15c of the ventilation pipes 15a and 15b may be placed at arbitrary height as long as being in contact with the side surface of the drain hole 14. The same effect will be exerted under such a condition. Then, water repellent sand is provided to form the water shield layer 12. After the formation of the water shield layer 12, the ventilation pipes 15a and 15b are buried in the water repellent sand to be fixed. In this case, it is necessary to provide, around each of the drain hole molds 18, support posts 16a and 16b that fix and support the ventilation pipes 15a and 15b, so as to support the ventilation pipes 15a and 15b and the corresponding drain hole mold 18 at the predetermined positions. After the ventilation pipes 15a and 15b are placed while being supported by the support posts 16a and 16b, fine sand processed by water repellent treatment is provided to form the water shield layer 12 (step S67, FIGS. 15E and 15F).

Figure 15G:
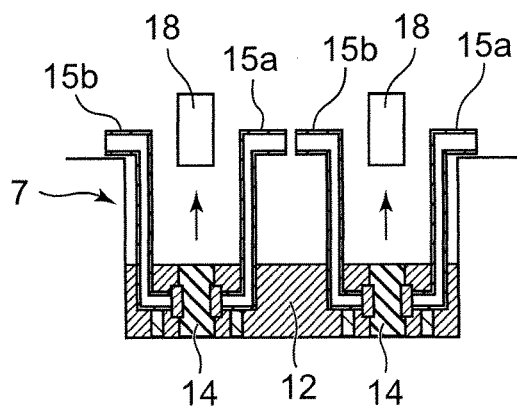
FIG. 15G is a sectional view showing a process subsequent to FIG. 15E of forming the artificial soil structure according to the third embodiment of the present invention.
Figure 15H:
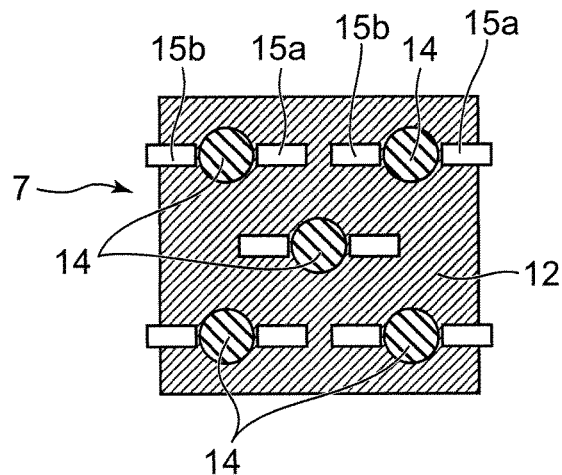
FIG. 15H is a plan view corresponding to FIG. 15G.

Thereafter, similarly to the first embodiment, the drain hole molds 18 are removed (step S68, FIGS. 15G and 15H).

Figure 15I:
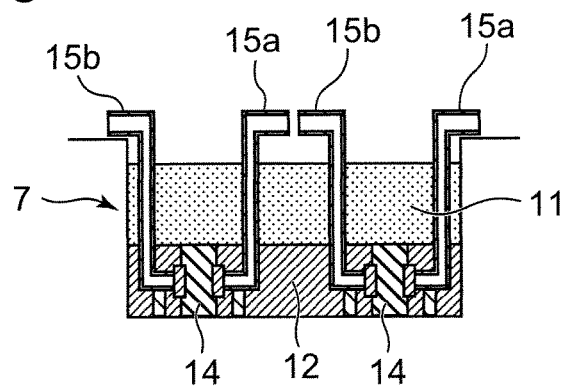
FIG. 15I is a sectional view showing a process subsequent to FIG. 15G of forming the artificial soil structure according to the third embodiment of the present invention.
Figure 15J:
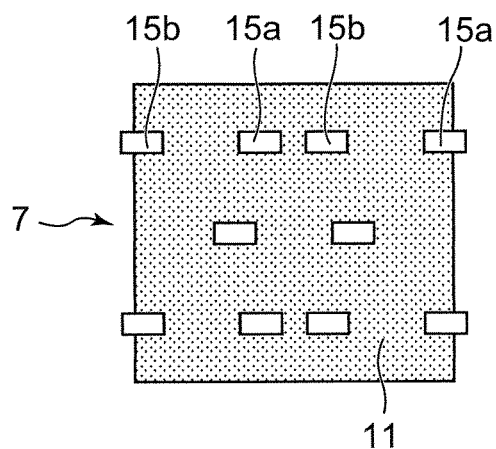
FIG. 15J is a plan view corresponding to FIG. 15I.
Figure 15K:
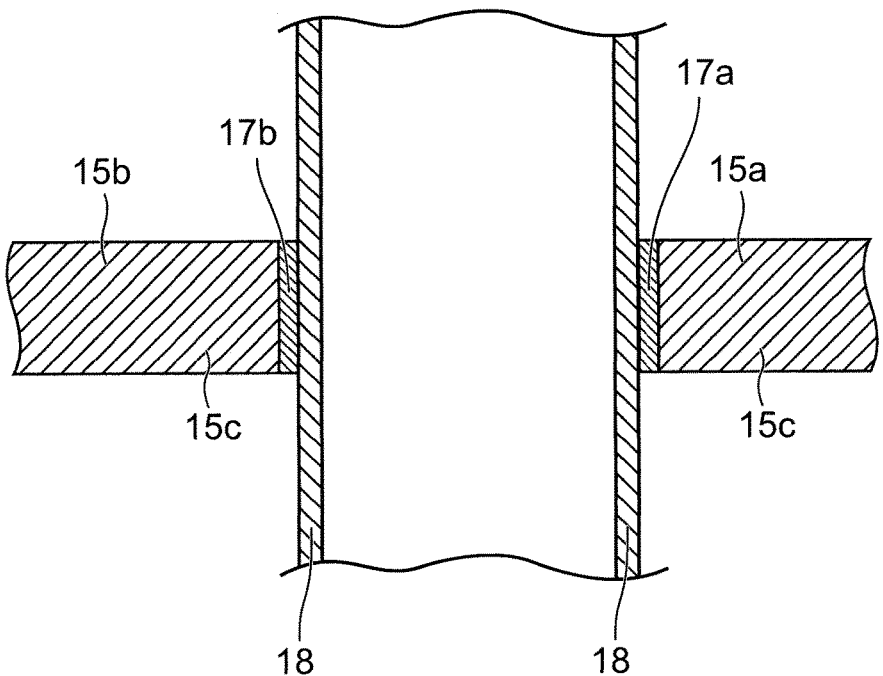
FIG. 15K is an enlarged schematic sectional view showing the positional relationship between a drain hole and lower ends of ventilation pipes in the soil structure according to the third embodiment of the present invention.
Figure 15L:
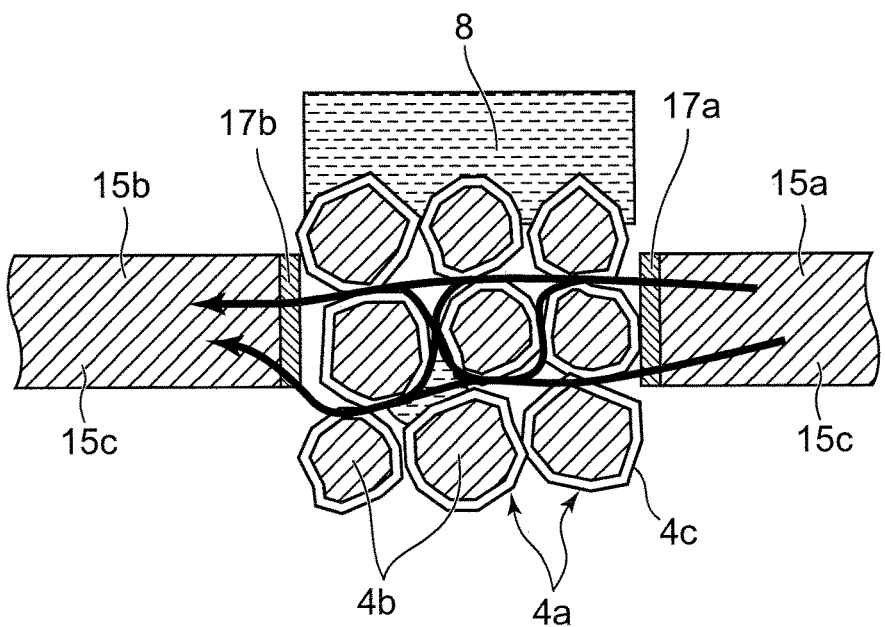
FIG. 15L is an enlarged schematic sectional view depicting a ventilation state between the drain hole and the ventilation pipes in the soil structure according to the third embodiment of the present invention.

Subsequently, the soil on site is returned onto the water shield layer 12 made of water repellent soil (water repellent sand), thereby to form the water retentive soil layer 11 (step S69, FIGS. 15I and 15J).

Figure 18A:
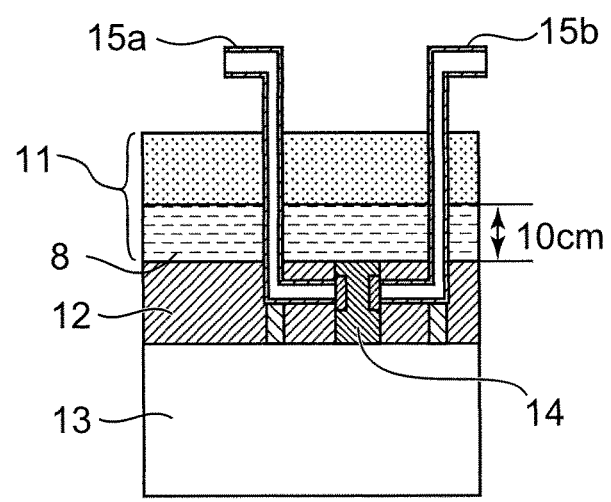
FIG. 18A is a schematic sectional view of a state where a water retentive soil layer can reserve water equivalent to a critical water level thereof with no breakage of the water shield layer in the artificial soil structure according to the third embodiment of the present invention.
Figure 18B:
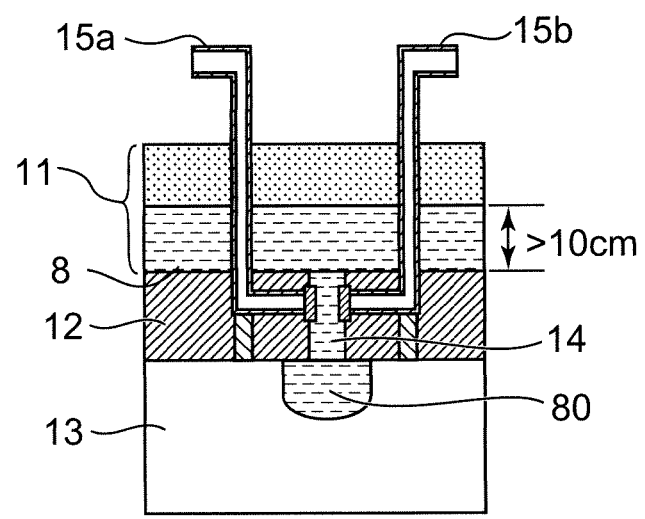
FIG. 18B is a schematic sectional view of a state where water exceeding the critical water level flows downward through the drain hole into a soil layer in the artificial soil structure according to the third embodiment of the present invention.
Figure 18C:
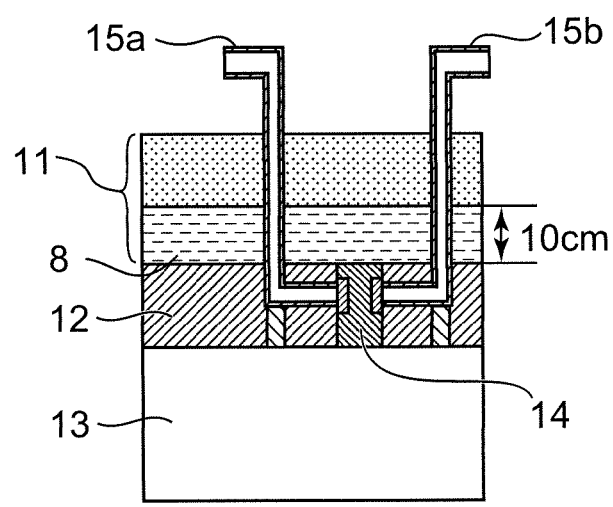
FIG. 18C is a schematic sectional view of a state where the drain hole is likely to be dried by the ventilation pipes thus provided, the drain hole is dried while the water retentive soil layer can reserve water of the predetermined critical water level to thereby stably reserve water in the artificial soil structure according to the third embodiment of the present invention.

The structure according to the third embodiment exerts the effect similar to that of the first embodiment. More specifically, for example, the water retentive soil layer 11 can reserve water of the height equivalent to a critical water level of 10 cm or the like with no breakage of the water shield layer 12 (see FIG. 18A), and the drain holes 14 can prevent rise of salt water. The water exceeding the height of the critical water level of 10 cm flows through the drain hole 14 down into the soil layer 13 (see water 80 in FIG. 18B). In the case according to the first embodiment, if water keeps staying in the drain hole 14, water may not be reserved in the water retentive soil layer 11 but may flow downward through the water retentive soil layer 11. On the other hand, the drain hole 14 is likely to be dried due to the ventilation pipes 15a and 15b thus provided. The drain hole 14 is dried at the time when the water retentive soil layer 11 can reserve water of the height equivalent to the predetermined critical water level of 10 cm or the like, thereby achieving stable reserve of water (see FIG. 18C).

Any of the various embodiments and the modification examples having been described may be appropriately combined together to achieve the respective effects thereof.

Fourth Embodiment

With reference to FIGS. 20A to 21B, initially described is a configuration of the artificial soil structure 26 according to the fourth embodiment of the present invention.

The soil structure 26 includes a soil layer 21 of natural soil (referred to as original soil) on site (where the soil structure 26 is to be formed), a water shield layer 22 having a concave shape, and a water retentive soil layer (water retentive layer) 23 provided inside a concave portion 22c of the water shield layer 22 and on the concave portion 22c, from the bottom in this order.

The soil layer 21 and the water retentive soil layer 23 may be each formed by sand of the average particle diameter of 100 μm and are relatively permeable (permeability coefficient of about $10^2$ cm/sec, for example). The soil for these layers is not particularly processed by water repellent treatment. More specifically, the soil layer 23 is made of sand with no water repellent treatment so as to allow permeation of water, whereas the water retentive soil layer 23 is provided on the water shield layer 22 and is made of sand with no water repellent treatment so as to reserve water.

The water shield layer 22 is provided on the soil layer 21 and is made of water repellent sand processed by water repellent treatment. For example, the water shield layer 22 is made of water repellent sand obtained by applying water repellent treatment to the sand of the soil layer 21 in a production method to be described later. In other words, the water shield layer 22 is made of a large number of hydrophobic particles. The water shield layer 22 is formed into the concave portion 22c that has a flat portion 22a corresponding to a bottom surface of a rectangular shape and side portions 22b standing on the entire peripheral edges of the flat portion 22a.

The water retentive soil layer 23 is provided in and above the concave portion 22c of the water shield layer 22.

The soil layer 21 and the water retentive soil layer 23 are made of sand of the same type as mentioned above. Water supplied from the ground surface is blocked by the water shield layer 22 and does not flow further downward from the water shield layer 22, thereby being retained in the concave portion 22c of the water shield layer 22 and the water retentive soil layer 23 provided thereon. The soil portion reserving water in and above the concave portion 22c of the water shield layer 22 is referred to as the water retentive soil layer 23 in the present embodiment.

In a case where the soil structure 26 is utilized as farmland for plant cultivation, the horizontal bottom portion (flat portion 22a) of the water shield layer 22 needs to be provided so as to have depth from the ground surface being lower than roots of the plant. For example, if the roots of the plant have the maximum length of 50 cm, the bottom portion (flat portion 22a) of the water shield layer 22 is positioned at the depth of 50 cm or more from the ground surface. In the fourth embodiment, the water shield layer 22 is formed to be 5 cm deep, for example.

Soil drain holes 24 are each provided as an example of the water repellent soil body so as to vertically penetrate the side portions 22b of the water shield layer 22 and connect the water retentive soil layer 23 and the soil layer 21. The soil drain holes 24 are in contact with the soil layer 21 and the water retentive soil layer 23. In a case where the flat portion 22a has a square shape as one example, the soil drain holes 24 may be placed at five positions, namely, at the respective corners and the center of the water shield layer 22 in the square shape. The soil drain holes 24 are made of hydrophobic particles that have a critical water level (water infiltration pressure) lower than that of hydrophobic particles forming the water shield layer 22. The water retentive soil layer 23 is placed so as to partially cover the soil drain holes 24.

Water flows in the soil drain holes 24 similarly to the embodiment described above with reference to FIGS. 11A to 11D.

If water is supplied excessively, breakage may possibly occur at the flat portion 22a of the water shield layer (portion 27B circled by dotted line in FIG. 20A) 22 at the lowest bottom of the water retentive soil layer 23. The flat portion 22a at the bottom of the concave portion 22c of the water shield layer 22 needs to be improved so as not to receive water pressure exceeding the critical water level of water repellent sand.

Figure 20A:
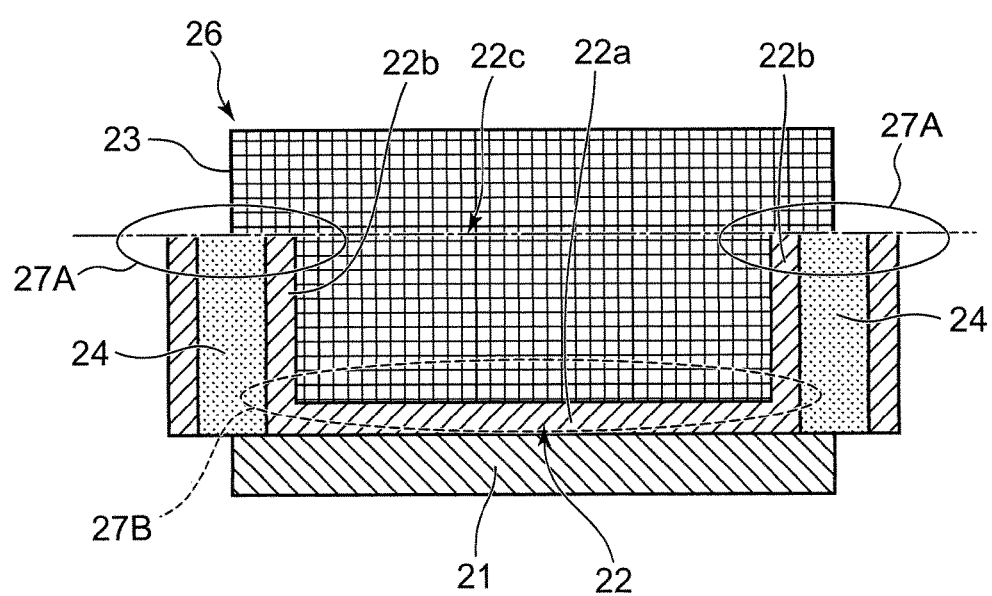
FIG. 20A is a longitudinal sectional view of an artificial soil structure according to a fourth embodiment of the present invention.

According to the fourth embodiment of the present invention, the soil drain holes 24 are each provided with an upper opening at the surface, closest to the ground surface, of the water shield layer 22 that is designed to have a difference in height by the concave portion 22c (portion 27A circled by solid line in FIG. 20A). In this structure, when water is reserved excessively, water flows through the soil drain holes 24 to reach under the water shield layer 22 so as to prevent breakage of the water shield layer 22.

Figure 22A:
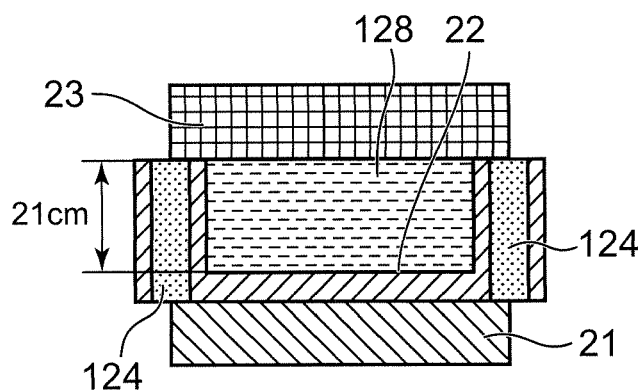
FIG. 22A is a longitudinal sectional view of a state where water can be reserved only inside the water shield layer when the soil drain hole is made of ordinary soil with no water repellent function.
Figure 22B:
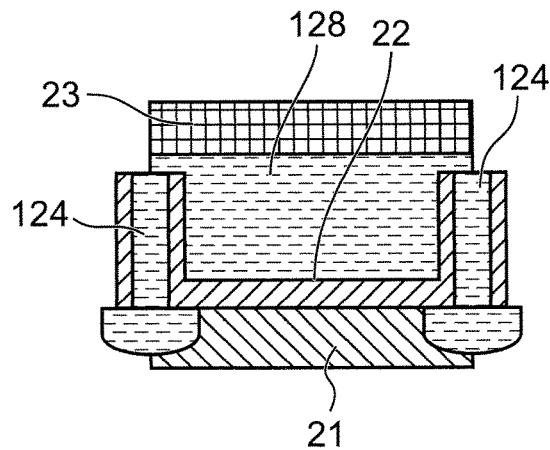
FIG. 22B is a longitudinal sectional view of a state where water is supplied to exceed a critical water level, overflows from a concave portion, and flows through the soil drain holes to reach under the water shield layer.
Figure 22C:
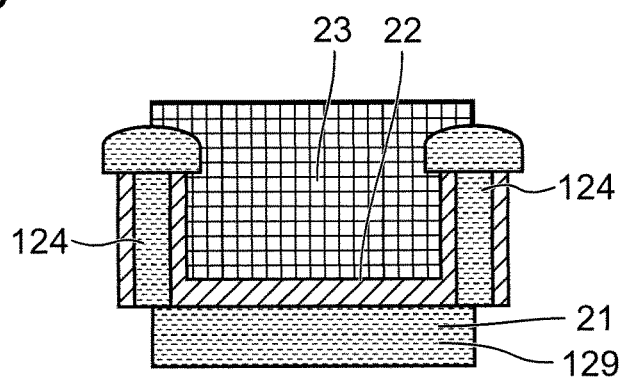
FIG. 22C is a longitudinal sectional view of a state where ground water containing salt also possibly enters the water retentive soil layer through the soil drain holes.

As shown in FIG. 22A, unlike the above case, if there are provided soil drain holes 124 that are not made of hydrophobic particles of the soil drain holes 24 but are made of ordinary soil with no water repellency, water 128 is reserved only inside the water shield layer 22 (see FIGS. 22A and 22B). In this example, the water 128 can be retained in the concave portion 22c of the water shield layer 22 up to the critical water level of 21 cm. If the water 128 is supplied to exceed the critical water level of 21 cm, the water 128 overflows from the concave portion 22c and flows through the soil drain holes 124 to reach under the water shield layer 22. Ground water 129 containing salt may also enter the water retentive soil layer 23 through the soil drain holes 124 (see FIG. 22C).

Figure 23A:
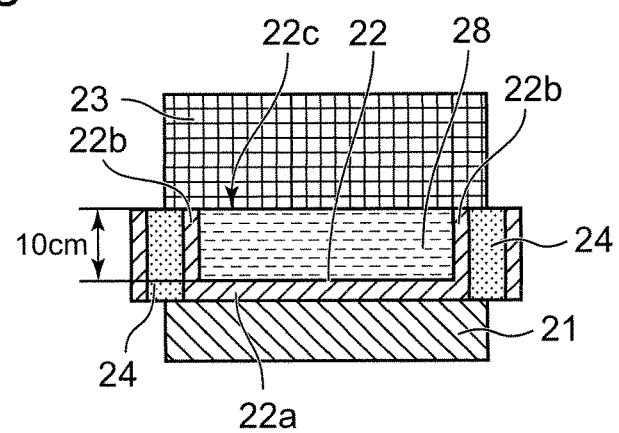
FIG. 23A is a longitudinal sectional view of a state where the water retentive soil layer can reserve water in the soil portion surrounded with the water shield layer in a flow of water in the artificial soil structure according to the fourth embodiment of the present invention.
Figure 23B:
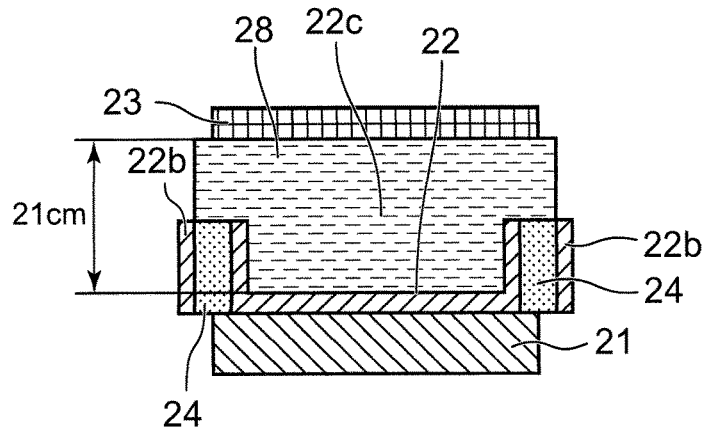
FIG. 23B is a longitudinal sectional view of a state where the water retentive soil layer in portions above the soil drain holes can also reserve water up to a critical water level of hydrophobic particles forming the soil drain holes, in a flow of water in the artificial soil structure according to the first embodiment of the present invention.
Figure 23C:
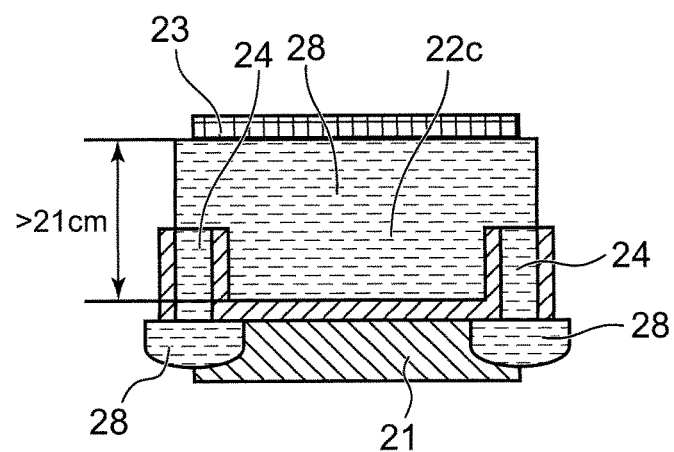
FIG. 23C is a longitudinal sectional view of a state where water is supplied to exceed the critical water level, and flows though the soil drain holes to reach under the water shield layer in the flow of water in the artificial soil structure according to the first embodiment of the present invention.
Figure 23D:
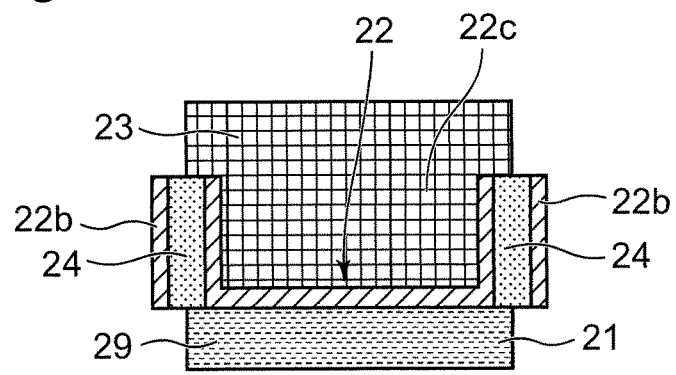
FIG. 23D is a longitudinal sectional view of a state where ground water containing salt is blocked by the soil drain holes and the water shield layer and is thus prevented from entering the water retentive soil layer in the flow of water in the artificial soil structure according to the first embodiment of the present invention.

On the other hand, according to the fourth embodiment, the flat portion 22 of the concave portion 22c and the upper end surfaces of the side portions 22b of the water shield layer 22 have a difference in height smaller than the difference between the water infiltration pressure as a critical water pressure of the water shield layer 22 and the water infiltration pressure of the water repellent soil bodies 24. For example, the soil drain holes 24 are made of hydrophobic particles having a critical water level lower than the hydrophobic particles of the water shield layer 22. In such a configuration, water can be reserved up to the critical water level of the hydrophobic particles forming the soil drain holes 24 not only in the soil portion of the water retentive soil layer 23 surrounded by the water shield layer 22 (see FIG. 23A) but also in the portion of the water retentive soil layer 23 provided on the soil drain holes 24 (see FIG. 23B). More specifically, for example, the soil portion of the water retentive soil layer 23 surrounded by the water shield layer 22 can retain water only up to the critical water level of 10 cm (see FIG. 23A). In addition to the portion of the water retentive soil layer 23 on the concave portion 22c, the portion of the water retentive soil layer 23 positioned on the soil drain holes 24 (for example, the portion just above the soil drain holes 24) can retain water 28 up to the critical water level of 21 cm or the like of the hydrophobic particles forming the soil drain holes 24, for example. If the water 28 is supplied to exceed the critical water level of 21 cm, the water 28 flows through the soil drain holes 24 to reach under the water shield layer 22 (see FIG. 23C). When the soil drain holes 24 are dried partially, water can be reserved again in the concave portion 22c up to the critical water level of 21 cm. As a result, the artificial soil structure 26 can reserve water more efficiently while preventing breakage of the water shield layer 22. Moreover, ground water containing salt is blocked by the soil drain holes 24 and the water shield layer 22. It is thus possible to prevent entry of salt water into the water retentive soil layer 23 (see FIG. 23D).

Figure 20B:
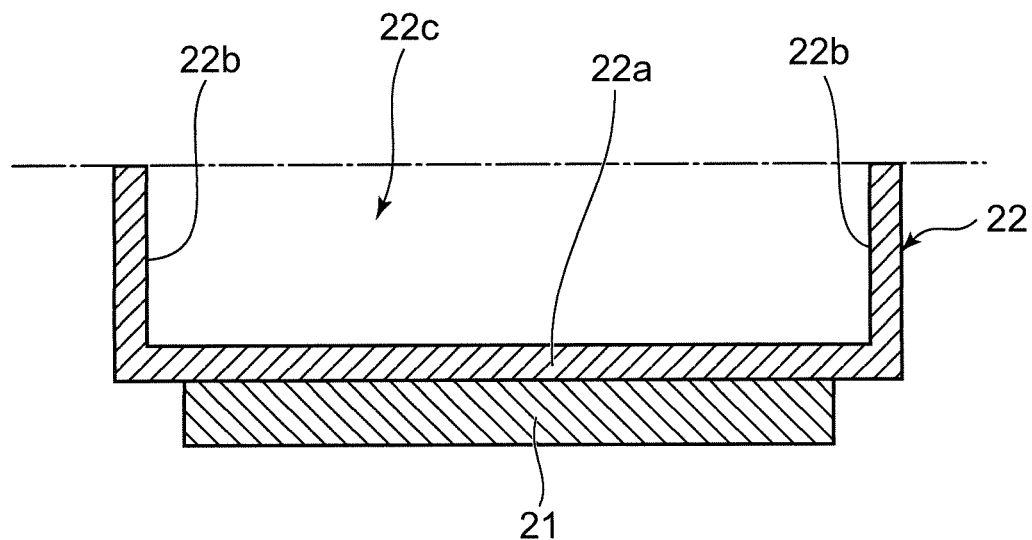
FIG. 20B is a longitudinal sectional view of the artificial soil structure according to the fourth embodiment of the present invention, in which a water retentive soil layer is not depicted.
Figure 21A:
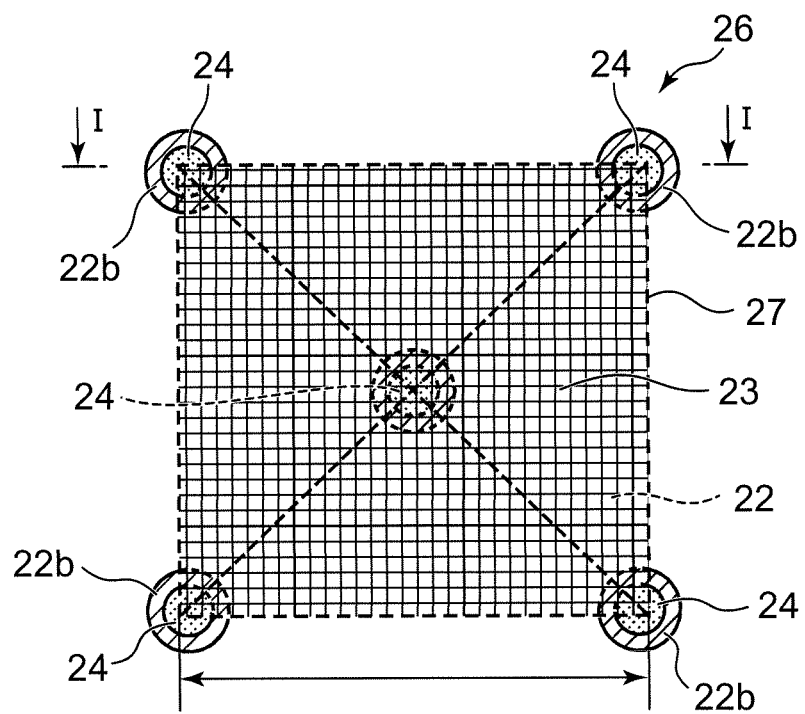
FIG. 21A is a plan view, seen from above, of the artificial soil structure of FIG. 20A.
Figure 21B:
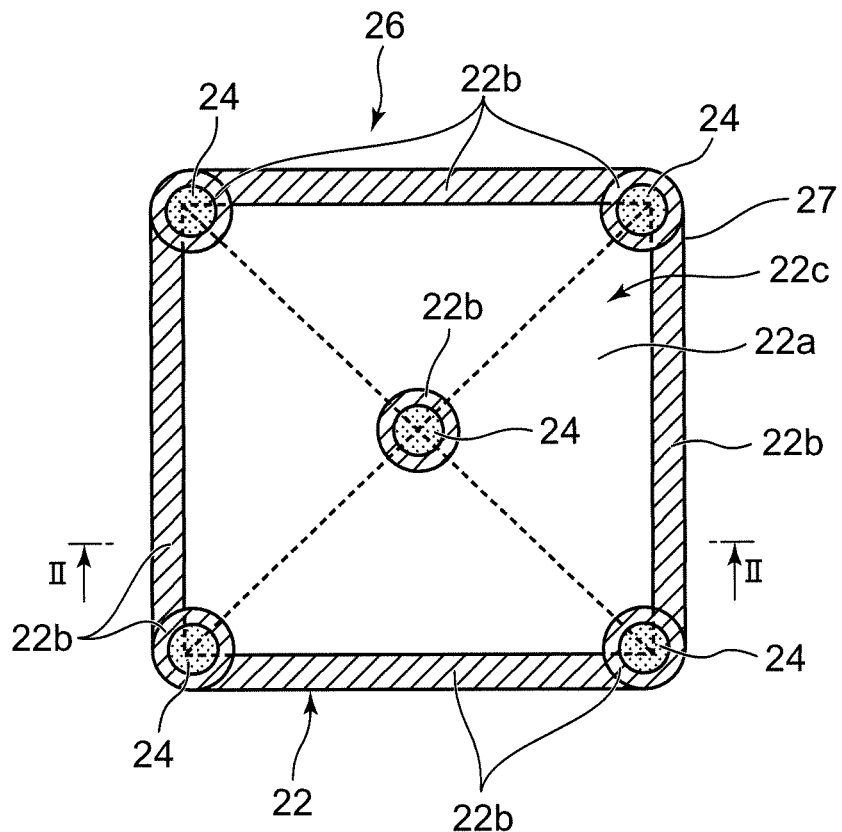
FIG. 21B is a plan view, seen from above, showing a water shield layer and soil drain holes of the artificial soil structure of FIG. 20B.

FIG. 21A is a plan view, seen from above, of the artificial soil structure 26 of FIG. 20A. FIG. 21B is a plan view, seen from above, of the water shield layer 22 and the soil drain holes 24 of the artificial soil structure 26 of FIG. 20B. In reverse, FIG. 20A is a sectional view taken along line I-I of FIG. 21A, and FIG. 20B is a sectional view taken along line II-II of FIG. 21B.

In a case of reforming a square ground of 5 m square as a soil structure formation region 27 into the artificial soil structure 26 including water retentive soil, the soil drain holes 24 of 20 cm in diameter or the like are provided at five positions, namely, at the respective corners and the center of the water shield layer in the square shape. In FIGS. 20A to 21B, the water shield layer 22 is designed to have posts and have the soil drain holes 24 that are placed at the respective corners and the center of the square shape. The soil drain holes 24 are provided in the centers of the posts, respectively. In a case where the soil drain holes 24 have the diameter of 20 cm, the posts of the water shield layer 22 may have the diameter of 40 cm. FIGS. 20A to 21B depict the example in which the water shield layer 22 has the posts. Alternatively, the posts may be replaced with water shield walls. In this case, the water shield layer 22 can be designed to have the water shield walls that are located on the respective sides and on diagonals of the square shape, as indicated by dotted lines in FIG. 21A.

The height of the posts is dependent on the critical water level of the hydrophobic particles forming the water shield layer 22 and the soil drain holes 24. For example, assume that the soil drain holes 24 are made of hydrophobic particles (water repellent sea sand) (1) having the critical water level of 10 cm and the water shield layer 22 is made of hydrophobic particles (Toyoura sand with water repellency) (2) having the critical water level of 21 cm, as indicated in FIG. 24. In this case, the soil on the soil drain holes 24 receives water pressure up to 9 cm, because water supplied to exceed 9 cm flows downward through the soil drain holes 24. On the other hand, the water shield layer 22, which has the strength against water pressure of 21 cm, needs to be designed to have depth, in other words, the height of the posts, equal to or less than 21 cm−9 cm=12 cm.

Described below are the detailed specifications and a construction method.

Figure 25:
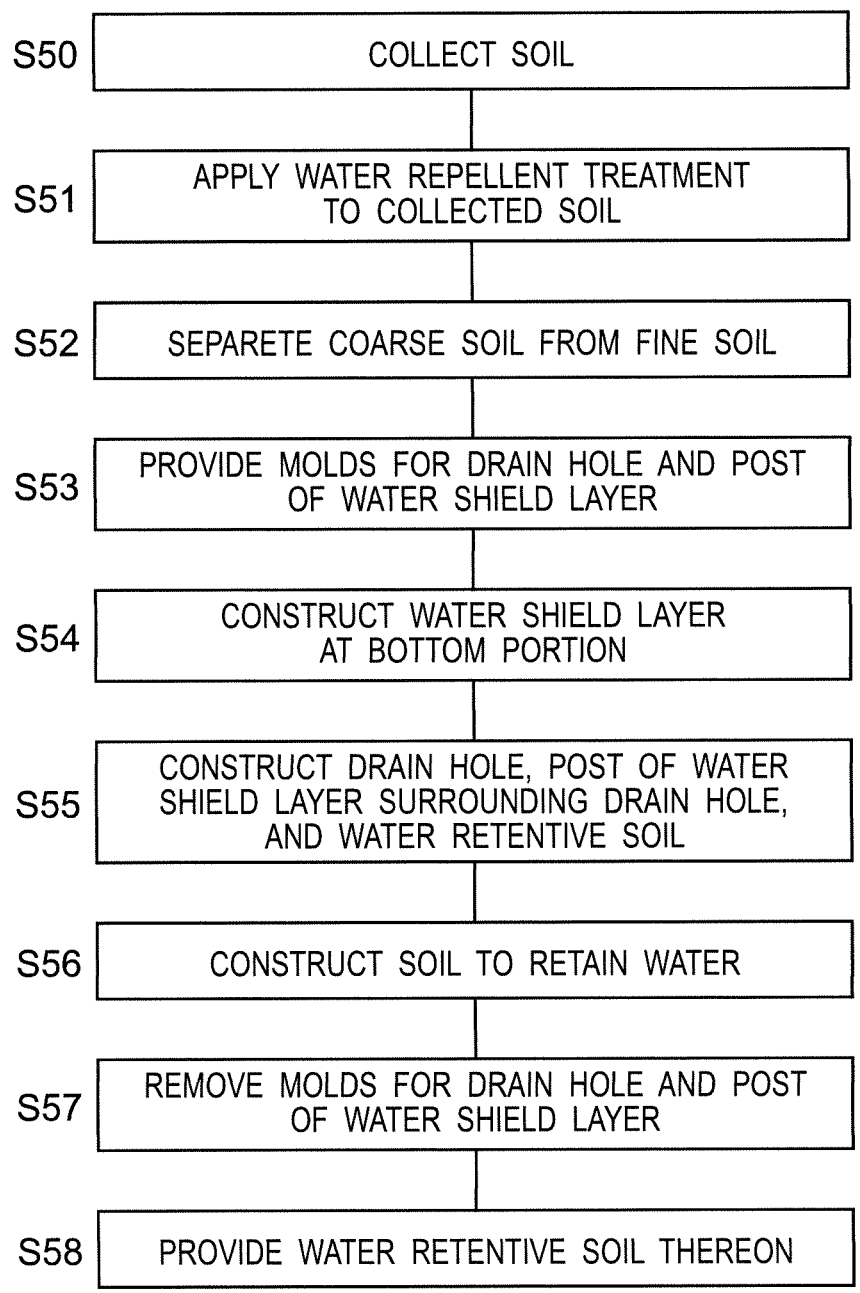
FIG. 25 is a flowchart of a method of constructing the artificial soil structure according to the fourth embodiment of the present invention.

FIG. 25 is a flowchart of a procedure of constructing the artificial soil structure 26. FIGS. 20A to 21B and 27 are configuration diagrams of the soil structure 26 to be constructed.

For example, in a case of reforming a square ground of 5 m square as the soil structure formation region 27 into the artificial soil structure 26 including water retentive soil, for example, the soil drain holes 24 of 20 cm in diameter or the like are provided at five positions, namely, at the respective corners and the center of the water shield layer 22 in the flat square shape (see FIGS. 20A to 21B). In a case of providing the water shield layer 22 at 50 cm deep from the ground surface, soil on site is dug approximately to the depth obtained by adding a thickness t (cm) of the water shield layer 22 to the distance from the ground surface of the soil on site to the water shield layer 22, and the soil thus dug is partially collected for water repellent treatment (step S50). In a case of providing the water shield layer 22 of 5 cm thick, soil of approximately 55 cm thick is collected and sand for the water shield layer is separated therefrom so as to be subject to water repellent treatment. For example, assume that the soil drain holes 24 are 20 cm in diameter and the posts of the water shield layer 22 surrounding the soil drain holes 24 are 40 cm in diameter. In this case, collected are soil for the bottom surface of the water shield layer having 5 cm in thickness as well as soil for the posts, the amount of which is calculated as 20 cm×20 cm×π×50 cm=about 63 liters.

Figure 26:
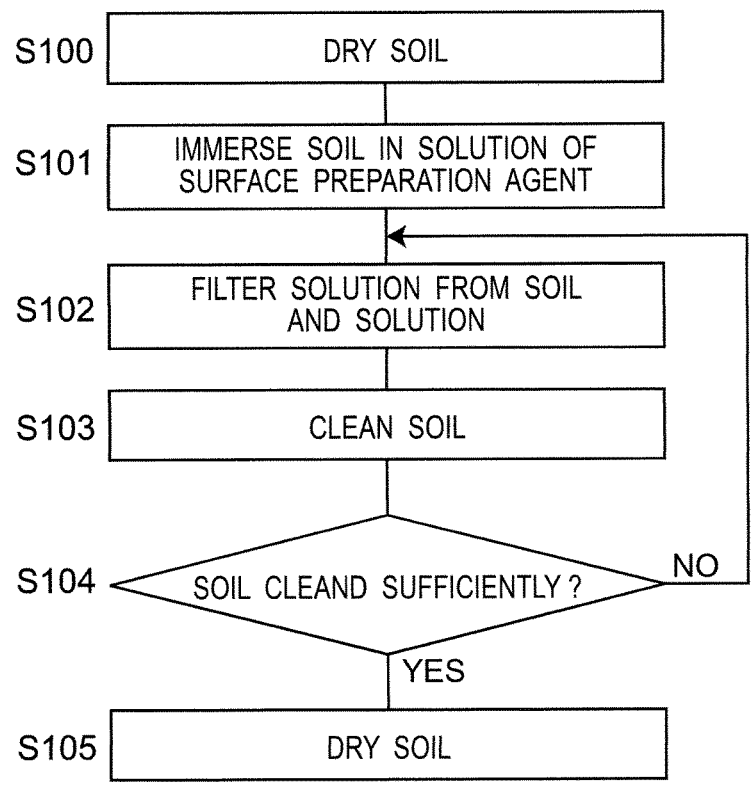
FIG. 26 is a flowchart of a procedure of producing water repellent sand for the artificial soil structure according to the fourth embodiment of the present invention.

Subsequently, water repellent treatment is applied to the sand thus collected (step S51). FIG. 26 shows the procedure of the water repellent treatment.

Soil to be subject to water repellent treatment is dried initially (step S100). Soil is dried by placing a drying room or a drier near the soil structure formation region 27, or is dried naturally by solar heat or the like.

The water content rate of the soil is measured during the drying process, which ends if the water content rate of the soil reaches 0.01% or the like. Alternatively, for example, the soil is weighed during the drying process, which ends if the weight of the soil becomes unchanged for a unit period. In the case of drying with use of a drying room or a drier, the soil is preliminarily inserted into the drying room or the drier along with a gravimeter and a container, and is dried in the drying room or the drier constantly having high temperature while checking temporal change in weight. For example, sand in a container is dried while being stirred in the drying room or the drier set to about 50° C., and the drying process ends if the weight of the soil becomes unchanged for one hour. In the case of natural drying, soil is dried by solar light. In this case, a part of the soil as a sample is laid to be several centimeters high (3 cm, for example) in a container, and the container is placed on a gravimeter and is left outside. The soil of 3 cm thick from the surface is regarded as having been dried if the weight of the soil becomes unchanged for one hour. The dried soil is collected and the soil therebelow is dried naturally in the same manner.

The dried soil is then immersed in solution of a surface preparation agent (step S101). Examples of the solution of the surface preparation agent include fluorine system solvent or a hydrocarbon system solvent. In a case where soil is immersed still without being stirred, the soil is left in the solution for about one day and then the solution is filtered (step S102).

After the filtering process, the soil is cleaned in surface preparation agent detergent (step S103). For example, in the case of using a fluorine system surface preparation agent, used as cleaning solution is a fluorine system solvent such as Fluorinert (registered trademark) or Novec (registered trademark). In the other case of using a hydrocarbon system surface preparation agent, a liquid mixture of hexane or hexadecane and chloroform may be used as cleaning solution. This process ends if the partially extracted soil thus cleaned is visually recognized as repelling the detergent. In a case where the surfaces of the soil particles look still wet with the detergent, filtering and cleaning are repeated until the detergent is recognized as being repelled (step S104).

When the surface of the soil is visually recognized as repelling the detergent, the soil is dried (step S105), and the water repellent treatment process ends if the soil gets dried.

The soil particles are covered with thin films by this water repellent treatment, and it is possible to obtain water repellent soil without affecting the sizes, the shapes, or the color of the original soil particles. Furthermore, this water repellent treatment is not made by physical coating with a water repellent agent, and is thus strong so as not to be scraped off.

Subsequently, the water repellent soil is sifted so as to be sorted into particles of different diameters (step S52). As analyzed with reference to FIG. 24, the strength against water pressure of water repellent sand is dependent on the size of the particle diameter, and the critical water level tends to decrease as the particle diameter increases. For example, the water shield layer 22, which receives larger water pressure, is made of water repellent soil of a smaller particle diameter.

Figure 27:
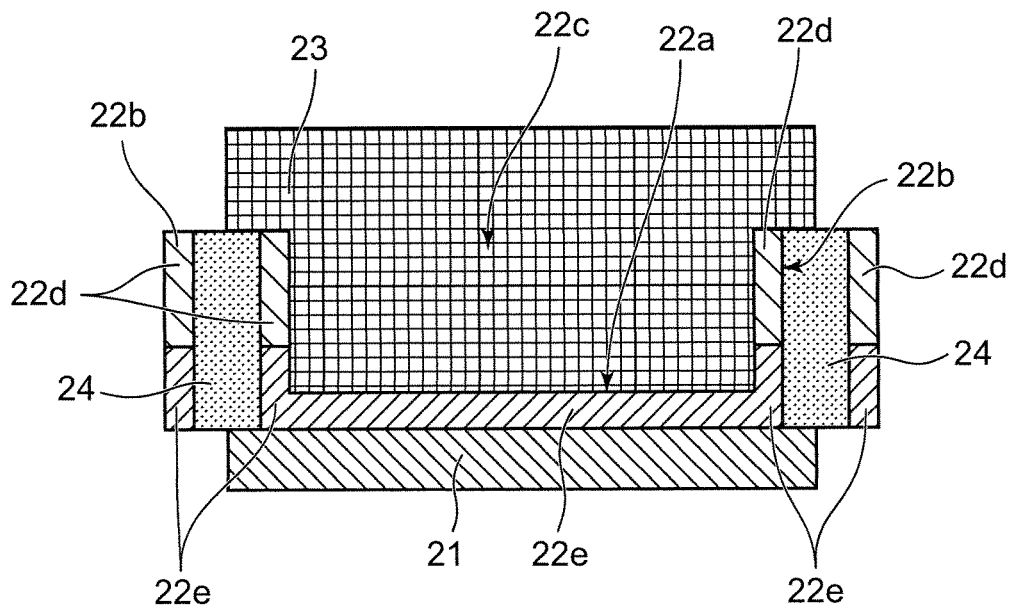
FIG. 27 is a longitudinal sectional view of locations of respective particles of different diameters in the artificial soil structure according to the fourth embodiment of the present invention.

FIG. 27 depicts an example of the relationship between the water shield layer 22 of FIGS. 20A to 21B and locations of sorted soil particles. In this example, water repellent soil is sorted into soil of three types, namely, coarser soil, moderate soil, and finer soil. Among these, the coarser soil may be used for the soil drain holes 24, the moderate soil may be used for upper halves 22d and 22d of the side portions 22b of the water shield layer 22 surrounding the soil drain holes 24, and the finer soil may be used for lower halves of the side portions 22b of the water shield layer 22 surrounding the soil drain holes 24 and a bottom portion 22e thereof.

Subsequently, the artificial soil structure 26 is constructed with use of the water repellent soil of the three types. FIGS. 28A to 28E depict the procedure of constructing the artificial soil structure 26 of FIG. 27.

Figure 28A:
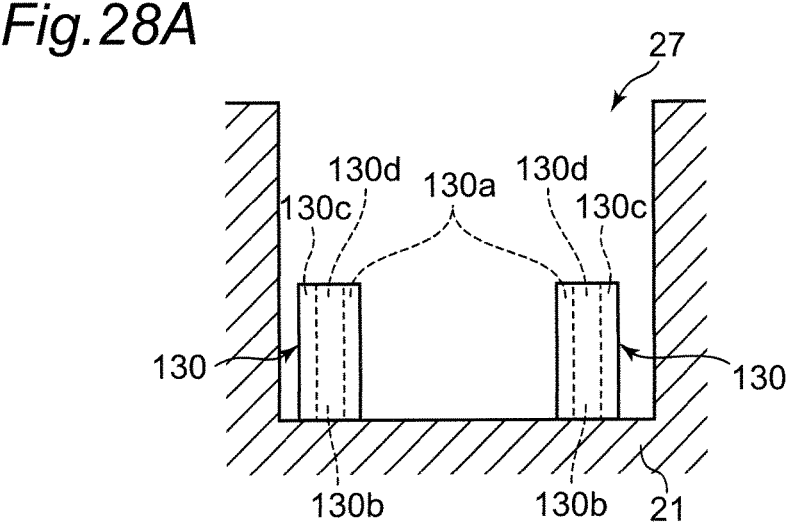
FIG. 28A is a sectional view showing a process of constructing the artificial soil structure according to the first embodiment of the present invention.
Figure 29:
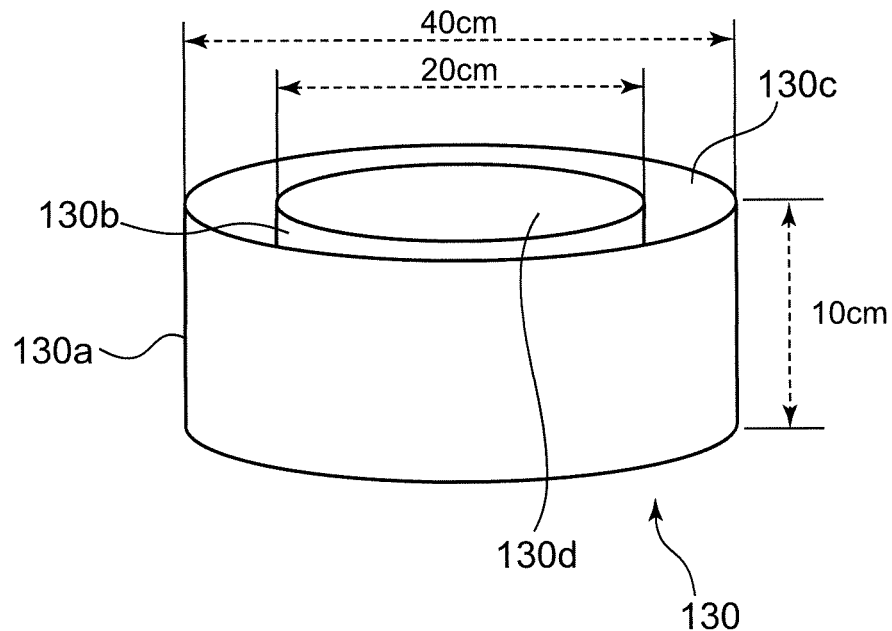
FIG. 29 is a perspective view of cylindrical molds for side wall portions of the water shield layer and the soil drain hole, which are used to construct the artificial soil structure according to the first embodiment of the present invention.

Initially, cylindrical molds 130a and 130b (denoted by reference numeral 130 if collectively referred to) are placed to respectively form the soil drain holes 24 and the posts of the water shield layer 22 surrounding the soil drain holes 24 and made of hydrophobic particles. FIG. 29 is a view of the two large and small cylindrical molds 130a and 130b for the post and the soil drain hole, respectively, with inserting one in another. The inner cylindrical mold 130b of 20 cm in diameter has an inner through hole 130d to form the soil drain hole 24. The outer cylindrical mold 130a and the inner cylindrical mold 130b configure an annular groove 130c to form the post of the water shield layer 22. For example, if the cylindrical mold is thinner, because a gap formed after the mold is removed can be thinner. For example, the mold may be 1 mm thick so as to provide a cylindrical shape by being bent. In the sorting by the particle diameters, if the coarser water repellent soil has the properties of the hydrophobic particles (1) indicated in FIG. 24 and the finer water repellent soil has the properties of the hydrophobic particles (2), the soil drain holes 24 desirably have the height of 10 cm or less, as mentioned earlier. In this example, the height is set to 10 cm. The inner cylindrical mold 130b for the drain hole has a cylindrical shape of 20 cm in diameter and 10 cm in height. The outer cylindrical mold 130a provided therearound for the post of the water shield layer has a cylindrical shape of 40 cm in diameter and 10 cm in height. The molds may be made of any material, and may be produced with plastic, for example. The cylindrical molds 130b and 130a are placed at the positions of the soil drain hole 24 and the post of the water shield layer 22 as indicated in FIG. 21A such that the mold 130b for the drain hole is provided inside the mold 130a for the post of the water shield layer (step S53) (FIG. 28A).

Figure 28B:
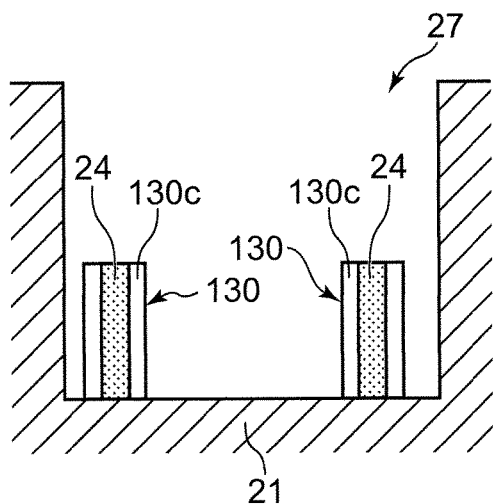
FIG. 28B is a sectional view showing a process subsequent to FIG. 28A of constructing the artificial soil structure according to the first embodiment of the present invention.

The bottom surface (flat portion 22a) of the water shield layer 22 is then constructed to be 5 cm high with use of the finer water repellent soil. Thereafter, the through hole 130d of the inner cylindrical mold 130b out of the two cylindrical molds 130b and 130a is filled with the coarser water repellent soil up to 10 cm high so as to form the soil drain hole 24 (step S54) (FIG. 28B).

Figure 28C:
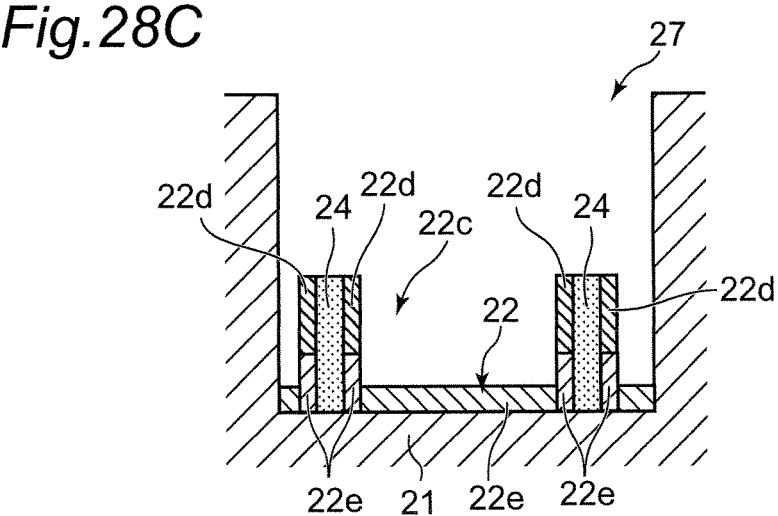
FIG. 28C is a sectional view showing a process subsequent to FIG. 28B of constructing the artificial soil structure according to the first embodiment of the present invention.

Finer water repellent soil same as the water repellent soil for the bottom portion (flat portion 22a) of the water shield layer 22 is filled in the lower half, up to 5 cm high, for example, of the annular groove 130c between the inner cylindrical mold 130b for the soil drain hole 24 and the outer cylindrical mold 130a for the post of the water shield layer. Then, moderate water repellent soil is filled in the upper half of remaining 5 cm high of the annular groove 130c so that the annular groove 130c between the two cylindrical molds 130b and 130a are completely filled with water repellent soil (step S55) (FIG. 28C). Formed as a result is the water shield layer 22.

Figure 28D:
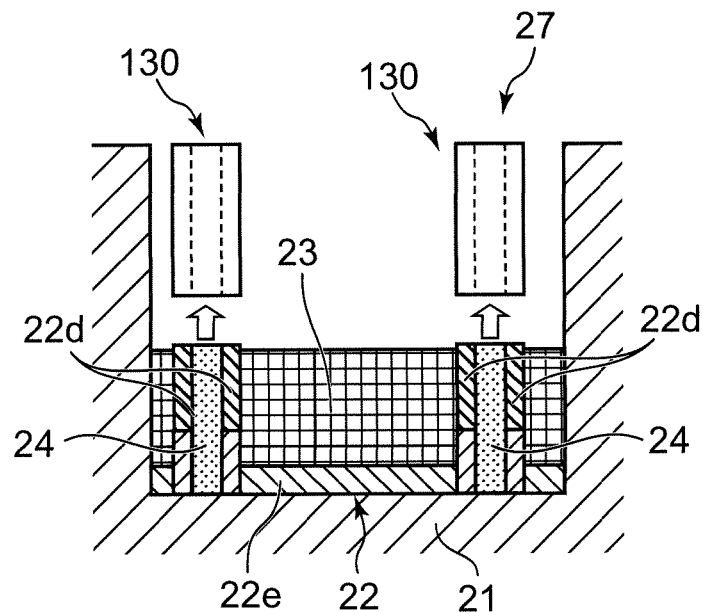
FIG. 28D is a sectional view showing a process subsequent to FIG. 28C of constructing the artificial soil structure according to the first embodiment of the present invention.

Then, the original soil is returned into the remaining space other than the cylindrical molds 130b and 130a so as to reach the height of 10 cm (S56) (FIG. 28D). This portion partially forms the water retentive soil layer 23.

Thereafter, the cylindrical mold 130b for the soil drain hole 24 and the cylindrical mold 130a for the post of the water shield layer 22 are pulled upward and removed (step S57).

Figure 28E:
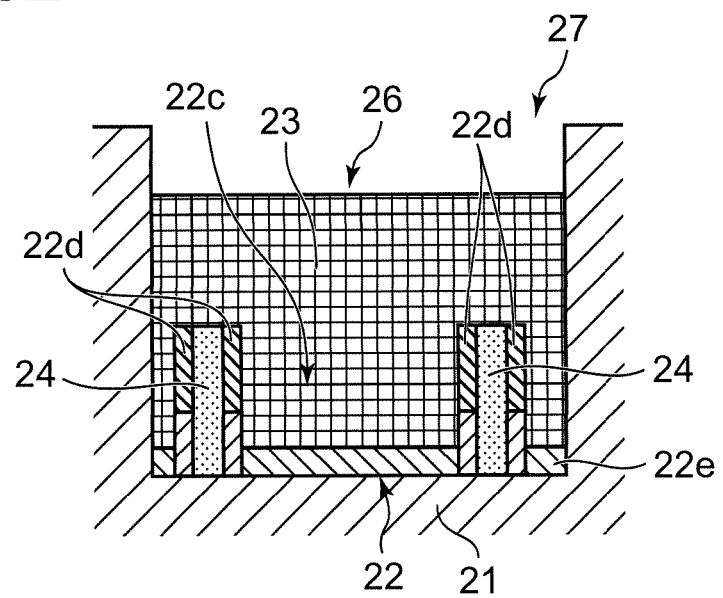
FIG. 28E is a sectional view showing a process subsequent to FIG. 28D of constructing the artificial soil structure according to the first embodiment of the present invention.

Then, original soil is additionally provided from above to complete the water retentive soil layer 23 (step S58) (FIG. 28E).

According to the fourth embodiment, it is possible to form the soil structure 26 that can retain water as much as possible in a season of small rainfall and discharge excessive water in a season of large rainfall, as well as constantly prevents rise of salt. In this soil structure 26, the water shield layer 22 provided in the soil at the predetermined depth from the ground surface has the concave portion 22C configured by the flat portion 22a and the side portions 22b. Furthermore, the soil drain holes 24 are provided so as to vertically penetrate the side portions 22b of the water shield layer 22. In this configuration, when rainfall is small, water is reserved inside the concave portion 22c of the water shield layer 22 without flowing to reach under the water shield layer 22. On the other hand, when rainfall is large, water on the side portions 22b of the water shield layer 22 is delivered through the soil drain holes 24 to reach under the water shield layer 22, thereby preventing breakage of the water shield layer 22. Furthermore, the drain holes 24 made of hydrophobic particles prevent rise of salt water under the water shield layer 22 and thus prevent water reserved inside the concave portion 22c of the water shield layer 22 from containing salt.

In addition, the deeper portion (the flat portion 22a, for example) of the water shield layer 22 having the concave portion 22c is made of the hydrophobic particles having the critical water level higher than that of the shallower portion (the upper halves of the side portions 22b, for example) of the water shield layer 22. The soil drain holes 24 are made of the hydrophobic particles having the critical water level lower than that of the deeper and shallower portions of the water shield layer 22. As a result, it is possible to reduce the risk of breakage of the water shield layer 22.

Fifth Embodiment

An artificial soil structure 26 according to the fifth embodiment of the present invention is different from the artificial soil structure 26 according to the fourth embodiment only in the configuration of the water shield layer 22.

Figure 30:
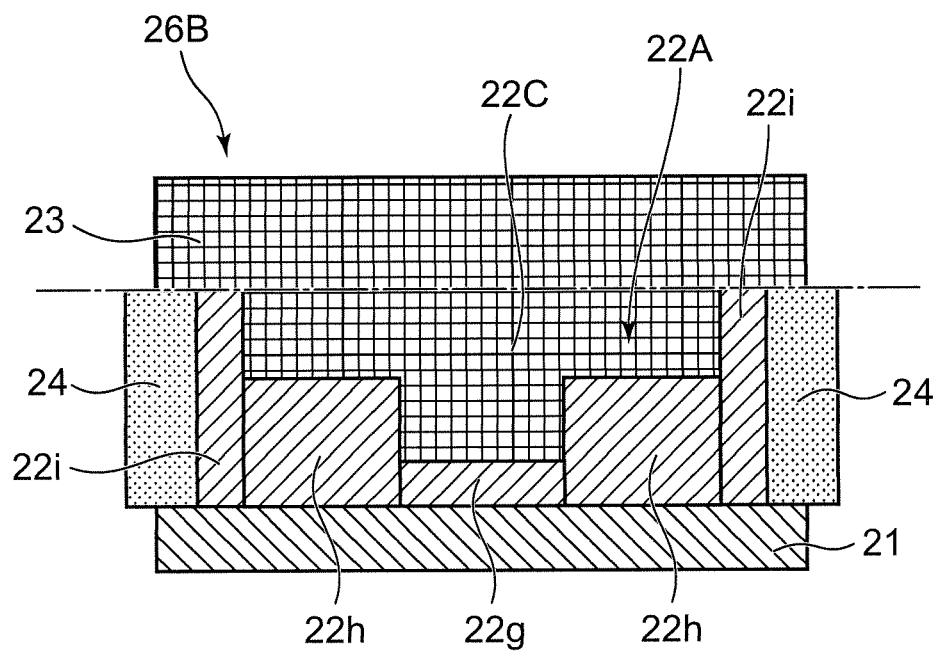
FIG. 30 is a longitudinal sectional view of an artificial soil structure according to a fifth embodiment of the present invention.

As shown in FIG. 30, the water shield layer 22 constructed according to the fourth embodiment may be replaced with a water shield layer 22A that is provided with a stepped bottom having differences in height, at the concave portion 22c of the water shield layer 22. For example, a lowest center bottom 22g is provided at around the center of the bottom of the concave portion 22c of the water shield layer 22A. An intermediate bottom 22h is provided around the center bottom 22g so as to be higher than the center bottom 22g and has a flat frame shape (for example, a rectangular frame shape in FIG. 21A). An outer bottom 22i is provided around the intermediate bottom 22h so as to be higher than the intermediate bottom 22h and as high as the soil drain holes 24 and have a flat frame shape (for example, a rectangular frame shape in FIG. 21A).

In this configuration, if the concave portion 22c has the upper end surfaces equal in height, the water retentive soil layer 23 is reduced in volume as compared with the case of the concave portion 22c according to the fourth embodiment as in FIG. 20A, thus reducing the amount of water reserved at one time. However, the highest water pressure is applied only to the portion of the lowest height. By concentratedly improving or maintaining this narrow portion so as to prevent breakage, the water retentive soil layer 23 is made more reliable. In order to prevent breakage in this case, finest water repellent soil may be concentratedly provided to the local deepest portion. Furthermore, breakage is likely to occur at the local deepest portion. It is thus possible to easily specify the location of breakage.

Figure 31:
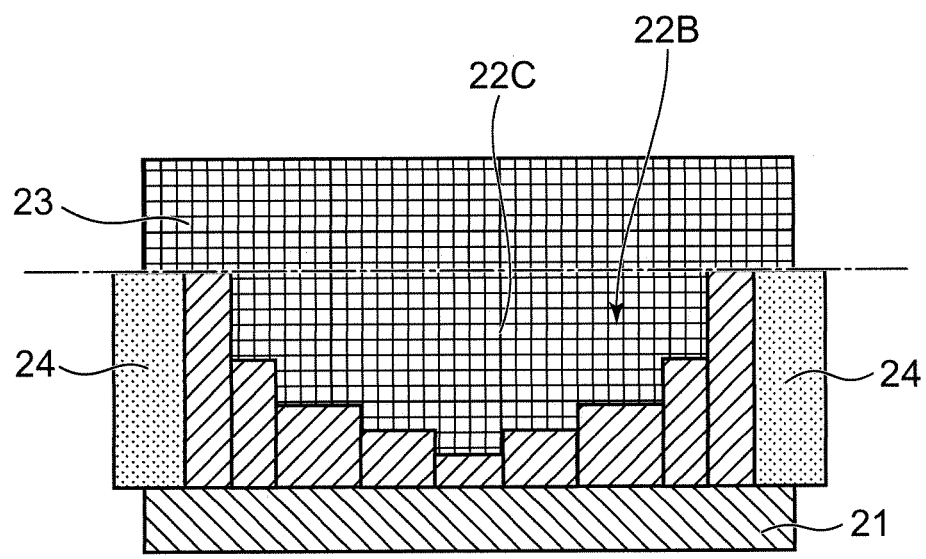
FIG. 31 is a longitudinal sectional view of an artificial soil structure according to a modification example of the fifth embodiment of the present invention.

By increasing the number of steps, there is obtained a water shield layer 22B having a stepped bottom of the concave portion 22c, like the one depicted in FIG. 31. By further increasing the number of steps, there is obtained a water shield layer 22C that has a slant bottom like a V bottom of the concave portion 22c, as depicted in FIG. 32.

In the case of the stepped bottom as shown in FIG. 31, if the concave portion 22c has the upper end surfaces equal in height, the water retentive soil layer 23 is reduced in volume as compared with the case of the concave portion 22c according to the fourth embodiment as in FIG. 20A, thus reducing the amount of water reserved at one time. However, the highest water pressure is applied only to the portion of the lowest step in the case of FIG. 31. By concentratedly improving or maintaining this narrow portion so as to prevent breakage, the water retentive soil layer 23 is made more reliable. In order to prevent breakage in this case, finest water repellent soil may be concentratedly provided to the local deepest portion. Furthermore, breakage is likely to occur at the local deepest portion. It is thus possible to easily specify the location of breakage.

Figure 32:
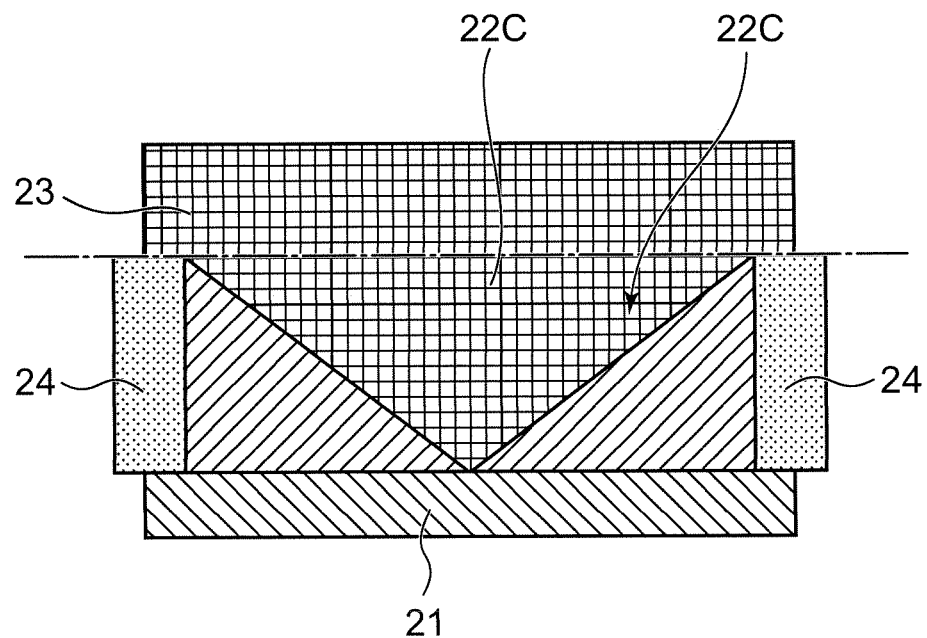
FIG. 32 is a longitudinal sectional view of an artificial soil structure according to another modification example of the fifth embodiment of the present invention.

Also in the case of the bottom in the V shape as shown in FIG. 32, if the concave portion 22c has the upper end surfaces equal in height, the water retentive soil layer 23 is reduced in volume as compared with the case of the concave portion 22c according to the fourth embodiment as in FIG. 20A, thus reducing the amount of water reserved at one time. However, the highest water pressure is applied only to the valley portion of the V shape. By concentratedly improving or maintaining this narrow portion so as to prevent breakage, the water retentive soil layer 23 is made more reliable. In order to prevent breakage in this case, as exemplified in FIG. 34, finest water repellent soil may be concentratedly provided into the valley portion in the V shape (portion 22q, hatched differently from other portions in FIG. 34). Furthermore, breakage is likely to occur locally at the valley portion in the V shape (the portion 22q in FIG. 34). It is thus possible to easily specify the location of breakage. A portion 22p corresponds to an intermediate bottom. The depth of the valley portion (22q in FIG. 34) in the V shape is about a half of the thickness of the water shield layer 22, for example.

In order to form the V shape of FIG. 32, water repellent soil can be dropped from right above the locations of the drain holes 24, so that the water repellent soil is naturally formed into chevron shapes having tops at the positions of the drain holes. In this manner, it is possible to form the V shape easily. Meanwhile, angles of the slant surfaces are determined naturally and cannot be adjusted manually.

As to the case of the stepped bottom shown in FIG. 31, FIGS. 33A to 33F depict the formation method, which is to be described later. Although it is more complex to form the stepped shape rather than the V shape, the stepped shape can be reliably formed so as to have width and height as desired.

Described below is the case where the artificial soil structure 26B according to the fifth embodiment of the present invention has the concave portion 22c of the water shield layer 22A formed into the stepped bottom as shown in FIG. 30.

According to FIG. 24, in the case of using the hydrophobic particles (glass beads) (3) having uniform diameters slightly ranging from 100 µm to 120 µm with the average particle diameter of 105 µm, the strength against water pressure is increased by 8 cm as compared with the case of using the hydrophobic particles (water repellent Toyoura sand) (2) having diameters ranging from 100 µm to 400 µm with the average particle diameter of 150 µm. The center bottom 22g at the deepest portion as shown in FIG. 30 is made of hydrophobic particles that are extracted from the hydrophobic particles (2) so as to correspond to the particle diameters of the hydrophobic particles (3). The intermediate bottom 22h is made of the hydrophobic particles (2), and the soil drain holes 24 are made of the hydrophobic particles (1). In this configuration, it is possible to form the soil that has the center bottom 22g of the water shield layer 22A higher by 8 cm in comparison to the artificial soil structure 26 according to the fourth embodiment shown in FIG. 20A.

Water repellent treatment is accordingly applied to soil that is collected similarly to the case of the fourth embodiment. The water repellent soil thus obtained is sifted so as to be sorted into soil of three types, namely, coarser soil, moderate soil, and finer soil. Among these, the coarser soil is used for the soil drain holes 24. The finest soil is used for the deepest center bottom 22g of the water shield layer 22A. The moderate soil is used for the outer bottoms 22i around the soil drain holes 24 and for the intermediate bottom 22h positioned inside thereof.

FIGS. 33A to 33F depict the method of constructing the water shield layer 22A of the artificial soil structure of FIG. 31.

For example, the soil drain holes 24 are made of soil having distribution of the particle diameters similar to that of the water repellent sea sand as the hydrophobic particles (1). The deepest center bottom 22g of the water shield layer 22A is made of soil having distribution of the particle diameters similar to that of the hydrophobic particles (3). The remaining portions, namely, the outer bottoms 22i of the water shield layer 22A and the intermediate bottoms 22h inside thereof, are made of soil having distribution of the particle diameters similar to that of the hydrophobic particles (2). In consideration of the critical water levels indicated in FIG. 24, the deepest concave portion of FIG. 30 (the center bottom 22g of the water shield layer 22A) is set to have a difference in height of 8 cm from the upper end opening of the concave portion 22c of the water shield layer 22A. The upper surfaces of the soil drain holes 24 is set to have the difference in height of 11 cm from the upper end surfaces of the concave portion 22c. In this case, the respective stepped portions of the water shield layer 22A, namely, the center bottom 22g, the intermediate bottoms 22h, and the outer bottoms 22i are not broken, and it is possible to reserve water of the largest amount.

Figure 33A:
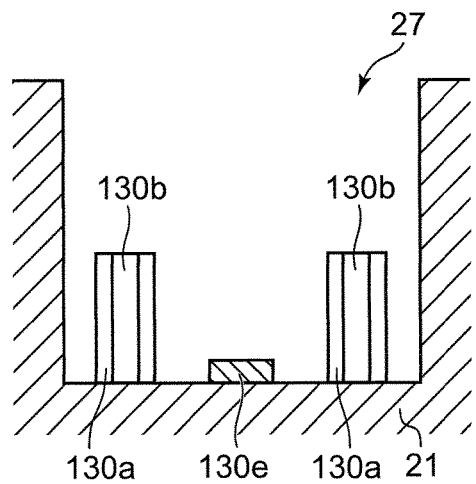
FIG. 33A is a longitudinal sectional view showing a process of constructing the artificial soil structure according to the fifth embodiment of the present invention.

In the construction procedure, initially, the soil drain hole molds 130b that are used in the fourth embodiment and are depicted in FIG. 28A, and a cylindrical mold 130e that is made of the material same as that for the soil drain hole molds 130b and has the height of 8 cm are placed at positions corresponding to the soil drain holes 24 and the center bottom 22g, respectively (the diameter is set to 40 cm, for example) (FIG. 33A).

Figure 33B:
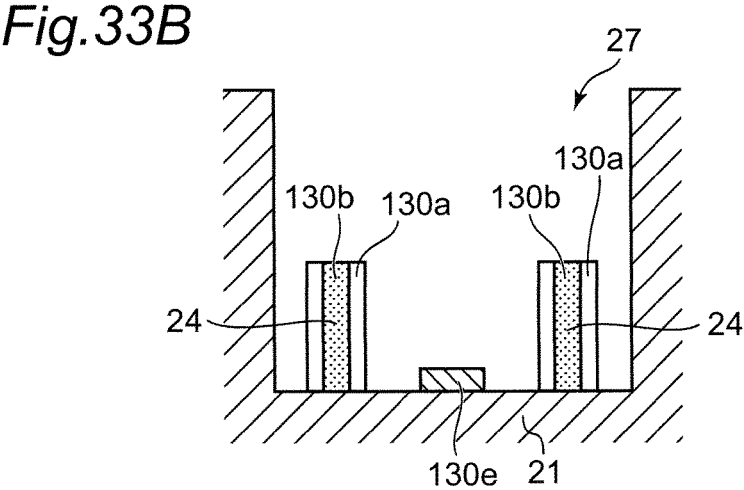
FIG. 33B is a longitudinal sectional view showing a process subsequent to FIG. 33A of constructing the artificial soil structure according to the fifth embodiment of the present invention.

Then, the coarsest water repellent soil is inserted into the cylindrical mold 130b provided inside the drain hole molds of FIG. 29 for the soil drain holes 24. The finest water repellent soil is inserted into the center cylindrical mold 130e (FIG. 33B). The center bottom 22g is made of the finest water repellent soil inserted in the center cylindrical mold 130e positioned correspondingly to the center bottom 22g.

Figure 33C:
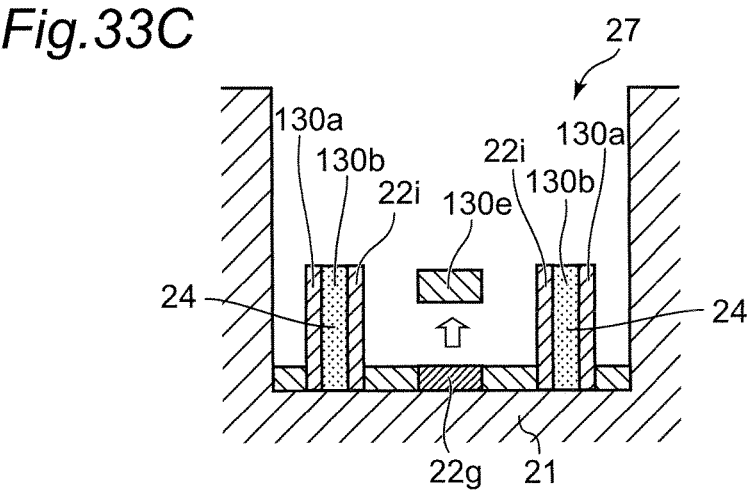
FIG. 33C is a longitudinal sectional view showing a process subsequent to FIG. 33E of constructing the artificial soil structure according to the fifth embodiment of the present invention.

Subsequently, the moderate water repellent soil is added into remaining portion of the cylindrical mold 130e positioned correspondingly to the center bottom 22g so as to reach the height of the cylindrical mold 130e. The moderate water repellent soil is also inserted into the outer cylindrical molds 130a provided outside the drain hole molds. Thereafter, the cylindrical mold 130e positioned correspondingly to the center bottom 22g is removed (FIG. 33C). The outer bottoms 22i are formed by the moderate water repellent sand that is inserted in the cylindrical molds 130a placed outside the drain hole molds.

Figure 33D:
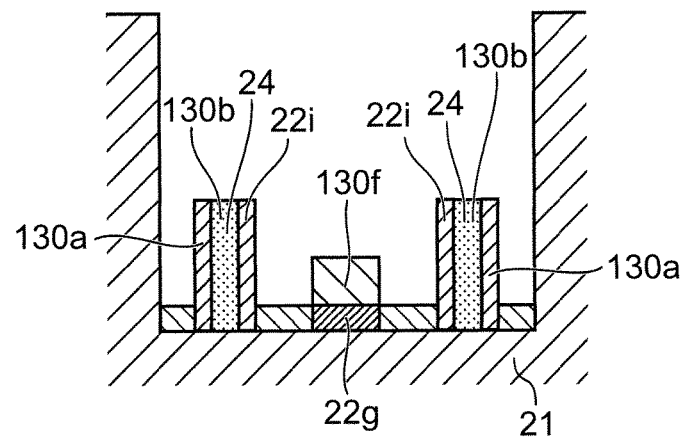
FIG. 33D is a longitudinal sectional view showing a process subsequent to FIG. 33C of constructing the artificial soil structure according to the fifth embodiment of the present invention.
Figure 33E:
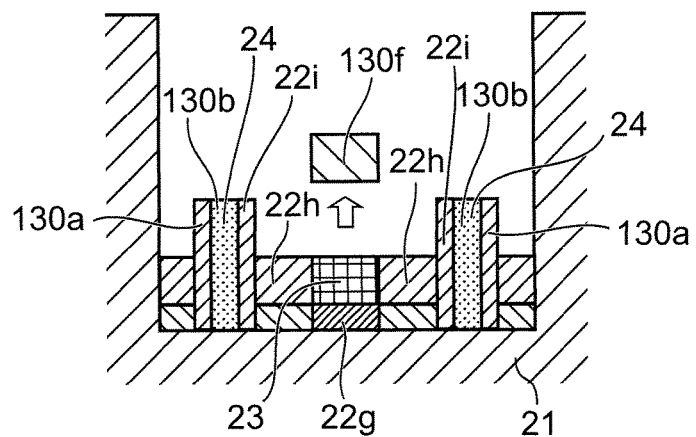
FIG. 33E is a longitudinal sectional view showing a process subsequent to FIG. 33D of constructing the artificial soil structure according to the fifth embodiment of the present invention.
Figure 33F:
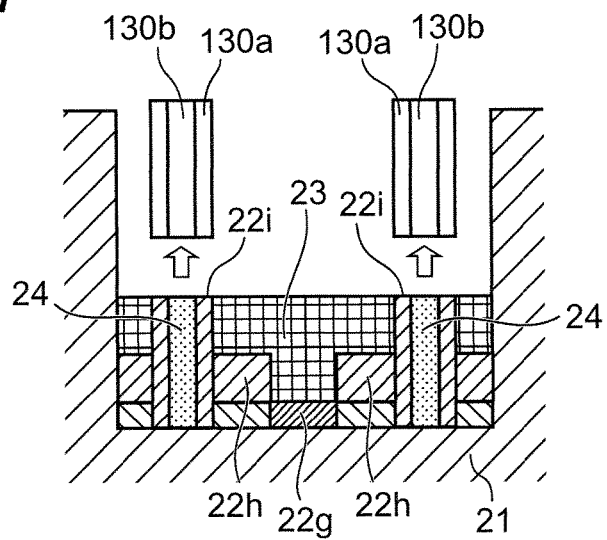
FIG. 33F is a longitudinal sectional view showing a process subsequent to FIG. 33E of constructing the artificial soil structure according to the fifth embodiment of the present invention.

Then, a different cylindrical mold 130f, which has the bottom shape and the bottom area same as those of the cylindrical mold 130e and is 11 cm high, is placed on the finest water repellent soil at the position corresponding to the center bottom 22g (FIG. 33D). The cylindrical mold 130f is filled with the original soil with no water repellency. The other portions are filled with the moderate water repellent sand so as to be as high as the cylindrical mold 130f, and the cylindrical mold 130f is removed finally (FIG. 33E). The intermediate bottoms 22h are formed by the moderate water repellent sand inserted between the cylindrical mold 130f and the cylindrical molds 130a placed outside thereof.

Then, the original soil with no water repellency is provided so as to be as high as the soil drain holes 24, so that the water retentive soil layer 23 is completed. Lastly removed are the outer cylindrical molds 130a and the inner cylindrical molds 130b for the soil drain holes.

The water shield layer 22A or 22B having many steps or the water shield layer 22C having the slant surfaces may be formed by repeating these processes.

Alternatively, the water shield layer 22C having the slant surfaces as shown in FIG. 32 may be formed by inserting soil from above so as to naturally form the chevron shapes.

The fourth and fifth embodiments each exemplify the case where the soil on site (where the soil structure is to be formed) are processed by water repellent treatment and used for the water shield layer 22, 22A, 22B, or 22C. Alternatively, hydrophobic particles may be preliminarily prepared to be delivered to the construction site. The hydrophobic particles may be soil obtained on a different site, or may be artificial particles such as glass beads processed by water repellent treatment.

Still alternatively, hydrophobic particles of different particle diameters may be prepared, and as in the fourth or fifth embodiment, the soil drain holes 24 and the water shield layer 22A, 22B, or 22C may be made of the particles of the appropriate particle diameters to construct the soil structure 26A of FIG. 20A or 30. In this case, the hydrophobic particles need to be delivered to the site, which is additional work as compared with the case of using soil on site. On the other hand, water repellency is not affected by the properties of the soil on site and the soil structure can ensure stable performance. In addition, there is no need to sort the soil into different particle diameters on site.

Figure 34:
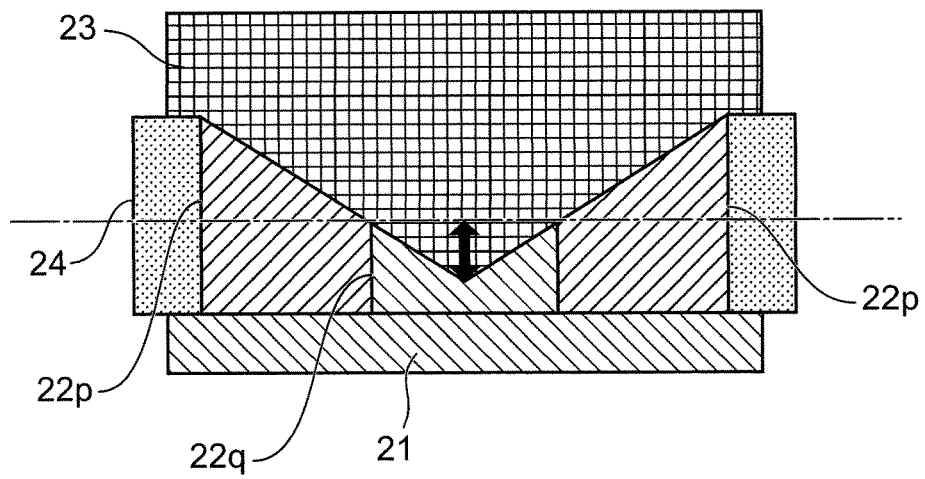
FIG. 34 is a longitudinal sectional view of an artificial soil structure according to still another modification example of the fifth embodiment of the present invention.

Locations and sizes of the soil drain holes 24 are determined appropriately in accordance with the amount of water reserved in the water retentive soil layer 23 or the speed or the amount of water to be discharged through the soil drain holes 24. In the case of providing a plurality of soil drain holes 24, these soil drain holes 24 are not necessarily the same in size but may be sized differently. For example, the soil drain holes 24 in a portion 70, which desirably has better drainage performance, may be made larger than the soil drain holes in other portions, alternatively, may be provided at higher density than the soil drain holes 24 in the other portions, or still alternatively, may be provided at positions lower than the soil drain holes 24 in the other portions, so as to adjust the draining speed (see FIG. 34). More specifically, in a case of partially adjusting the draining speed due to the site conditions (water tends to flow into a certain region from its periphery and be reserved therein, water tends not to flow into a certain region and is reserved at low speed, or the like), the height of the soil drain holes 24 may be adjusted in and around such a region. FIG. 34 depicts the case of improving drainage performance in a portion denoted by reference numeral 70. In a case where water tends to be reserved and thus to break the water shield layer 22 therearound, the soil drain holes 24 in the portion denoted by reference numeral 70 may be placed lower than the soil drain holes 24 in the other portions, so that water starts to flow downward through the soil drain holes 24 in the portion denoted by reference numeral 70 earlier than the other portions. Water is discharged at relatively higher speed in the area around the lower soil drain holes 24, and thus water is not reserved to reach the critical water pressure and breakage is avoided. Furthermore, the amount of water can be adjusted only by adjusting the height of the soil drain holes 24, thereby realizing easier reconstruction.

In the embodiments and modifications examples described above, the soil layer needs only to allow passage of water. The soil layer may include a gravel layer formed by a plurality of gravel stones, or a layer formed by polymer particles.

Though the present disclosure has been described above based on the above first to fifth embodiments, the present disclosure should not be limited to the above-described first to fifth embodiments.

Any of the various embodiments and the modification examples having been described may be appropriately combined together to achieve the respective effects thereof.

The entire disclosures of Japanese Patent Applications Nos.: 2011-167165 filed on Jul. 29, 2011 and 2011-167306 filed on Jul. 29, 2011, including specifications, claims, drawings, and summaries are incorporated herein by reference in their entireties.

The artificial soil structure and the method of forming the same according to the present invention enable improvement of soil including insufficient water to water retentive soil easily at low cost. The artificial soil structure and the method of forming the same according to the present disclosure are thus useful for soil of farmland that needs a water retentive soil layer, a dam (as well as an underground dam) as an irrigation facility for securing water, a water channel, a reservoir, or the like.

Although the present disclosure has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An artificial soil structure comprising:
a water shield layer provided on a soil layer, the water shield layer including water repellent sand throughout an entirety of the water shield layer, the water repellent sand being processed by a water repellent treatment;
a water retentive layer provided on the water shield layer, the water retentive layer including water retentive sand without any water repellent treatment; and
at least one water repellent column penetrating through the water shield layer and contacting the soil layer and the water retentive layer so as to allow the water retentive layer to communicate with the soil layer via the water repellent column, the water repellent column including water repellent particles throughout an entirety of the water repellent column, the water repellent particles being processed by the water repellent treatment;
wherein the water shield layer has a water infiltration pressure higher than a water infiltration pressure of the water repellent column.

2. The artificial soil structure according to claim 1, wherein the water infiltration pressure of the water shield layer is 1.2 times higher than the water infiltration pressure of the water repellent column.

3. The artificial soil structure according to claim 1, wherein the water repellent column is collapsed by a predetermined pressure of water reserved in the water retentive layer so as to allow drainage of flowing water reserved in the water retentive layer into the soil layer.

4. The artificial soil structure according to claim 1, wherein the water shield layer includes hydrophobic particles that do not allow permeation of water.

5. The artificial soil structure according to claim 1, wherein the water repellent column includes hydrophobic particles that do not allow permeation of water.

6. The artificial soil structure according to claim 1, wherein the water repellent particles of the water repellent column and the water repellent sand of the water shield layer comprise hydrophobic particles that do not allow permeation of water, and the hydrophobic particles of the water repellent column are larger in diameter than the hydrophobic particles of the water shield layer.

7. The artificial soil structure according to claim 1, wherein the water repellent sand of the water shield layer comprises hydrophobic particles that do not allow permeation of water, and the water repellent column includes a soil mixture of soil including water permeable sand with no water repellent treatment and the water repellent particles comprising hydrophobic particles that do not allow permeation of water.

8. The artificial soil structure according to claim 7, wherein a ratio of the quantity of the soil including the water permeable sand with no water repellent treatment to the quantity of the hydrophobic particles forming the water shield layer is from 1:3 to 1:7.

9. The artificial soil structure according to claim 1, further comprising a ventilation pipe having a first end opened to outdoor air and a second end in contact with the water repellent column to ventilate the water repellent column.

10. The artificial soil structure according to claim 1, wherein:
the water shield layer has a concave portion including a flat portion and a side portion standing on a peripheral edge of the flat portion,
the water retentive layer is provided in the concave portion of the water shield layer and on an upper surface of the concave portion,
the water repellent column is configured to vertically penetrate a part of the side portion of the water shield layer, and the water repellent column is in contact with the soil layer and the water retentive layer, and
the flat portion and an upper end surface of the side portion of the concave portion of the water shield layer have a difference in height smaller than a difference between the water infiltration pressure as a critical water pressure of the water shield layer and the water infiltration pressure of the water repellent column.

11. The artificial soil structure according to claim 10, wherein
the water repellent sand of the water shield layer comprises hydrophobic particles of two or more types different from each other in water infiltration pressure,
a water infiltration pressure of a first type of the hydrophobic particles forming an upper portion of the side portion of the concave portion of the water shield layer is lower than a water infiltration pressure of a second type of the hydrophobic particles forming the flat portion of the concave portion of the water shield layer, and
the water repellent particles of the water repellent column comprise hydrophobic particles having a water infiltration pressure lower than the water infiltration pressure of the first type of the hydrophobic particles forming the upper portion of the side portion of the concave portion of the water shield layer.

12. The artificial soil structure according to claim 11, wherein the first type of the hydrophobic particles forming the upper portion of the side portion of the concave portion of the water shield layer have an average particle diameter larger than an average particle diameter of the second type of the hydrophobic particles forming the flat portion of the concave portion of the water shield layer, so that the water infiltration pressure of the first type of the hydrophobic particles forming the upper portion of the side portion of the concave portion of the water shield layer is lower than the water infiltration pressure of the second type of the hydrophobic particles forming the flat portion of the concave portion of the water shield layer, and
the hydrophobic particles forming the water repellent soil body have particle diameters larger than particle diameters of the first type of the hydrophobic particles forming the upper portion of the side portion of the concave portion of the water shield layer, and a water infiltration pressure of the hydrophobic particles forming the water repellent column is lower than the water infiltration pressure of the first type of the hydrophobic particles forming the upper portion of the side portion of the concave portion of the water shield layer.

13. The artificial soil structure according to claim 10, wherein the flat portion and the side portion of the concave portion of the water shield layer are connected together by a stepped bottom portion.

14. A method of forming an artificial soil structure, the method comprising:
providing at least one cylindrical drain hole mold on a soil layer of a site to form the artificial soil structure;
forming at least one water repellent column by inserting water repellent particles processed by a water repellent treatment into the drain hole mold so as to be in contact with the soil layer, the water repellent column including the water repellent particles throughout an entirety of the water repellent column;
forming a water shield layer by applying water repellent sand processed by the water repellent treatment on the soil layer surrounding the drain hole mold, the water shield layer including the water repellent sand throughout an entirety of the water shield layer such that the water shield layer has a water infiltration pressure higher than a water infiltration pressure of the water repellent column; and
forming a water retentive layer by applying water retentive sand without any water repellent treatment on the water repellent column and the water shield layer so as to be in contact with the water repellent column and the water shield layer such that the water retentive layer communicates with the soil layer via the water repellent column.

15. The method of forming an artificial soil structure according to claim 14, further comprising removing the drain hole mold after the water shield layer is formed and before the water retentive layer is formed.

* * * * *